(12) United States Patent
Oh et al.

(10) Patent No.: US 11,140,380 B2
(45) Date of Patent: Oct. 5, 2021

(54) METHOD AND APPARATUS FOR PROCESSING OVERLAY MEDIA IN 360 DEGREE VIDEO SYSTEM

(71) Applicant: LG ELECTRONICS INC., Seoul (KR)

(72) Inventors: Sejin Oh, Seoul (KR); Hyejung Hur, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 16/432,657

(22) Filed: Jun. 5, 2019

(65) Prior Publication Data

US 2019/0379884 A1    Dec. 12, 2019

Related U.S. Application Data

(60) Provisional application No. 62/681,137, filed on Jun. 6, 2018.

(51) Int. Cl.

| | | |
|---|---|---|
| *H04N 13/293* | (2018.01) | |
| *H04N 13/282* | (2018.01) | |
| *H04N 13/271* | (2018.01) | |
| *H04N 19/167* | (2014.01) | |
| *H04N 19/597* | (2014.01) | |

(52) U.S. Cl.
CPC ......... *H04N 13/293* (2018.05); *H04N 13/271* (2018.05); *H04N 13/282* (2018.05); *H04N 19/167* (2014.11); *H04N 19/597* (2014.11)

(58) Field of Classification Search
CPC .. H04N 13/293; H04N 19/167; H04N 19/597; H04N 13/271; H04N 13/282

USPC .......................................................... 348/46
See application file for complete search history.

(56) References Cited

U.S. PATENT DOCUMENTS

| | | | | |
|---|---|---|---|---|
| 7,719,563 | B2 * | 5/2010 | Richards | H04N 21/242 348/36 |
| 8,411,091 | B2 * | 4/2013 | Horri | G06T 15/20 345/427 |
| 2004/0264919 | A1 * | 12/2004 | Taylor | H04N 21/4325 386/223 |
| 2005/0053302 | A1 * | 3/2005 | Srinivasan | H04N 19/184 382/248 |
| 2005/0261980 | A1 * | 11/2005 | Hadi | G06Q 30/0643 705/26.43 |

(Continued)

FOREIGN PATENT DOCUMENTS

| | | | | |
|---|---|---|---|---|
| KR | 2018-0001777 A | | 1/2018 | |
| KR | 20180013391 A | * | 2/2018 | ........... H04N 21/472 |

(Continued)

*Primary Examiner* — Zaihan Jiang
(74) *Attorney, Agent, or Firm* — Dentons US LLP

(57) ABSTRACT

A 360-degree image data processing method performed by a 360-degree video reception apparatus according to the present invention includes: receiving 360-degree image data; obtaining information on an encoded picture and metadata from the 360-degree image data; decoding a picture based on the information on the encoded picture; and rendering the decoded picture and an overlay based on the metadata, wherein the metadata includes group information, the group information includes group type information indicating a group including a main media and the overlay that can be rendered together, the decoded picture includes the main media, and the group information includes information indicating whether a track belonging to the group includes the main media or the overlay.

20 Claims, 37 Drawing Sheets

(56) References Cited

U.S. PATENT DOCUMENTS

| | | |
|---|---|---|
| 2008/0068500 A1 | 3/2008 | Krause |
| 2008/0297626 A1* | 12/2008 | Hashimoto .......... G03B 27/323 |
| | | 348/240.99 |
| 2010/0042682 A1* | 2/2010 | Kaye .................... G11B 27/34 |
| | | 709/203 |
| 2010/0329637 A1* | 12/2010 | Schultz ............. H04N 21/4316 |
| | | 386/248 |
| 2011/0007962 A1 | 1/2011 | Johnson et al. |
| 2016/0073155 A1 | 3/2016 | Subramaniam et al. |
| 2016/0198088 A1* | 7/2016 | Wang ................ H04N 5/23264 |
| | | 348/36 |
| 2017/0352187 A1* | 12/2017 | Haines .................. G06T 19/006 |
| 2017/0359624 A1* | 12/2017 | Englert ............... G06F 3/04815 |
| 2018/0077407 A1* | 3/2018 | Young .................. H04N 13/344 |
| 2018/0278985 A1* | 9/2018 | De Haan .......... H04N 21/42653 |
| 2018/0342267 A1* | 11/2018 | Popa ................ H04N 21/21805 |
| 2018/0357804 A1* | 12/2018 | Forutanpour .......... H04N 5/247 |
| 2019/0131011 A1* | 5/2019 | Sevenster ......... G06F 16/90324 |
| 2019/0158815 A1* | 5/2019 | He ..................... H04N 21/4728 |
| 2019/0373243 A1* | 12/2019 | Jeong ....................... G06T 1/00 |

FOREIGN PATENT DOCUMENTS

| | | | | |
|---|---|---|---|---|
| KR | 2018-0029473 A | | 3/2018 | |
| KR | 20180028299 A | * | 3/2018 | ........... H04N 19/597 |
| KR | 20180029344 A | * | 3/2018 | ......... H04N 5/23238 |
| KR | 1020180029344 A | | 3/2018 | |
| KR | 20180040507 A | * | 4/2018 | ............... G06T 3/00 |
| WO | 2017142353 A1 | | 8/2017 | |

* cited by examiner

FIG. 9A
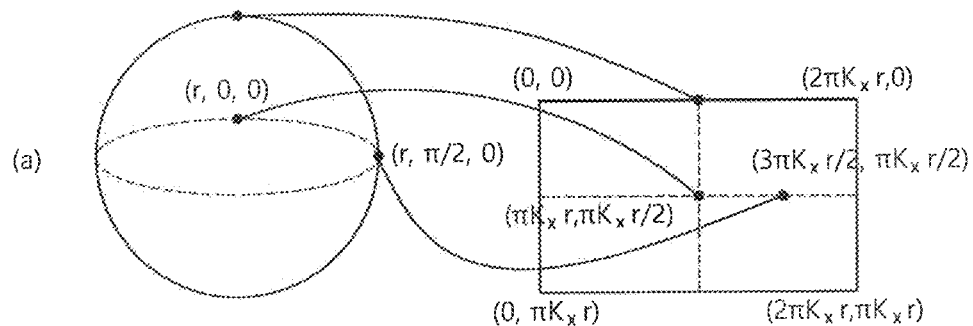
(a)
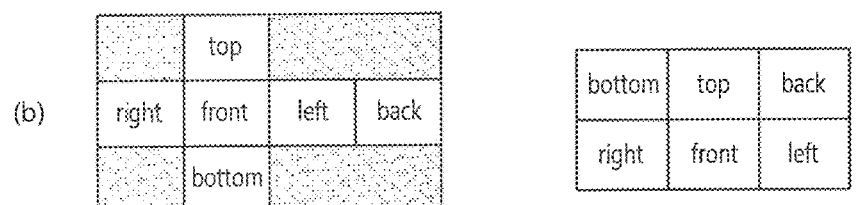
(b)
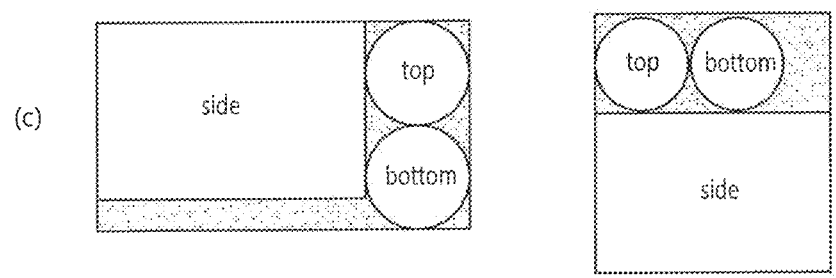
(c)
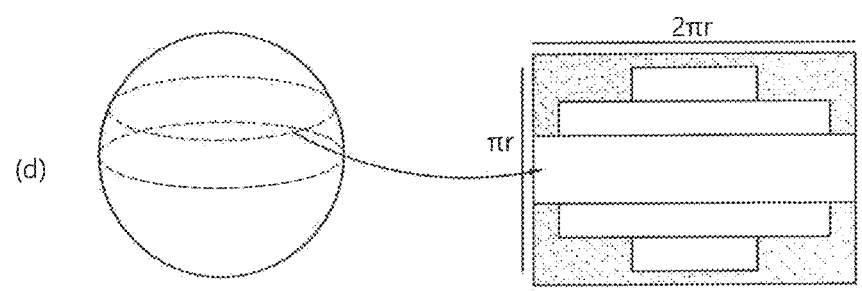
(d)

FIG. 11

```
...
        <Basic meta data>
unsigned      int(8)      vr_geometry;
unsigned      int(8)      projection_schme;

<Stereoscopic related metadata>
unsigned      int(1)      is_stereoscopic;
unsigned      int(3)      stereo_mode;

<Initial View related metadata>
signed        int(8)      initial_view_yaw_degree;
signed        int(8)      initial_view_pitch_degree;
signed        int(8)      initial_view_roll_degree;

<ROI related metadata>
unsigned int(1)      2d_roi_range_flag;
unsigned int(1)      3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}

<Field Of View related metadata>
unsigned int(1)           content_fov_flag;
if (content_fov_flag==1) {
  unsigned int(16)        content_fov;
}

<Cropped Region related metadata>
unsigned int(1)           is_copped_region;
if (content_fov_flag==1) {
  unsigned int(16)        cr_region_left_top_x;
  unsigned int(16)        cr_region_left_top_y;
  unsigned int(16)        cr_region_width;
  unsigned int(16)        cr_region_height;
}
...
```

FIG. 19
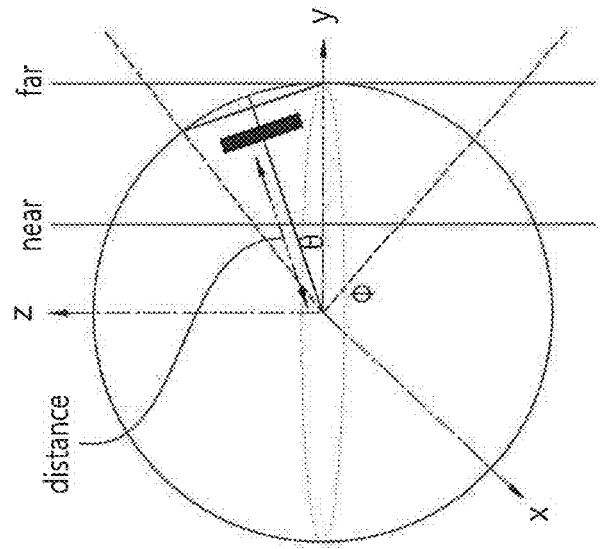
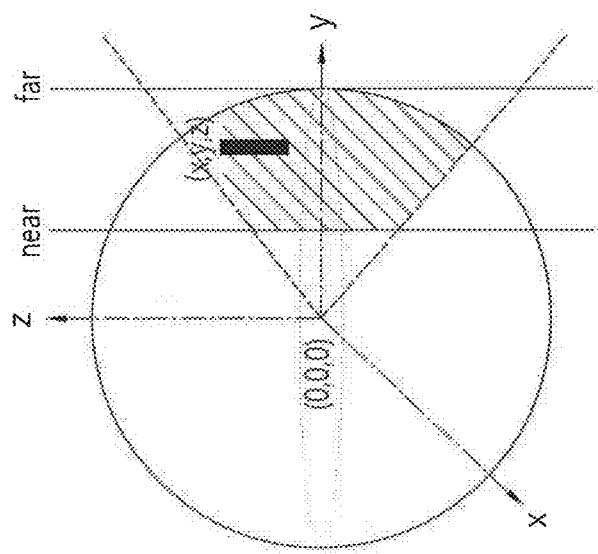
overlay_group_id=4

FIG. 20
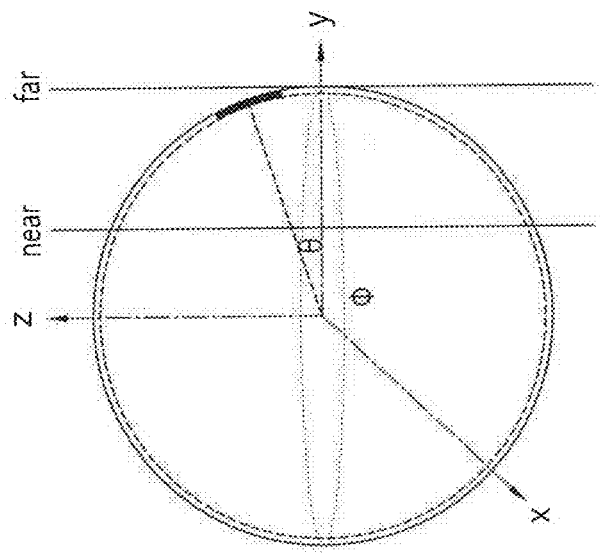
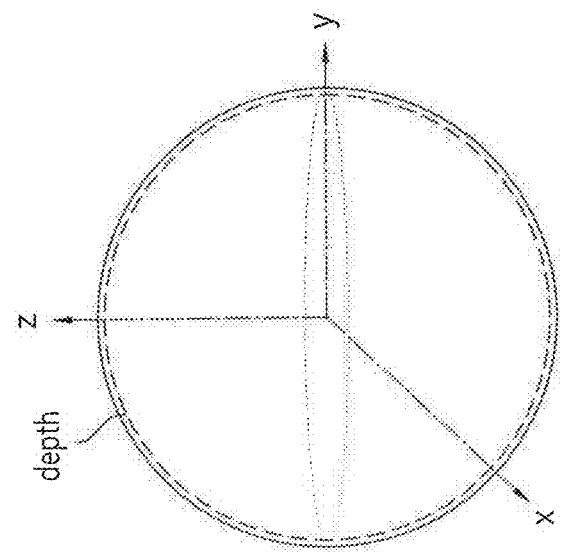

ered together, the decoded picture includes the main media, and the group information includes information indicating whether a track belonging to the group includes the main media or the overlay.
METHOD AND APPARATUS FOR PROCESSING OVERLAY MEDIA IN 360 DEGREE VIDEO SYSTEM

CROSS-REFERENCE TO RELATED APPLICATIONS

Pursuant to 35 U.S.C. § 119 (e), this application claims the benefit of U.S. Provisional Application No. 62/681,137 filed on Jun. 6, 2018, the contents of which are all hereby incorporated by reference herein in their entirety.

BACKGROUND OF THE INVENTION

Field of the Invention

The present invention relates to a 360-degree video and, more particularly, to a method and an apparatus for processing overlay media in a 360-degree video system.

Related Art

Virtual reality (VR) systems allow users to feel as if they are in electronically projected environments. Systems for providing VR can be improved in order to provide images with higher picture quality and spatial sounds. VR systems allow users to interactively consume VR content.

SUMMARY OF THE INVENTION

An aspect of the present invention is to provide a method and an apparatus for processing 360-degree video data.

Another aspect of the present invention is to provide a method and an apparatus for transmitting metadata of 360-degree video data.

Still another aspect of the present invention is to provide a method and an apparatus for processing an overlay for a 360-degree video.

Yet another aspect of the present invention is to provide a method and an apparatus for signaling overlay-related metadata.

According to one embodiment of the present invention, there is provided a 360-degree image data processing method performed by a 360-degree video reception apparatus. The method includes: receiving 360-degree image data; obtaining information on an encoded picture and metadata from the 360-degree image data; decoding a picture based on the information on the encoded picture; and rendering the decoded picture and an overlay based on the metadata, wherein the metadata includes group information, the group information includes group type information indicating a group including a main media and the overlay that can be rendered together, the decoded picture includes the main media, and the group information includes information indicating whether a track belonging to the group includes the main media or the overlay.

According to another embodiment of the present invention, there is provided a 360-degree video reception apparatus that processes 360-degree image data. The 360-degree video reception apparatus includes: a reception processor configured to receive 360-degree image data and to obtain information on an encoded picture and metadata from the 360-degree image data; a data decoder configured to decode a picture based on the information on the encoded picture; and a renderer configured to render the decoded picture and an overlay based on the metadata, wherein the metadata includes group information, the group information includes group type information indicating a group including a main media and the overlay that can be rendered together, the decoded picture includes the main media, and the group information includes information indicating whether a track belonging to the group includes the main media or the overlay.

According to still another embodiment of the present invention, there is provided a 360-degree image data processing method performed by a 360-degree video transmission apparatus. The method includes: obtaining a 360-degree image; deriving a picture by processing the 360-degree image; generating metadata on the 360-degree image; encoding the picture; and processing the encoded picture and metadata for storage or transmission, wherein the metadata includes group information, the group information includes group type information indicating a group including a main media and an overlay that can be rendered together, the encoded picture includes the main media, and the group information includes information indicating whether a track belonging to the group includes the main media or the overlay.

According to yet another embodiment of the present invention, there is provided a 360-degree video transmission apparatus that processes 360-degree image data. The 360-degree video transmission apparatus includes: a data input unit configured to obtain a 360-degree image; a projection processor configured to derive a picture by processing the 360-degree image; a metadata processor configured to generate metadata on the 360-degree image; a data encoder configured to encode the picture; and a transmission processor configured to process the encoded picture and metadata for storage or transmission, wherein the metadata includes group information, the group information includes group type information indicating a group including a main media and an overlay that can be rendered together, the encoded picture includes the main media, and the group information includes information indicating whether a track belonging to the group includes the main media or the overlay.

According to the present invention, it is possible to efficiently transmit VR content (360-degree content) in an environment in which next-generation hybrid broadcasting using a terrestrial network and an Internet network.

According to the present invention, it is possible to propose a method for providing an interactive experience when a user uses 360-degree content.

According to the present invention, it is possible to propose a method for signaling a 360-degree content producer's intent to be accurately reflected when a user uses 360-degree content.

According to the present invention, it is possible to propose a method for efficiently increasing transmission capacity and transmitting necessary information in transmitting 360-degree content.

According to the present invention, it is possible to efficiently provide an overlay for a 360-degree video and to efficiently display additional information based on a user view.

According to the present invention, it is possible to provide a link with a particular target through an overlay for a 360-degree video.

According to the present invention, it is possible to provide a link for efficiently switching a screen or providing additional information through an overlay.

According to the present invention, it is possible to efficiently store and transmit signaling information about 360-degree video data through a media file format based on the International Organization for Standardization (ISO), such as the ISO base media file format (ISO BMFF).

According to the present invention, it is possible to transmit signaling information about 360-degree video data through Hypertext Transfer Protocol (HTTP)-based adaptive streaming, such as Dynamic Adaptive Streaming over HTTP (DASH).

According to the present invention, it is possible to store and transmit signaling information about 360-degree video data through a supplemental enhancement information (SEI) message or video usability information (VUI), thereby improving overall transmission efficiency.

BRIEF DESCRIPTION OF THE DRAWINGS

FIG. 9A and FIG. 9B illustrate projection formats according to the present invention.

FIG. 11 illustrates an example of 360-degree video-related metadata according to an embodiment of the present invention.

FIG. 18 to FIG. 20 illustrate overlay positions according to the overlay type.

DESCRIPTION OF EXEMPLARY EMBODIMENTS

Figure 1:
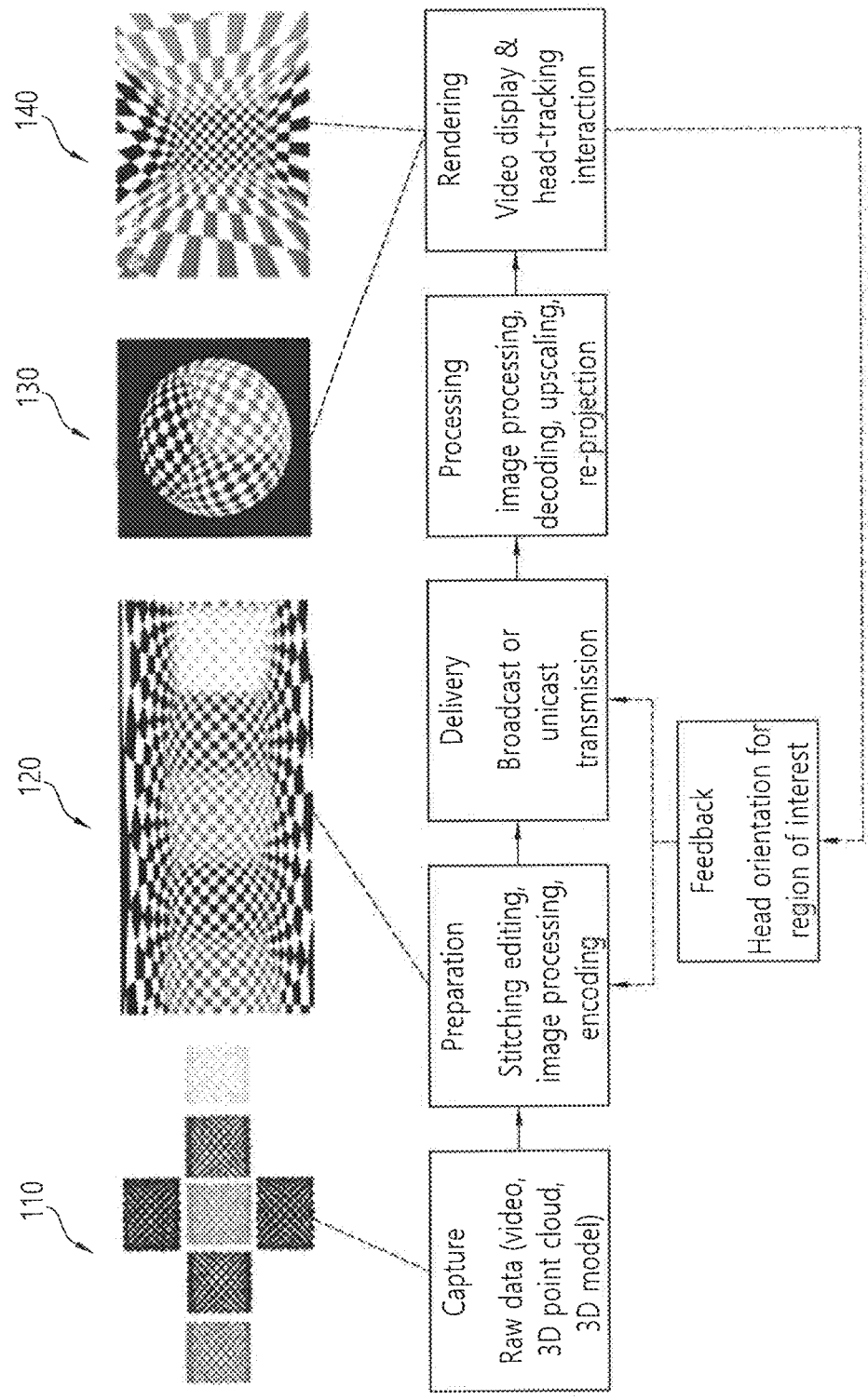
FIG. 1 is a view illustrating overall architecture for providing a 360-degree video according to the present invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present invention.

The present invention proposes a method of providing 360-degree content in order to provide virtual reality (VR) to users. VR may refer to technology for replicating actual or virtual environments or those environments. VR artificially provides sensory experience to users and thus users can experience electronically projected environments.

360-degree content refers to content for realizing and providing VR and may include a 360-degree video and/or 360-degree audio. The 360-degree video may refer to video or image content which is necessary to provide VR and is captured or reproduced omnidirectionally (360 degrees). Hereinafter, the 360-degree video may refer to 360-degree video. A 360-degree video may refer to a video or an image represented on 3D spaces in various forms according to 3D models. For example, a 360-degree video can be represented on a spherical surface. The 360-degree audio is audio content for providing VR and may refer to spatial audio content whose audio generation source can be recognized to be located in a specific 3D space. 360-degree content may be generated, processed and transmitted to users and users can consume VR experiences using the 360-degree content. A 360-degree video may be referred to as an omnidirectional video, and a 360-degree image may be referred to as an omnidirectional image.

Particularly, the present invention proposes a method for effectively providing a 360-degree video. To provide a 360-degree video, a 360-degree video may be captured through one or more cameras. The captured 360-degree video may be transmitted through series of processes and a reception side may process the transmitted 360-degree video into the original 360-degree video and render the 360-degree video. In this manner, the 360-degree video can be provided to a user.

Specifically, processes for providing a 360-degree video may include a capture process, a preparation process, a transmission process, a processing process, a rendering process and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360-degree video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image on which 360-degree video data is projected. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360-degree video according to an embodiment. For example, it is possible to increase the resolution of regions corresponding to relatively more important regions in a 360-degree video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 130 shown in FIG. 1. The form 130 shown in FIG. 1 corresponds to a case in which the image/video is re-projected on a 3D spherical model. A user can view a region of the rendered image/video through a VR display. Here, the region viewed by the user may have a form 140 shown in FIG. 1.

The feedback process may refer to a process of delivering various types of feedback information which can be acquired in a display process to a transmission side. Interactivity in consumption of a 360-degree video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360-degree video which is currently viewed by the user, that is, viewport information, can be calculated.

The viewport information may be information about a region in a 360-degree video which is currently viewed by a user. Gaze analysis may be performed through the viewpoint information to check how the user consumes the 360-degree video, which region of the 360-degree video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOV) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360-degree video with respect to a region currently viewed by the user may be preferentially decoded and rendered using the head orientation information and/or the viewport information.

Here, a viewport or a viewport region may refer to a region in a 360-degree video being viewed by a user. A viewpoint is a point in a 360-degree video being viewed by a user and may refer to a center point of a viewport region. That is, a viewport is a region having a viewpoint at the center thereof, and the size and the shape of the region can be determined by an FOV which will be described later.

In the above-described overall architecture for providing a 360-degree video, image/video data which is subjected to the capture/projection/encoding/transmission/decoding/re-projection/rendering processes may be referred to as 360-degree video data. The term "360-degree video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

Figure 2:
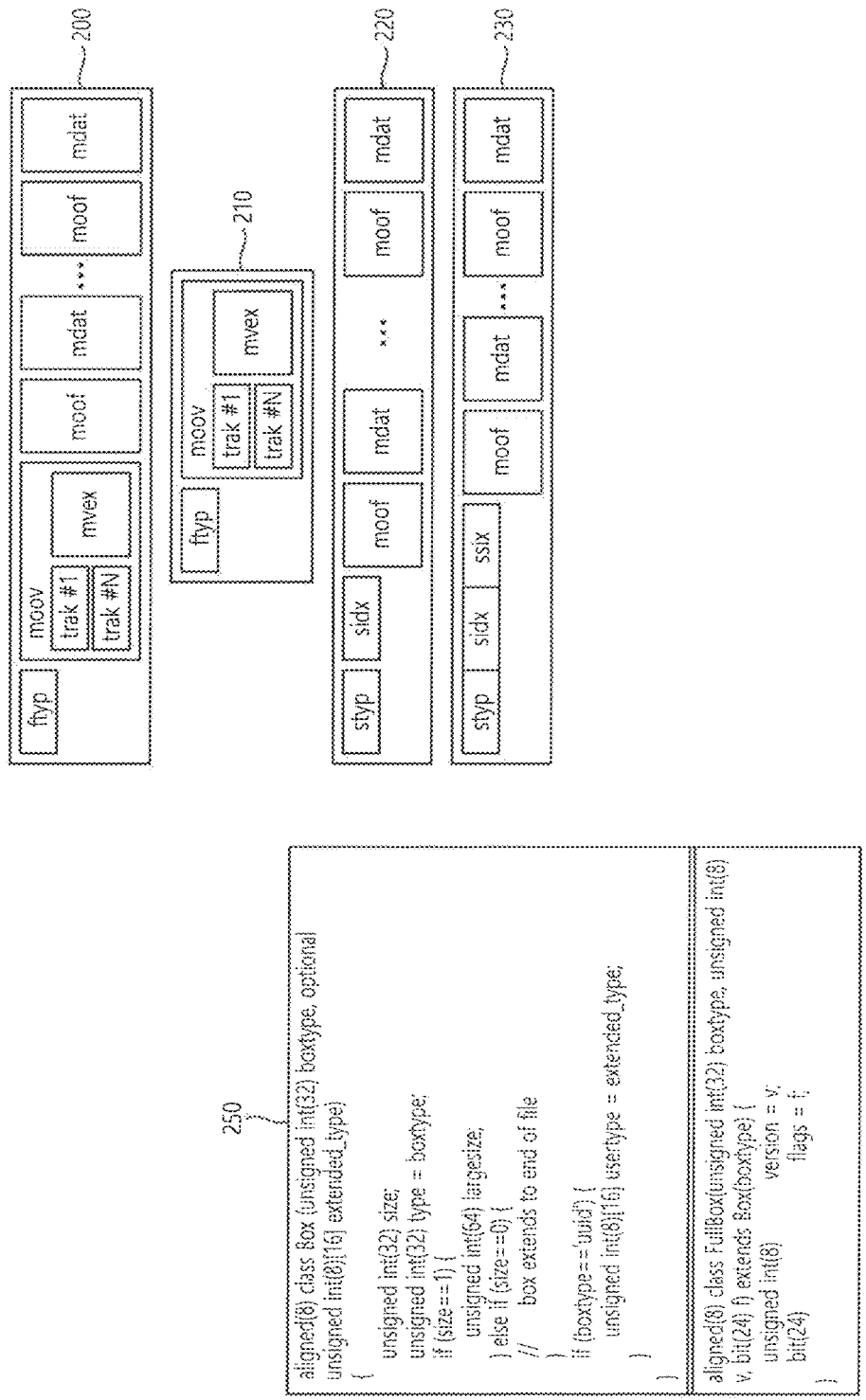
FIGS. 2 and 3 are views illustrating a structure of a media file according to an embodiment of the present invention.
Figure 3:
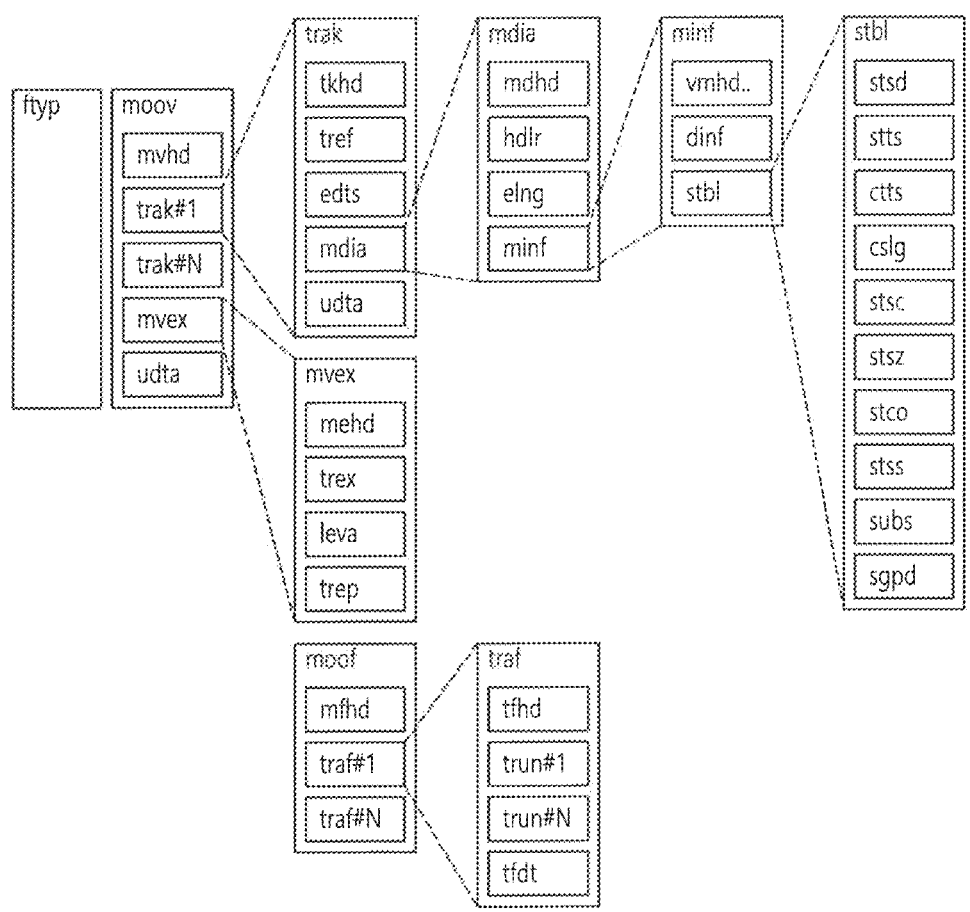

FIGS. 2 and 3 are views illustrating a structure of a media file according to an embodiment of the present invention.

The media file according to the present invention may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present invention may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present invention may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a large size field can represent the length of the corresponding box in bytes. A version field can indicate the version of the corresponding box format. A type field can indicate the type or identifier of the corresponding box. A flags field can indicate a flag associated with the corresponding box.

Figure 4:
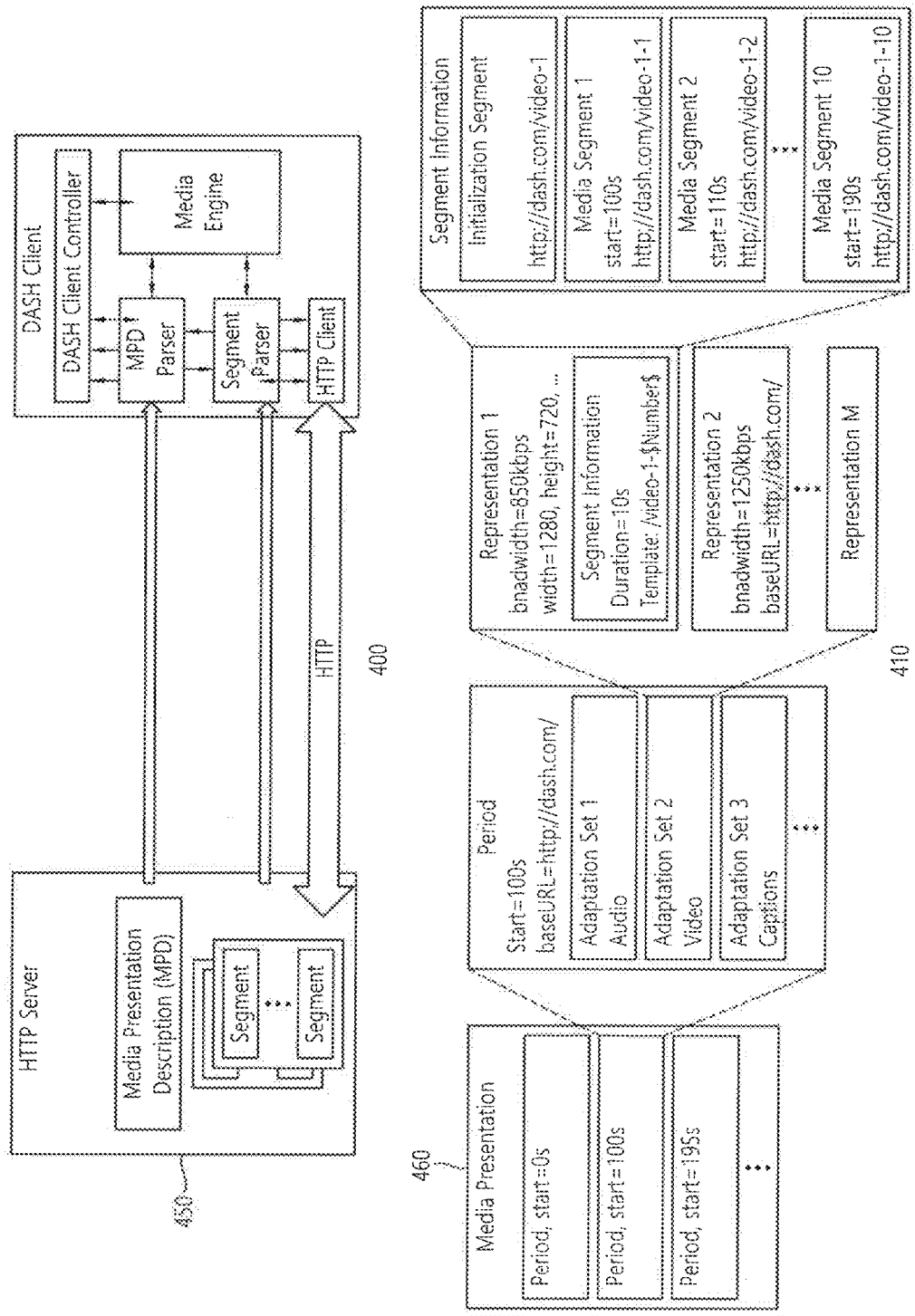
FIG. 4 illustrates an example of the overall operation of a DASH-based adaptive streaming model.

FIG. 4 illustrates an example of the overall operation of a DASH-based adaptive streaming model. The DASH-based adaptive streaming model according to an illustrated embodiment 400 illustrates an operation between an HTTP server and a DASH client. Here, Dynamic Adaptive Streaming over HTTP (DASH) is a protocol for supporting HTTP-based adaptive streaming and can dynamically support streaming according to a network state. Accordingly, AV content may be seamlessly reproduced.

First, the DASH client may acquire an MPD. The MPD may be delivered from a service provider, such as the HTTP server. The DASH client may request a segment from the server using segment access information described in the MPD. Here, this request may be performed in view of the network condition.

After acquiring the segment, the DASH client may process the segment in a media engine and may display the segment on a screen. The DASH client may request and acquire a necessary segment in view of reproduction time and/or the network state in real time (adaptive streaming). Accordingly, content may be seamlessly reproduced.

The media presentation description (MPD) is a file including detailed information for allowing the DASH client to dynamically acquire a segment and may be expressed in XML format.

A DASH client controller may generate a command to request an MPD and/or a segment in view of the network state. In addition, the controller may control acquired information to be used in an internal block, such as the media engine.

An MPD parser may parse the acquired MPD in real time. Accordingly, the DASH client controller can generate a command to acquire a required segment.

A segment parser may parse the acquired segment in real time. Depending on pieces of information included in the segment, internal blocks including the media engine may perform certain operations.

An HTTP client may request a required MPD and/or segment from the HTTP server. The HTTP client may also deliver an MPD and/or segment acquired from the server to the MPD parser or the segment parser.

The media engine may display content on a screen using media data included in the segment. Here, pieces of information of the MPD may be used.

A DASH data model may have a hierarchical structure 410. A media presentation may be described by the MPD. The MPD may describe a temporal sequence of a plurality of periods forming a media presentation. A period may represent one section of media content.

In one section, pieces of data may be included in adaptation sets. An adaptation set may be a collection of a plurality of media content components that can be exchanged with each other. An adaptation set may include a collection of representations. A representation may correspond to a media content component. Within one representation, content may be temporally divided into a plurality of segments, which may be for proper accessibility and delivery. The URL of each segment may be provided to enable access to each segment.

The MPD may provide information related to the media presentation, and a period element, an adaptation set element, and a presentation element may describe a period, an adaptation set, and a presentation, respectively. A representation may be divided into sub-representations, and a sub-representation element may describe a sub-representation.

Common properties/elements may be defined, which may be applied to (included in) an adaptation set, a representations, a sub-representation, or the like. Among the common properties/elements, there may be an essential property and/or a supplemental property.

The essential property may be information including elements that are considered essential in processing media presentation-related data. The supplemental property may be information including elements that may be used for processing the media presentation-related data. Descriptors to be described in the following embodiments may be defined and delivered in an essential property and/or a supplemental property when delivered via the MPD.

Figure 5:
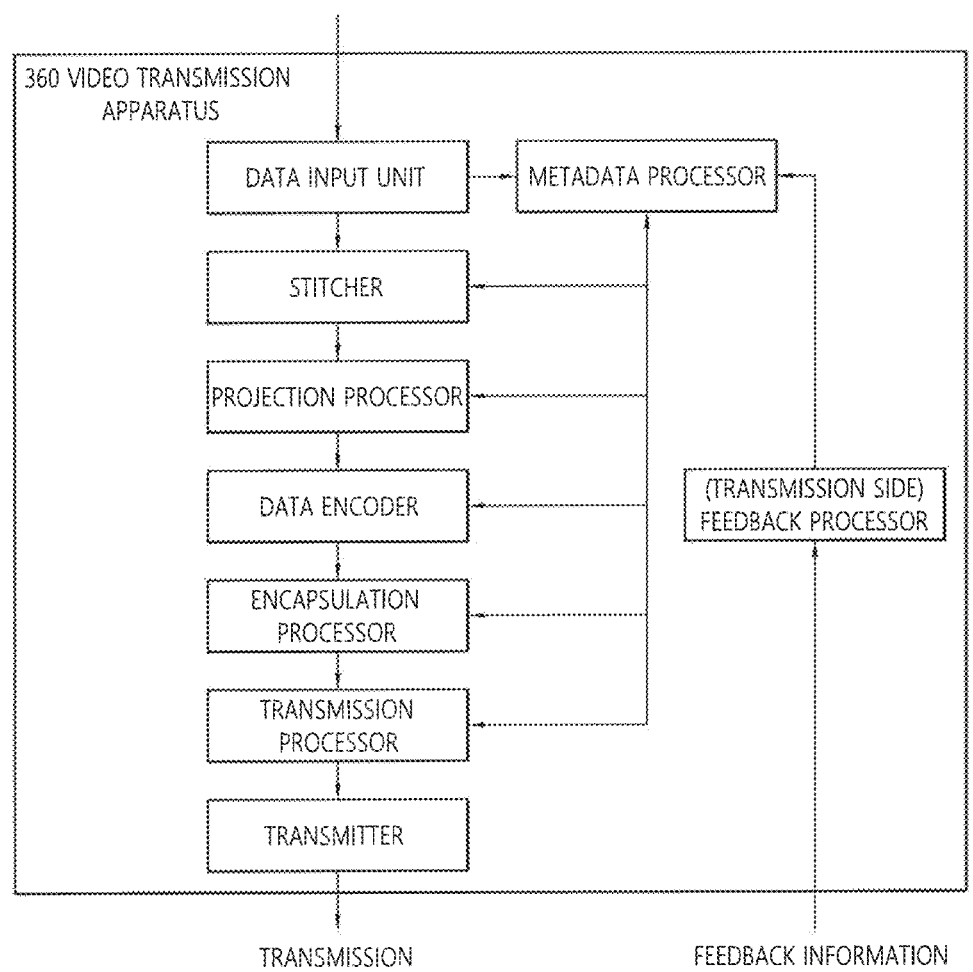
FIG. 5 is a view schematically illustrating a configuration of a 360-degree video transmission apparatus to which the present invention is applicable.

FIG. 5 is a view schematically illustrating a configuration of a 360-degree video transmission apparatus to which the present invention is applicable.

The 360-degree video transmission apparatus according to the present invention can perform operations related the above-described preparation process and the transmission process. The 360-degree video transmission apparatus may include a data input unit, a stitcher, a projection processor, a region-wise packing processor (not shown), a metadata processor, a (transmission side) feedback processor, a data encoder, an encapsulation processor, a transmission processor, and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360-degree video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360-degree video data on a 2D image. The projection processor may perform projection according to various schemes which will be described later. The projection processor may perform mapping in consideration of the depth of 360-degree video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360-degree video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360-degree video-related metadata using such metadata. According to an embodiment, the metadata processor may generate the 360-degree video-related metadata in the form of a signaling table. 360-degree video-related metadata may also be called metadata or 360-degree video related signaling information according to signaling context. Further, the metadata processor may forward the acquired or generated metadata to internal elements of the 360-degree video transmission apparatus as necessary. The metadata processor may forward the 360-degree video-related metadata to the data encoder, the encapsulation processor and/or the transmission processor such that the 360-degree video-related metadata can be transmitted to a reception side.

The data encoder can encode the 360-degree video data projected on the 2D image and/or region-wise packed 360-degree video data. The 360-degree video data can be encoded in various formats.

The encapsulation processor can encapsulate the encoded 360-degree video data and/or 360-degree video-related metadata in a file format. Here, the 360-degree video-related metadata may be received from the metadata processor. The encapsulation processor can encapsulate the data in a file format such as ISOBMFF, CFF or the like or process the data into a DASH segment or the like. The encapsulation processor may include the 360-degree video-related metadata in a file format. The 360-degree video-related metadata may be included in a box having various levels in SOBMFF or may be included as data of a separate track in a file, for example. According to an embodiment, the encapsulation processor may encapsulate the 360-degree video-related metadata into a file. The transmission processor may perform processing for transmission on the encapsulated 360-degree video data according to file format. The transmission processor may process the 360-degree video data according to an arbitrary transmission protocol. The processing for transmission may include processing for delivery over a broadcast network and processing for delivery over a broadband. According to an embodiment, the transmission processor may receive 360-degree video-related metadata from the metadata processor as well as the 360-degree video data and perform the processing for transmission on the 360-degree video-related metadata.

The transmitter can transmit the 360-degree video data and/or the 360-degree video-related metadata processed for transmission through a broadcast network and/or a broadband. The transmitter may include an element for transmission through a broadcast network and/or an element for transmission through a broadband.

According to an embodiment of the 360-degree video transmission apparatus according to the present invention, the 360-degree video transmission apparatus may further include a data storage unit (not shown) as an internal/external element. The data storage unit may store encoded 360-degree video data and/or 360-degree video-related metadata before the encoded 360-degree video data and/or 360-degree video-related metadata are delivered to the transmission processor. Such data may be stored in a file format such as ISOBMFF. Although the data storage unit may not be required when 360-degree video is transmitted in real time, encapsulated 360-degree data may be stored in the data storage unit for a certain period of time and then transmitted when the encapsulated 360-degree data is delivered over a broadband.

According to another embodiment of the 360-degree video transmission apparatus according to the present invention, the 360-degree video transmission apparatus may further include a (transmission side) feedback processor and/or a network interface (not shown) as internal/external elements. The network interface can receive feedback information from a 360-degree video reception apparatus according to the present invention and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360-degree video data processing.

According to another embodiment of the 360-degree video transmission apparatus according to the present invention, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360-degree video data on a spherical surface before projection. Information about region rotation, that is, rotation directions, angles and the like may be signaled through 360-degree video-related metadata. According to another embodiment of the 360-degree video transmission apparatus according to the present invention, the data encoder may perform encoding differently for respective regions. The data encoder may encode a specific region in high quality and encode other regions in low quality. The transmission side feedback processor may forward feedback information received from the 360-degree video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360-degree video transmission apparatus according to the present invention, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360-degree video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360-degree video transmission apparatus according to the present invention may be hardware elements. According to an embodiment, the internal/external elements may be changed, omitted, replaced by other elements or integrated.

Figure 6:
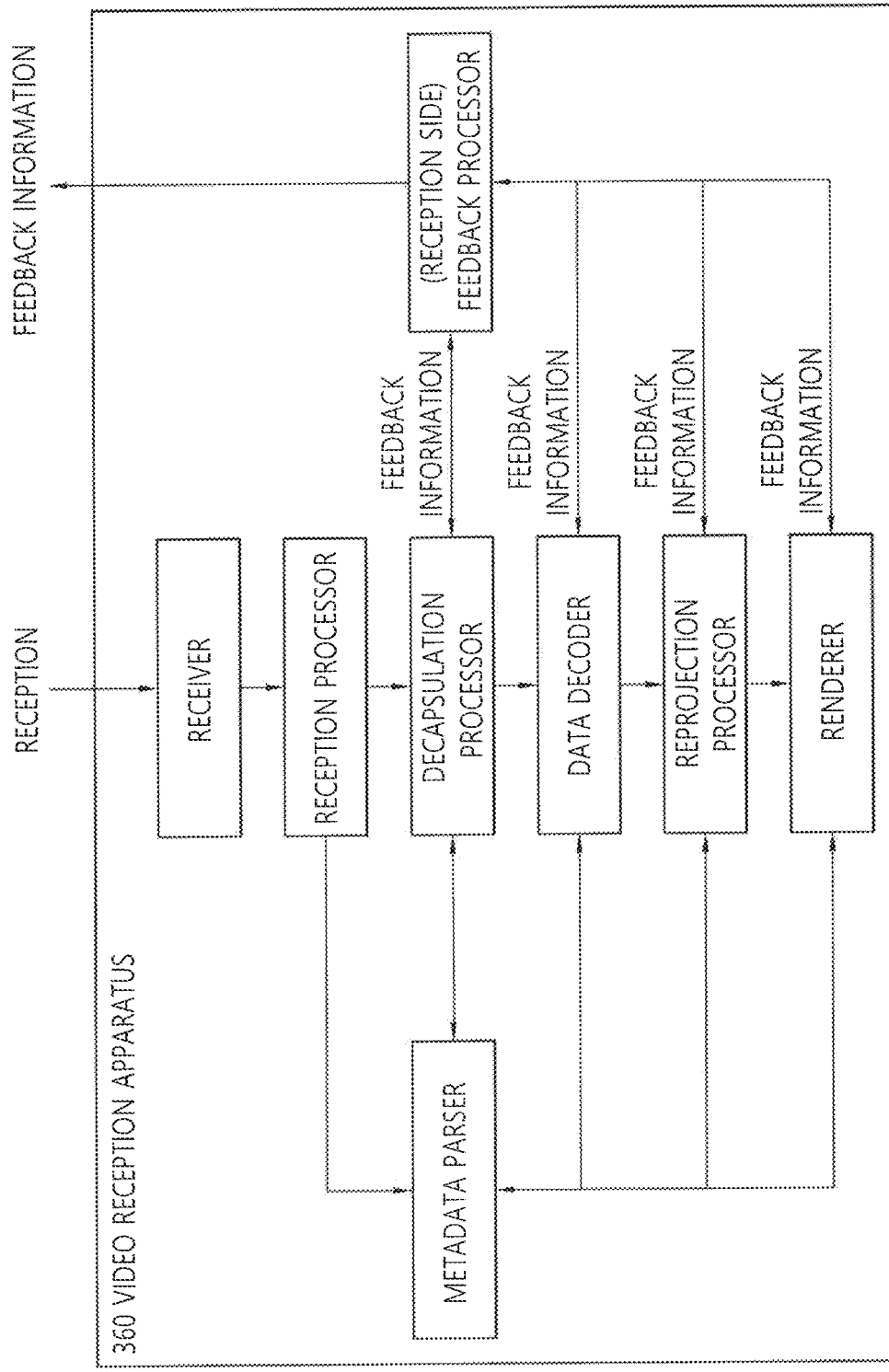
FIG. 6 is a view schematically illustrating a configuration of a 360-degree video reception apparatus to which the present invention is applicable.

FIG. 6 is a view schematically illustrating a configuration of a 360-degree video reception apparatus to which the present invention is applicable.

The 360-degree video reception apparatus according to the present invention can perform operations related to the above-described processing process and/or the rendering process. The 360-degree video reception apparatus may include a receiver, a reception processor, a decapsulation processor, a data decoder, a metadata parser, a (reception side) feedback processor, a re-projection processor, and/or a renderer as internal/external elements. A signaling parser may be called the metadata parser.

The receiver can receive 360-degree video data transmitted from the 360-degree video transmission apparatus according to the present invention. The receiver may receive the 360-degree video data through a broadcast network or a broadband depending on a channel through which the 360-degree video data is transmitted.

The reception processor can perform processing according to a transmission protocol on the received 360-degree video data. The reception processor may perform a reverse process of the process of the aforementioned transmission processor such that the reverse process corresponds to processing for transmission performed at the transmission side. The reception processor can forward the acquired 360-degree video data to the decapsulation processor and forward acquired 360-degree video-related metadata to the metadata parser. The 360-degree video-related metadata acquired by the reception processor may have the form of a signaling table.

The decapsulation processor can decapsulate the 360-degree video data in a file format received from the reception processor. The decapsulation processor can acquired 360-degree video data and 360-degree video-related metadata by decapsulating files in ISOBMFF or the like. The decapsulation processor can forward the acquired 360-degree video data to the data decoder and forward the acquired 360-degree video-related metadata to the metadata parser. The 360-degree video-related metadata acquired by the decapsulation processor may have the form of a box or a track in a file format. The decapsulation processor may receive metadata necessary for decapsulation from the metadata parser as necessary.

The data decoder can decode the 360-degree video data. The data decoder may receive metadata necessary for decoding from the metadata parser. The 360-degree video-related metadata acquired in the data decoding process may be forwarded to the metadata parser.

The metadata parser can parse/decode the 360-degree video-related metadata. The metadata parser can forward acquired metadata to the data decapsulation processor, the data decoder, the re-projection processor and/or the renderer.

The re-projection processor can perform re-projection on the decoded 360-degree video data. The re-projection processor can re-project the 360-degree video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360-degree video data corresponding to a specific area of the 3D space on the 3D space using metadata necessary for re-projection.

The renderer can render the re-projected 360-degree video data. As described above, re-projection of 360-degree video data on a 3D space may be represented as rendering of 360-degree video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360-degree video through a VR display or the like. The VR display is a device which reproduces a 360-degree video and may be included in a 360-degree video reception apparatus (tethered) or connected to the 360-degree video reception apparatus as a separate device (un-tethered).

According to an embodiment of the 360-degree video reception apparatus according to the present invention, the 360-degree video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360-degree video transmission apparatus.

As described above, the feedback information may be consumed at the reception side as well as being transmitted to the transmission side. The reception side feedback processor may forward the acquired feedback information to internal elements of the 360-degree video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360-degree video reception apparatus according to the present invention may be hardware elements. According to an embodiment, the internal/external elements may be changed, omitted, replaced by other elements or integrated. According to an embodiment, additional elements may be added to the 360-degree video reception apparatus.

Another aspect of the present invention may pertain to a method for transmitting a 360-degree video and a method for receiving a 360-degree video. The methods for transmitting/receiving a 360-degree video according to the present invention may be performed by the above-described 360-degree video transmission/reception apparatuses or embodiments thereof.

Embodiments of the above-described 360-degree video transmission/reception apparatuses and transmission/reception methods and embodiments of the internal/external elements of the apparatuses may be combined. For example, embodiments of the projection processor and embodiments of the data encoder may be combined to generate as many embodiments of the 360-degree video transmission apparatus as the number of cases. Embodiments combined in this manner are also included in the scope of the present invention.

Figure 7:
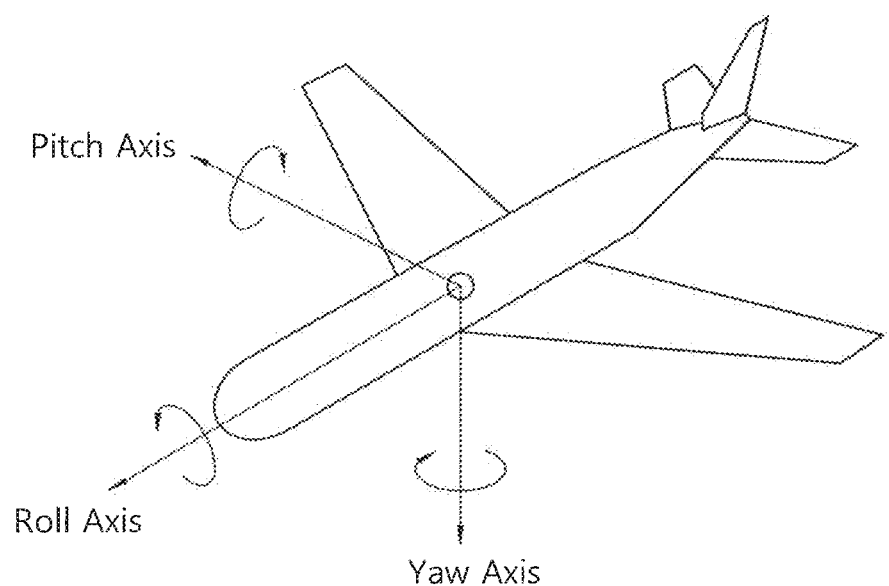
FIG. 7 is a view illustrating the concept of aircraft principal axes for describing a 3D space of the present invention.

FIG. 7 is a view illustrating the concept of aircraft principal axes for describing a 3D space of the present invention. In the present invention, the concept of aircraft principal axes can be used to represent a specific point, position, direction, interval, region and the like in a 3D space. That is, the content of aircraft principal axes can be used to describe a 3D space before projection or after reprojection and perform signaling therefor in the present invention. According to an embodiment, a method using the concept of X, Y and Z axes or spherical coordinates may be used.

An aircraft can freely rotate three-dimensionally. Axes constituting a three dimension are referred to as a pitch axis, a yaw axis and a roll axis. These may be referred to as a pitch, a yaw and a roll or a pitch direction, a yaw direction and a roll direction in the description.

The pitch axis can refer to an axis which is a base of a direction in which the front end of the aircraft rotates up and down. In the illustrated concept of aircraft principal axes, the pitch axis can refer to an axis which connects the wings of the aircraft.

The yaw axis can refer to an axis which is a base of a direction in which the front end of the aircraft rotates to the left and right. In the illustrated concept of aircraft principal axes, the yaw axis can refer to an axis which connects the top to the bottom of the aircraft. The roll axis can refer to an axis which connects the front end to the tail of the aircraft in the illustrated concept of aircraft principal axes, and a rotation in the roll direction can refer to a rotation based on the roll axis. As described above, a 3D space in the present invention can be described using the concept of the pitch, yaw and roll.

As described above, video data projected on a 2D image may be subjected to region-wise packing in order to enhance video coding efficiency. Region-wise packing may refer to a process of processing video data projected on a 2D image by regions. Here, regions may refer to divided areas of a 2D image on which 360-degree video data is projected. Divided regions of a 2D image may be divided according to a projection scheme. A 2D image may be referred to as a video frame or a frame.

The present invention proposes metadata about a region-wise packing process according to a projection scheme and a method of signaling the metadata. The region-wise packing process may be efficiently performed on the basis of the metadata.

Figure 8:
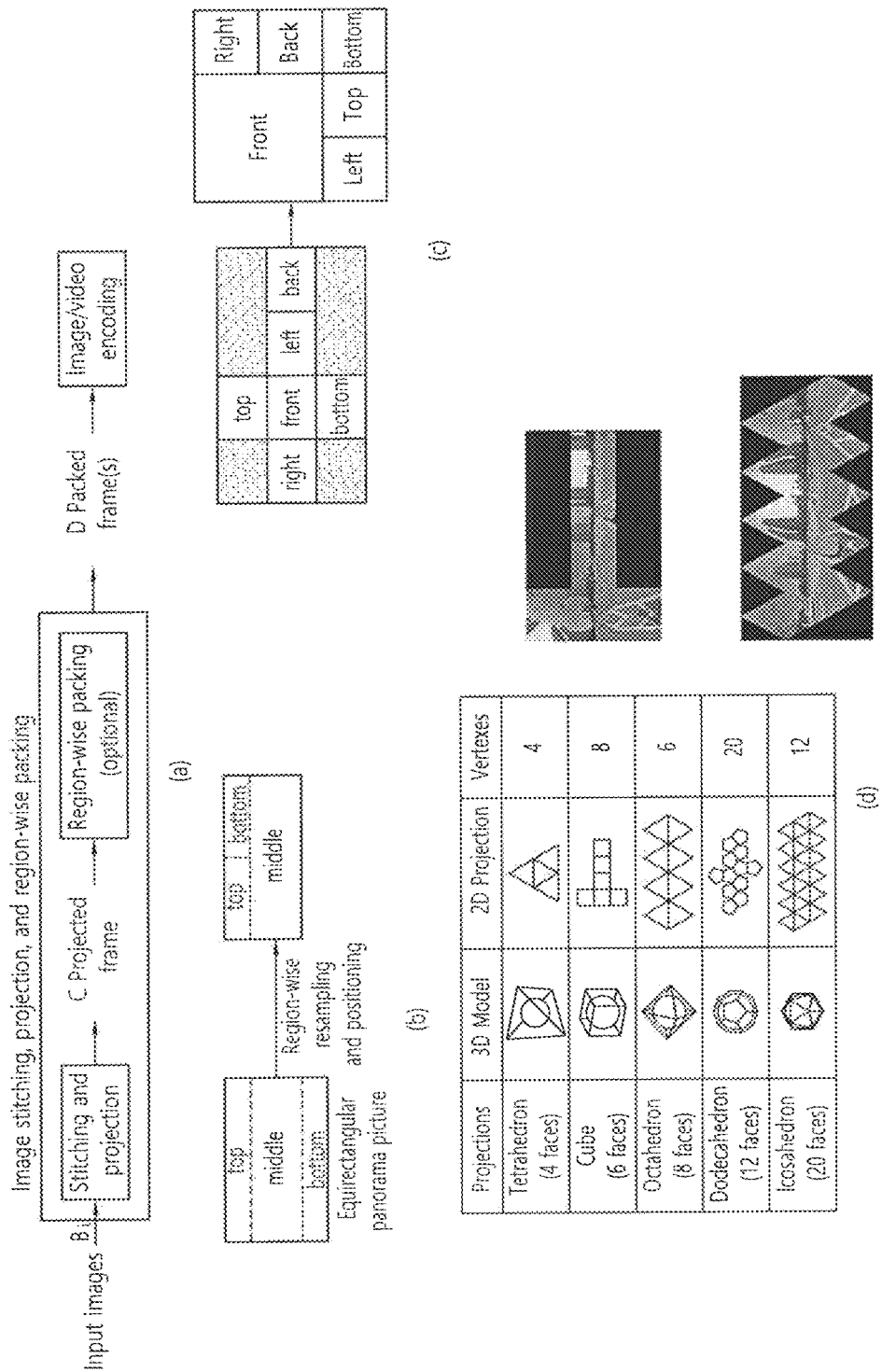
FIG. 8 illustrates a process of processing a 360-degree video and a 2D image to which a region-wise packing process according to a projection format is applied.

FIG. 8 illustrates a process of processing a 360-degree video and a 2D image to which a region-wise packing process according to a projection format is applied. In FIG. 8, (a) illustrates a process of processing input 360-degree video data. Referring to (a) of FIG. 8, input 360-degree video data from a viewpoint may be stitched and projected on a 3D projection structure according to various projection schemes, and the 360-degree video data projected on the 3D projection structure may be represented as a 2D image. That is, the 360-degree video data may be stitched and may be projected into the 2D image. The 2D image into which the 360-degree video data is projected may be referred to as a projected frame. The projected frame may be subjected to the above-described region-wise packing process. Specifically, the projected frame may be processed such that an area including the projected 360-degree video data on the projected frame may be divided into regions, and each region may be rotated or rearranged, or the resolution of each region may be changed. That is, the region-wise packing process may indicate a process of mapping the projected frame to one or more packed frames. The region-wise packing process may be optionally performed. When the region-wise packing process is not applied, the packed frame and the projected frame may be the same. When the region-wise packing process is applied, each region of the projected frame may be mapped to a region of the packed frame, and metadata indicating the position, shape, shape, and the size of the region of the packed frame mapped to each region of the projected frame may be derived.

In FIGS. 8, (b) and 8 (c) illustrate examples of mapping each region of the projected frame is mapped to a region of the packed frame. Referring to (b) of FIG. 8, the 360-degree video data may be projected onto a 2D image (or frame) according to a panoramic projection scheme. Top, middle, and bottom regions of the projected frame may be rearranged as shown in the right figure via region-wise packing. Here, the top region may represent a top region of a panorama on the 2D image, the middle region may represent a middle region of the panorama on the 2D image, and the bottom region may represent a bottom region of the panorama on the 2D image. Referring to (c) of FIG. 8, the 360-degree video data may be projected onto a 2D image (or frame) according to a cubic projection scheme. Front, back, top, bottom, right, and left regions of the projected frame may be rearranged as shown in the right figure via region-wise packing. Here, the front region may represent a front region of a cube on the 2D image, and the back region may represent a back region of the cube on the 2D image. The top region may represent a top region of the cube on the 2D image, and the bottom region may represent a bottom region of the cube on the 2D image. The right region may represent a right region of the cube on the 2D image, and the left region may represent a left region of the cube on the 2D image.

In FIG. 8, (d) illustrates various 3D projection formats for projecting the 360-degree video data. Referring to (d) of FIG. 8, the 3D projection formats may include a tetrahedron, a cube, an octahedron, a dodecahedron, and an icosahedron. 2D projections shown in (d) of FIG. 8 may represent projected frames corresponding to 2D images resulting from the projection of 360-degree video data according to the 3D projection formats.

The foregoing projection formats are provided for illustrative purposes, and some or all of the following various projection formats (or projection schemes) may be used according to the present invention. A projection format used for a 360-degree video may be indicated, for example, through a projection format field of metadata.

Figure 9B:
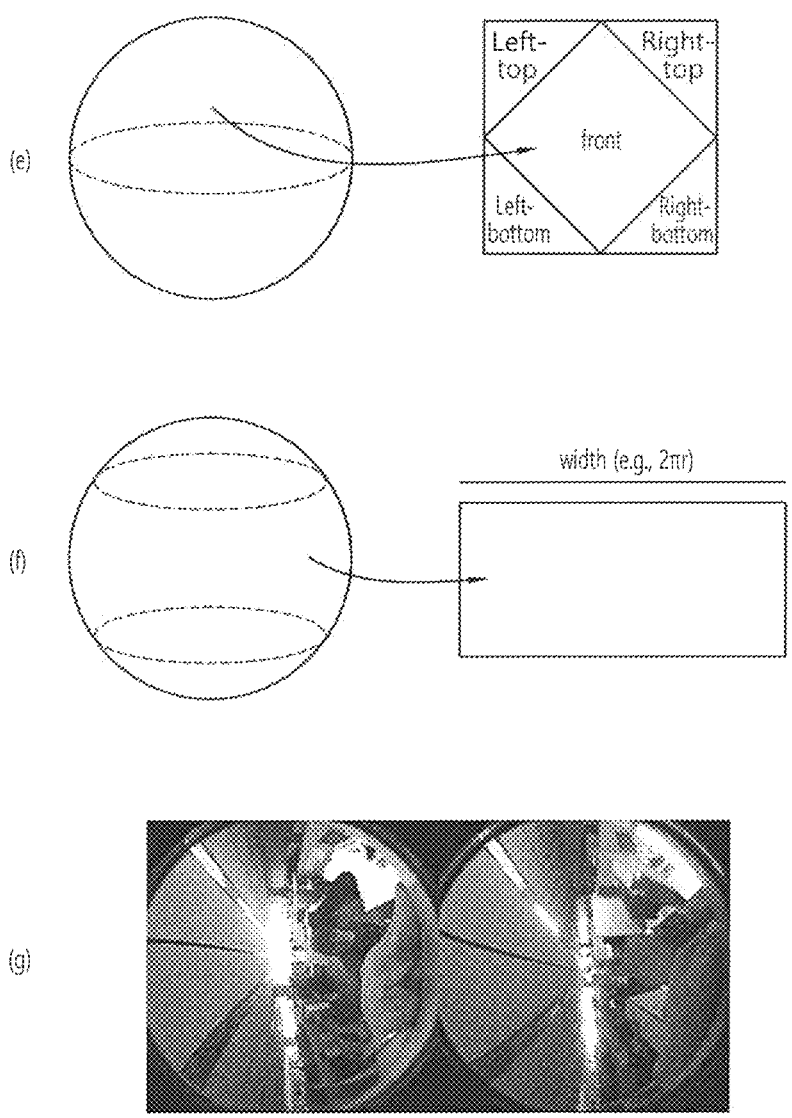

FIG. 9A and FIG. 9B illustrate projection formats according to the present invention.

In FIG. 9A, (a) illustrates an equirectangular projection format. When the equirectangular projection format is used, a point $(r, \theta_0, 0)$, that is, $\theta=\theta_0$ and $\varphi=0$, on the spherical surface may be mapped to a center pixel of a 2D image. Also, it may be assumed that a principal point of a front camera is a point $(r, 0, 0)$ on the spherical surface, and $\varphi_0=0$. Accordingly, a converted value $(x, y)$ on the XY coordinate system may be converted into a pixel $(X, Y)$ on the 2D image by the following equation.

$$X=K_x*x+X_O=K_X*(\theta-\theta_0)*r+X_O$$

$$Y=-K_Y*y-Y_O \qquad \text{[Equation 1]}$$

When a top left pixel of the 2D image is positioned at (0, 0) on the XY coordinate system, an offset for the x-axis and an offset for the y-axis may be represented by the following equation.

$$X_O=K_x*\pi*r$$

$$Y_O=-K_y*\pi/2*r \qquad \text{[Equation 2]}$$

Using these offsets, the equation for conversion onto the XY coordinate system may be modified as follows.

$$X=K_x x+X_O=K_x*(\pi+\theta-\theta_0)*r$$

$$Y=-K_y y-Y_O=K_y*(\pi/2-\varphi)*r \qquad \text{[Equation 3]}$$

For example, when $\theta_0=0$ that is, when the center pixel of the 2D image indicates data corresponding to $\theta=0$ on the spherical surface, the spherical surface may be mapped to an area defined by width=$2K_x\pi r$ and height=$K_x\pi r$ relative to (0, 0) on the 2D image. Data corresponding to $\varphi=\pi/2$ on the spherical surface may be mapped to an entire top side on the 2D image. Further, data corresponding to $(r, \pi/2, 0)$ on the spherical surface may be mapped to a point $(3\pi K_x r/2, \pi K_x r/2)$ on the 2D image.

A reception side may re-project 360-degree video data on a 2D image onto a spherical surface, which may be represented by the following equation for conversion.

$$\theta=\theta_0+X/K_x*r-\pi$$

$$\varphi=\pi/2-Y/K_y*r \qquad \text{[Equation 4]}$$

For example, a pixel defined by XY coordinates $(K_x\pi r, 0)$ on the 2D image may be re-projected into a point defined by $\theta=\theta_0$ and $\varphi=\pi/2$ on the spherical surface.

In FIG. 9A, (b) illustrates a cubic projection format. For example, stitched 360-degree video data may be represented on a spherical surface. A projection processor may divide the 360-degree video data in a cubic shape and may project the 360-degree video data onto a 2D image. The 360-degree video data on the spherical surface may be projected on the 2D image corresponding to each face of a cube as shown in the left figure or the right figure in (b) of FIG. 9A.

In FIG. 9A, (c) illustrates a cylindrical projection format. Assuming that stitched 360-degree video data may be represented on a spherical surface, the projection processor may divide the 360-degree video data in a cylindrical shape and may project the 360-degree video data onto a 2D image. The 360-degree video data on the spherical surface may be projected on the 2D image corresponding to a side face, a top face, and a bottom face of a cylinder as shown in the left figure or the right figure in (b) of FIG. 9A.

In FIG. 9A, (d) illustrates a tile-based projection format. When the tile-based projection scheme is used, the projection processor may divide 360-degree video data on a spherical surface into one or more subareas to be projected onto a 2D image as shown in (d) of FIG. 9A. The subareas may be referred to as tiles.

In FIG. 9B, (e) illustrates a pyramid projection format. Assuming that stitched 360-degree video data may be represented on a spherical surface, the projection processor may view the 360-degree video data as a pyramid shape and may divide the 360-degree video data into faces to be projected onto a 2D image. The 360-degree video data on the spherical surface may be projected on the 2D image corresponding to a front face of a pyramid and four side faces of the pyramid including a left-top, left-bottom, right-top, and right-bottom faces as shown in the left figure or the right figure in (e) of FIG. 9B. Herein, the bottom surface may be an area including data acquired by a camera that faces the front surface. Here, the front face may be a region including data acquired by a front camera In FIG. 9B, (f) illustrates a panoramic projection format. When the panoramic projection format is used, the projection processor may project only a side face of 360-degree video data on a spherical surface onto a 2D image as shown in (f) of FIG. 9B. This scheme may be the same as the cylindrical projection scheme except that there are no top and bottom faces.

According to the embodiment of the present invention, projection may be performed without stitching. In FIG. 9B, (g) illustrates a case where projection is performed without stitching. When projecting is performed without stitching, the projection processor may project 360-degree video data onto a 2D image as it is as shown in (g) of FIG. 9. In this case, without stitching, images acquired from respective cameras may be projected on a 2D image as it is.

Referring to (g) of FIG. 9B, two images may be projected onto a 2D image without stitching. Each image may be a fish-eye image acquired through each sensor of a spherical camera (or a fish-eye camera). As described above, a reception side may stitch image data acquired by camera sensors and may map the stitched image data onto a spherical surface, thereby rendering a spherical video, that is, a 360-degree video.

Figure 10A:
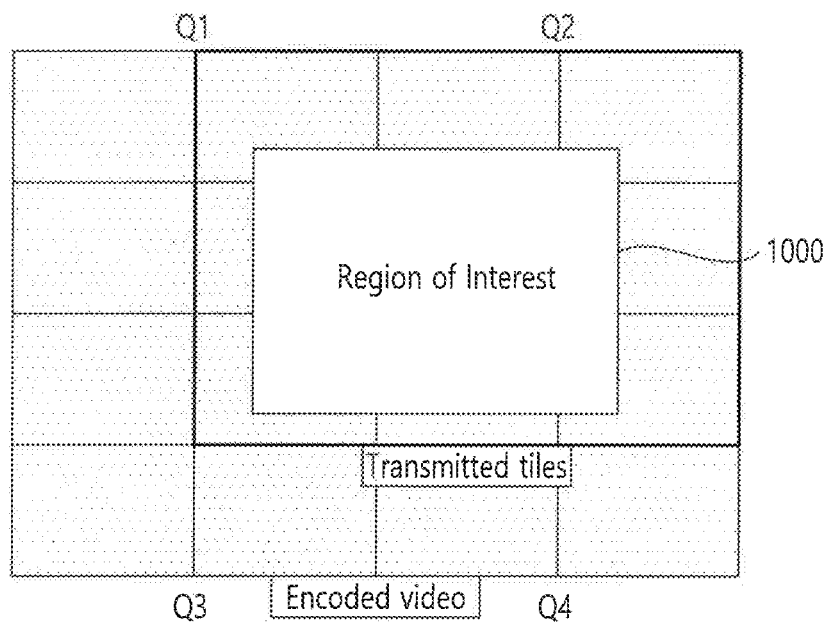
FIG. 10A and FIG. 10B illustrate a tile according to an embodiment of the present invention.
Figure 10B:
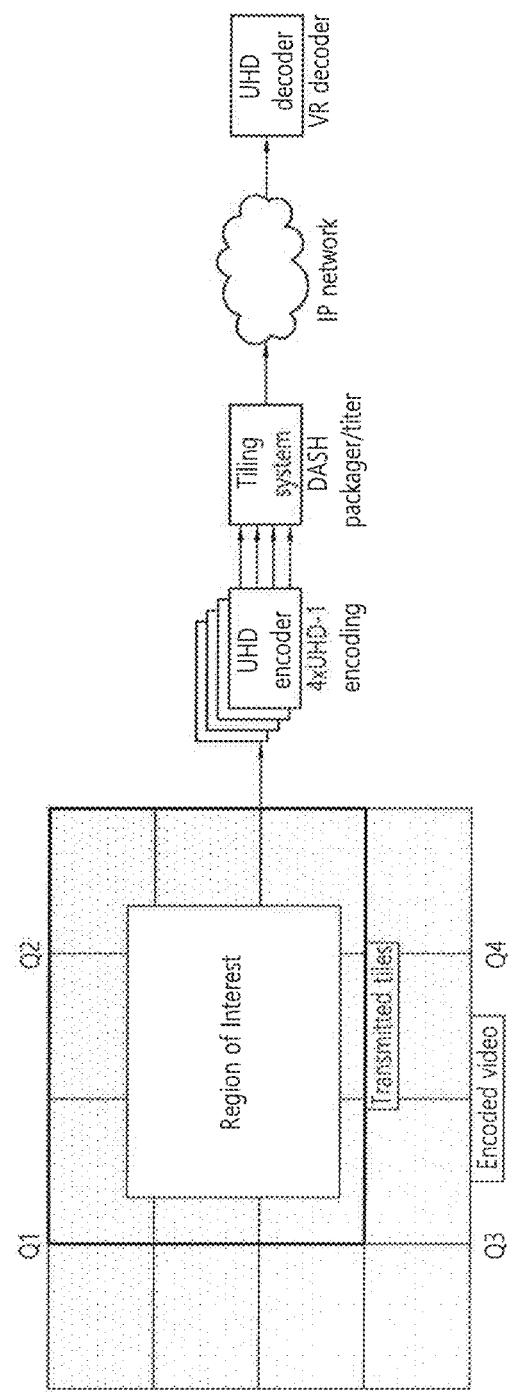

FIG. 10A and FIG. 10B illustrate a tile according to an embodiment of the present invention.

360-degree video data projected onto a 2D image or 360-degree video data subjected to up to region-wise packing may be divided into one or more tiles. FIG. 10a shows that one 2D image is divided into 16 tiles. Here, as described above, the 2D image may be a projected frame or a packed frame. In another embodiment of the 360-degree video transmission apparatus according to the present invention, the data encoder may independently encode each tile.

Region-wise packing described above and tiling may be distinguished. Region-wise packing described above may refer to a process of dividing 360-degree video data projected on a 2D image into regions and processing the divided regions in order to improve coding efficiency or to adjust resolutions. Tiling may refer to a process in which a data encoder divides a projected or packed frame into tiles and independently encodes each tile. When a 360-degree video is provided, a user does not consume all parts of the 360-degree video at the same time. Tiling may allow the user to transmit only a tile corresponding to an important part or a certain part, such as a viewport currently viewed by the user, to a reception side or to consume the tile with a limited bandwidth. Tiling enables efficient utilization of the limited bandwidth and makes it possible for the reception side to reduce operation loads as compared with the case of processing the entire 360-degree video data at one time.

Since a region and a tile are distinguished, these two areas do not need to be the same. In an embodiment, however, a region and a tile may refer to the same area. In an embodiment, when region-wise packing is performed in accordance with a tile, a region and a tile may be the same. Further, in an embodiment where each face and each region are the same according to the projection scheme, each face, each region, and each tile may refer to the same area according to the projection scheme. Depending on the context, a region may also be referred to as a VR region, and a tile may also be referred to as a tile region.

A region of interest (ROI) may refer to an area of interest from users proposed by a 360-degree content provider. When producing a 360-degree video, a 360-degree content provider may produce a 360-degree video in consideration of a particular area in which users are interested. In an embodiment, the ROI may correspond to an area in which an important part of the content of a 360-degree video is reproduced.

In another embodiment of the 360-degree video transmission/reception apparatus according to the present invention, the feedback processor of the reception side may extract and collect viewport information and may transmit the viewport information to the feedback processor of the transmission side. In this process, the viewport information may be transmitted using network interfaces of both sides. FIG. 10A shows a viewport 1000 in the 2D image. Here, the viewport may extend over nine tiles in the 2D image.

In this case, the 360-degree video transmission apparatus may further include a tiling system. In an embodiment, the tiling system may be located after the data encoder (in FIG. 10B), may be included in the data encoder or the transmission processor described above, or may be included as a separate internal/external element in the 360-degree video transmission apparatus.

The tiling system may receive the viewport information from the feedback processor of the transmission side. The tiling system may selectively transmit only a tile including a viewport area. Only nine tiles including the viewport area 1000 among a total of 16 tiles in the 2D image shown in FIG. 10A may be transmitted. Here, the tiling system may transmit the tiles in a unicast manner via a broadband, because the viewport area varies depending on the user.

In this case, the feedback processor of the transmission side may transmit the viewport information to the data encoder. The data encoder may encode the tiles including the viewport area with higher quality than that of other tiles.

Further, the feedback processor of the transmission side may transmit the viewport information to the metadata processor. The metadata processor may transmit metadata related to the viewport area to each internal element of the 360-degree video transmission apparatus or may include the metadata in 360-degree video-related metadata.

By using this tiling method, it is possible to save transmission bandwidths and to differently perform processing for each tile, thereby achieving efficient data processing/transmission.

The foregoing embodiments related to the viewport area may be similarly applied to specific areas other than the viewport area. For example, processing performed on the viewport area may be equally performed on an area determined as an area in which users are interested through the aforementioned gaze analysis, an ROI, and an area (initial viewpoint) that is reproduced first when a user views a 360-degree video through a VR display.

In another embodiment of the 360-degree video transmission apparatus according to the present invention, the transmission processor may perform transmission processing differently for each tile. The transmission processor may apply different transmission parameters (modulation orders or code rates) to each tile such that robustness of data delivered via each tile is changed.

Here, the feedback processor of the transmission side may deliver feedback information, received from the 360-degree video reception apparatus, to the transmission processor, and the transmission processor may perform transmission processing differentiated for tiles. For example, the feedback processor of the transmission side may deliver the viewport information, received from the reception side, to the transmission processor. The transmission processor may perform transmission processing on tiles including the viewport area to have higher robustness than that of other tiles.

FIG. 11 illustrates an example of 360-degree video-related metadata according to an embodiment of the present invention. As described above, the 360-degree video-related metadata may include various pieces of metadata about a 360-degree video. Depending on the context, the 360-degree video-related metadata may be referred to as 360-degree video-related signaling information. The 360-degree video-related metadata may be transmitted as being included in a separate signaling table, may be transmitted as being included in a DASH MPD, or may be transmitted as being included in the form of a box in a file format, for example, ISOBMFF. When the 360-degree video-related metadata is included in the form of a box, the 360-degree video-related metadata may be included in a variety of levels, such as a file, a fragment, a track, a sample entry, and a sample, and may include metadata about data of a corresponding level.

In some embodiments, a portion of the metadata to be described may be transmitted as being configured as a signaling table, and the remaining portion thereof may be included in the form of a box or a track in a file format.

In an embodiment of the 360-degree video-related metadata according to the present invention, the 360-degree video-related metadata may include basic metadata about projection schemes, stereoscopy-related metadata, initial-view/initial-viewport-related metadata, ROI-related metadata, field-of-view (FOV)-related metadata, and/or cropped-region-related metadata. In some embodiments, the 360-degree video-related metadata may further include metadata other than the above metadata.

Embodiments of the 360-degree video-related metadata according to the present invention may include at least one of the basic metadata, the stereoscopy-related metadata, the initial-view-related metadata, the ROI-related metadata, the FOV-related metadata, the cropped-region-related metadata, and/or additional possible metadata. Embodiments of the 360-degree video-related metadata according to the present invention may be variously configured depending on possible numbers of sub-metadata included therein. In some embodiments, the 360-degree video-related metadata may further include additional information in addition to the foregoing metadata.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, a projected 2D image may include only one mono view. In this case, the 360-degree video may not support 3D.

When the field has a value of 1 or 2, the 360-degree video may follow a left-right layout or a top-bottom layout. The left-right layout and the top-bottom layout may be referred to as a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on an image frame. When the field has other values, the values may be reserved for future use.

The initial-view-related metadata may include information about a view (initial viewpoint) that a user views when the 360-degree video is reproduced first. The initial-view-related metadata may include an initial_view_yaw_degree field, an initial_view_pitch_degree field, and/or an initial_view_roll_degree field. In some embodiments, the initial-view-related metadata may further include additional information.

The initial_view_yaw_degree field, the initial_view_pitch_degree field, and the initial_view_roll_degree field may indicate an initial viewpoint when the 360-degree video is reproduced. That is, the very center point of a viewport that is viewed first at the time of reproduction may be indicated by these three fields. Specifically, the initial_view_yaw_degree field may indicate the yaw value of the initial viewpoint. That is, the initial_view_yaw_degree field may indicate the position of the center point as the rotational direction (symbol) and the extent of rotation (angle) about the yaw axis. The initial_view_pitch_degree field may indicate the pitch value of the initial viewpoint. That is, the initial_view_pitch_degree field may indicate the position of the center point as the rotational direction (symbol) and the extent of rotation (angle) about the pitch axis. The initial_view_roll_degree field may indicate the roll value of the initial viewpoint. That is, the initial_view_roll_degree field may indicate the position of the center point as the rotational direction (symbol) and the extent of rotation (angle) about the roll axis. The initial viewpoint viewed when the 360-degree video is reproduced, that is, the very center point of the viewport that is viewed first at the time of reproduction may be indicated on the basis of the initial_view_yaw_degree field, the initial_view_pitch degree field, and the initial_view_roll_degree field, and accordingly a particular area of the 360-degree video may be displayed at the initial viewpoint for a user. The width and height of an initial viewport based on the indicated initial viewpoint may be determined through the FOV. That is, the 360-degree video reception apparatus may provide a user with a certain area of the 360-degree video as an initial viewport using these three fields and FOV information.

In some embodiments, the initial viewpoint indicated by the initial-view-related metadata may be changed for each scene. That is, the scenes of the 360-degree video may be changed with time according to 360-degree content. An initial viewpoint or an initial viewport which the user views first may be changed for every scene of the 360-degree video. In this case, the initial-view-related metadata may indicate an initial viewpoint for each scene. To this end, the initial-view-related metadata may further include a scene identifier identifying a scene to which the initial viewpoint is applied. In addition, since the FOV may be changed for each scene of the 360-degree vide, the initial-view-related metadata may further include scene-wise FOV information indicating an FOV corresponding to a scene.

The ROI-related metadata may include information related to an ROI. The ROI-related metadata may a 2d_roi_range_flag field and/or a 3d_roi_range_flag field. The 2d_roi_range_flag field may indicate whether the ROI-related metadata includes fields expressing an ROI on the basis of a 2D image, and the 3d_roi_range_flag field may indicate whether the ROI-related metadata includes fields expressing an ROI on the basis of a 3D space. In some embodiments, the ROI-related metadata may further include additional information, such as differential encoding information based on the ROI and differential transmission processing information based on the ROI.

When the ROI-related metadata includes fields expressing an ROI on the basis of a 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. These fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the width and the height of the ROT. That is, these fields may indicate the minimum value of the width, the maximum value of the width, the minimum value of the height, and the maximum value of the height, respectively.

The min_x field, the max_x field, the min_y field, and the max_y field may indicate the minimum/maximum values of coordinates in the ROI. These fields may indicate the minimum x coordinate, the maximum x coordinate, the minimum y coordinate, and the maximum y coordinate of coordinates in the ROI, respectively. These fields may be omitted.

When the ROI-related metadata includes fields expressing an ROI on the basis of coordinates in a 3D rendering space, the ROI-related metadata may include a min_yaw field, a max_yaw field, a min_pitch field, a max_pitch field, a min_roll field, a max_roll field, a min_field_of_view_field, and/or a max_field_of_view field.

The min_yaw field, the max_yaw field, the min_pitch field, the max_pitch field, the min_roll field, and the max_roll field may indicate an area that the ROI occupies in a 3D space as the minimum/maximum values of yaw, pitch, and roll. That is, these fields may indicate the minimum value of the reference amount of rotation about the yaw axis, the maximum value of the reference amount of rotation about the yaw axis, the minimum value of the reference amount of rotation about the pitch axis, the maximum value of the reference amount of rotation about the pitch axis, the minimum value of the reference amount of rotation about the roll axis, and the maximum value of the reference amount of rotation about the roll axis, respectively.

The min_field_of view field and the max_field_of view field may indicate the minimum/maximum values of the FOV of the 360-degree video data. The FOV may refer to a range of vision within which the 360-degree video is displayed at once when the video is reproduced. The min_field_of view field and the max_field_of view field may indicate the minimum value and the maximum value of the FOV, respectively. These fields may be omitted. These fields may be included in the FOV-related metadata to be described.

The FOV-related metadata may include information related to the FOV. The FOV-related metadata may include a contentlov_flag field and/or a content_fov field. In some embodiments, the FOV-related metadata may further include additional information, such as information about the minimum/maximum values of the FOV.

The contentfov_flag field may indicate whether information about the FOV of the 360-degree video intended at the time of production exists. When the value of this field is 1, the content_fov field may exist.

The content_fov field may indicate information about the FOV of the 360-degree video intended at the time of production. In some embodiments, a portion of the 360-degree video that is displayed to a user at once may be determined on the basis of the vertical or horizontal FOV of the 360-degree video reception apparatus. Alternatively, in some embodiments, the portion of the 360-degree video that is displayed to the user at once may be determined in consideration of FOV information in this field.

The cropped-region-related metadata may include information about an area that includes actual 360-degree video data in an image frame. The image frame may include an active video area, in which actual 360-degree video data is projected, and an inactive video area. Here, the active video area may be referred to as a cropped area or a default display area. The active video area is an area that is seen as a 360-degree video in an actual VR display. The 360-degree video reception apparatus or the VR display may process/display only the active video area. For example, when the aspect ratio of the image frame is 4:3, only an area of the image frame, excluding a portion of the upper part and a portion of the lower part of the image frame, may include the 360-degree video data. This area may be the active video area.

The cropped-region-related metadata may include an is_cropped_region field, a cr_region_left_top_x field, a cr_region_left_top_y field, a cr_region_width field, and/or a cr_region_height field. In some embodiments, the cropped-region-related metadata may further include additional information.

The is_cropped_region field may be a flag indicating whether the entire area of the image frame is used by the 360-degree video reception apparatus or the VR display. Here, an area mapped to the 360-degree video data or an area seen on the VR display may be referred to as an active video area. That is, the is_cropped_region field may indicate whether the entire image frame is the active video area. When only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the width of the active video area, and the height of the active video area, respectively. The width and the height may be expressed in pixels.

A 360-degree-video-based VR system may provide a visual/auditory experience of a 360-degree video in different viewing orientations relative to the position of a user on the basis of 360-degree video processing described above. A VR system that provides a visual/auditory experience of a 360-degree in different viewing orientations relative to the fixed position of a user may be referred to as a three-degree-of-freedom (3DoF) VR system. A VR system that can provide an extended visual/auditory experience in different viewing orientations relative to different viewpoints and different viewing positions may be referred to as a 3DoF+ or 3DoF-plus VR system.

Figure 12:
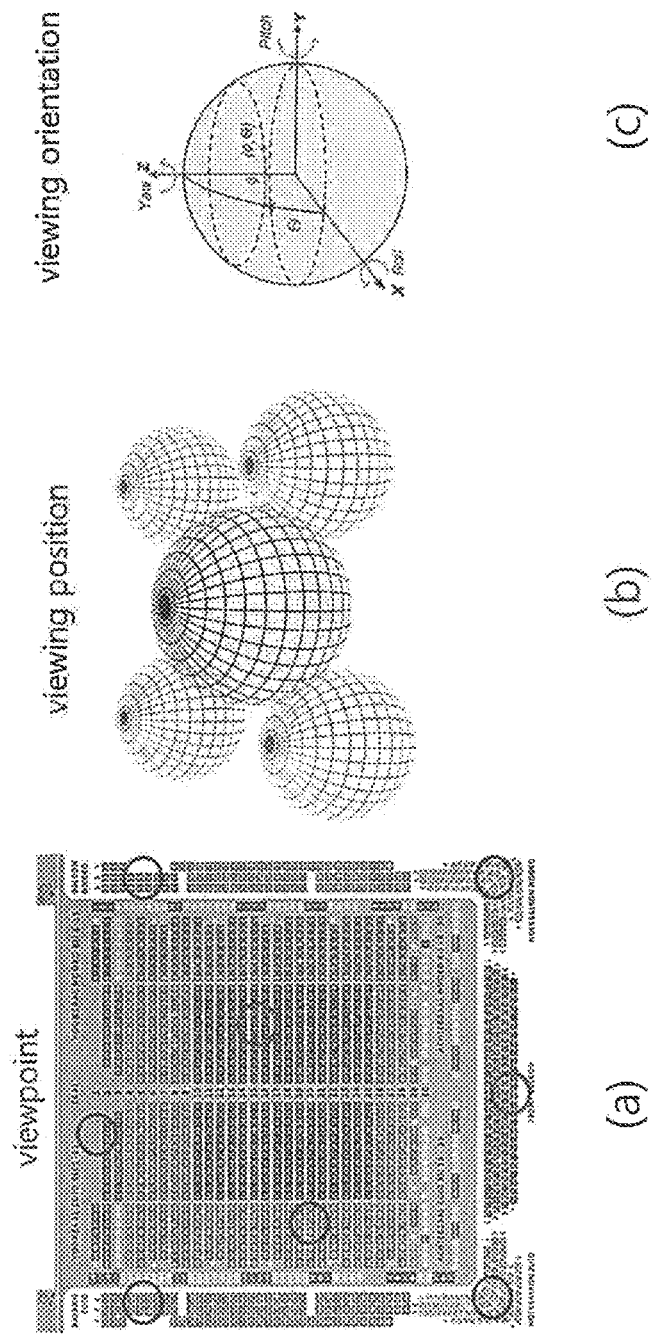
FIG. 12 schematically illustrates the concept of a viewpoint, a viewing position, and a viewing orientation.

FIG. 12 schematically illustrates the concept of a viewpoint, a viewing position, and a viewing orientation.

Referring to FIG. 12, in a space (e.g., a concert hall) illustrated in (a), each circle may represent a different viewpoint. Images/sounds provided at separate viewpoints in the same space may be related to each other at the same time. In this case, different visual/auditory experiences may be provided for a user according to the change in the direction of the user's gaze (e.g., the head motion) at a particular viewpoint. That is, as shown in (b), it is possible to assume spheres at various viewing positions with respect to the particular viewpoint and to provide image/sound/text information reflecting the relative position of each viewing position.

As shown in (c), at a particular viewing position at a specific viewpoint, it is possible to transmit visual/auditory information in various directions as in a conventional 3DoF. Here, not only a main source (e.g., image/sound/text) but also various additional sources may be provided in an integrated manner, in which case information may be transmitted in connection with or independently of the viewing orientation of the user.

Figure 13:
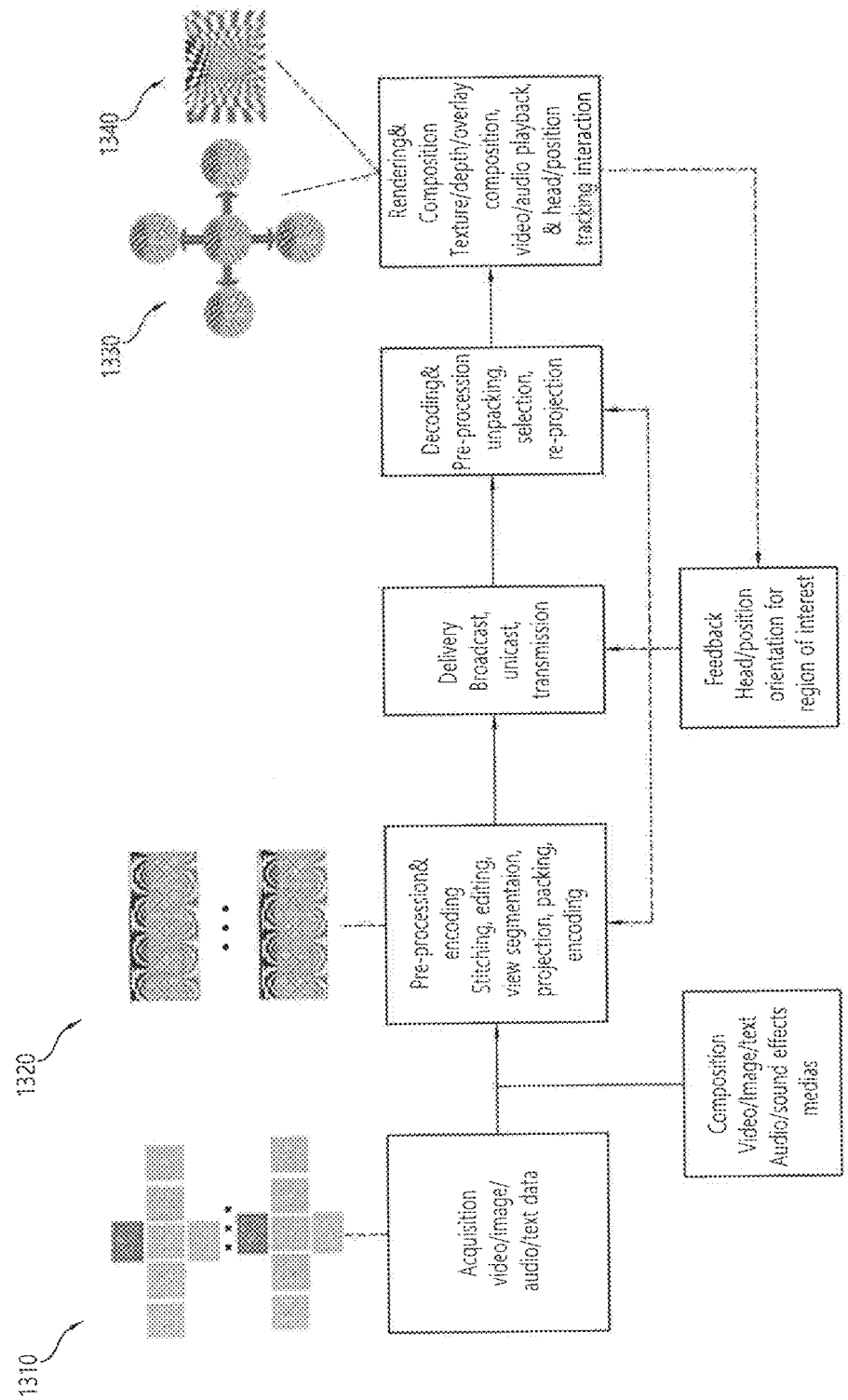
FIG. 13 schematically illustrates an example of architecture for providing a 3DoF+ video according to the present invention.

FIG. 13 schematically illustrates an example of architecture for providing a 3DoF+ video according to the present invention. FIG. 13 illustrates a flowchart of a 3DoF+ end-to-end system including 3DoF+ image acquisition, pre-processing, delivery, (post)processing, rendering, and feedback processes.

Referring to FIG. 13, the acquisition process may refer to a process of acquiring a 360-degree video via a process of capturing, composing, or generating a 360-degree video. Through this process, it is possible to acquire a plurality of pieces of image/sound information according to the gaze direction change (e.g., head motion) at a plurality of positions. The image information may include not only visual information (e.g., texture) but also depth information. Here, as shown in image information 1310, a plurality of pieces of information at different viewing positions according to different viewpoints may be acquired.

The composition process may include a procedure and a method for composing not only information obtained via an image/sound input device but also an image (video/image), a sound (audio/sound effect), and text (subtitles) via external media to be included for user experiences.

The pre-processing process may be a preparation (pre-processing) process for transmission/delivery of an acquired 360-degree video and may include stitching, projection, region-wise packing, and/or encoding processes described above. That is, this process may include a pre-processing process and an encoding process for changing/supplementing image/sound/text information according to a producer's intent. For example, an image pre-processing process may include a stitching operation of mapping obtained visual information onto a 360-degree sphere, an editing operation of blurring a boundary between areas, reducing the difference in color/brightness, or applying a visual effect to an image, a view segmentation operation of separating an image according to a viewpoint, a projection operation of mapping an image on a 360-degree sphere to a 2D image, a region-wise packing operation of rearranging an image according to areas, and an encoding operation of compressing image information. As illustrated in a video 1320, a plurality of projected images at different viewing positions according to different viewpoints may be generated.

The delivery process may be a process of processing and delivering image/sound data and metadata, which have been subjected to the preparation process (pre-processing process). To deliver a plurality of pieces of image/sound data at different viewing positions according to different viewpoints and relevant metadata, a broadcast network or a communication network may be used as described above, or a unidirectional delivery method may be used.

The post-processing and composition process may be a post-processing process for decoding and finally reproducing received/stored video/audio/text data. For example, as described above, the post-processing may include an unpacking process of unpacking a packed image and a re-projection process of restoring a 2D projected image into a 3D spherical image.

The rendering process may be a process of rendering and displaying re-projected image/video data on a 3D space. In this process, an image/sound signal may be reconstructed in a form for final output. It is possible to trace viewing orientation, a viewing position/head position, and a viewpoint where a user's ROI exists and to selectively use only necessary image/sound/text information according to this information. Here, for an image signal, different viewpoints may be selected according to the user's ROI as indicated by 1330, and an image in a particular orientation at a particular viewpoint at a particular position may be finally output as indicated by 1340.

Figure 14A:
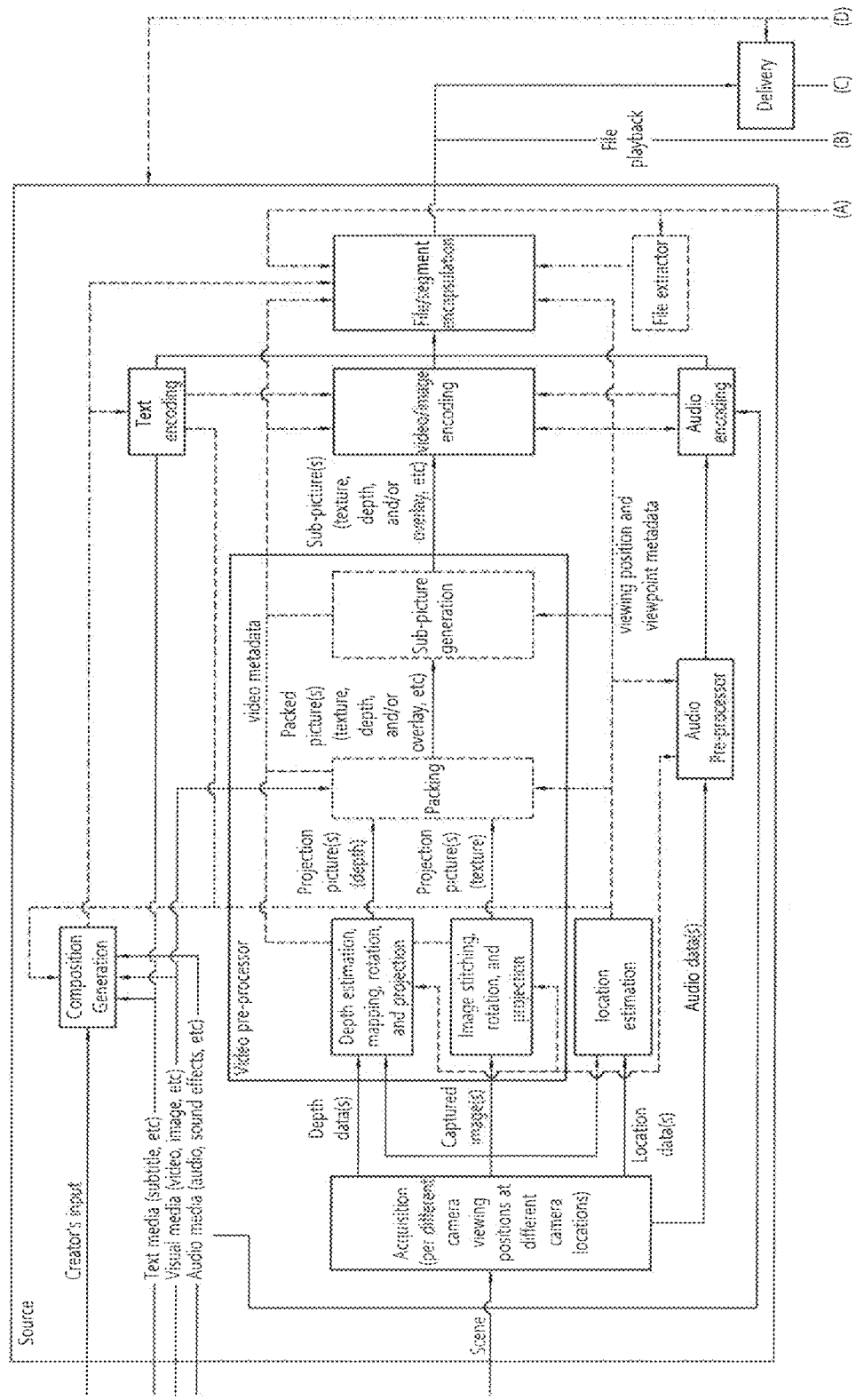
FIG. 14A and FIG. 14B illustrate an example of architecture of a 3DoF+ end-to-end system.
Figure 14B:
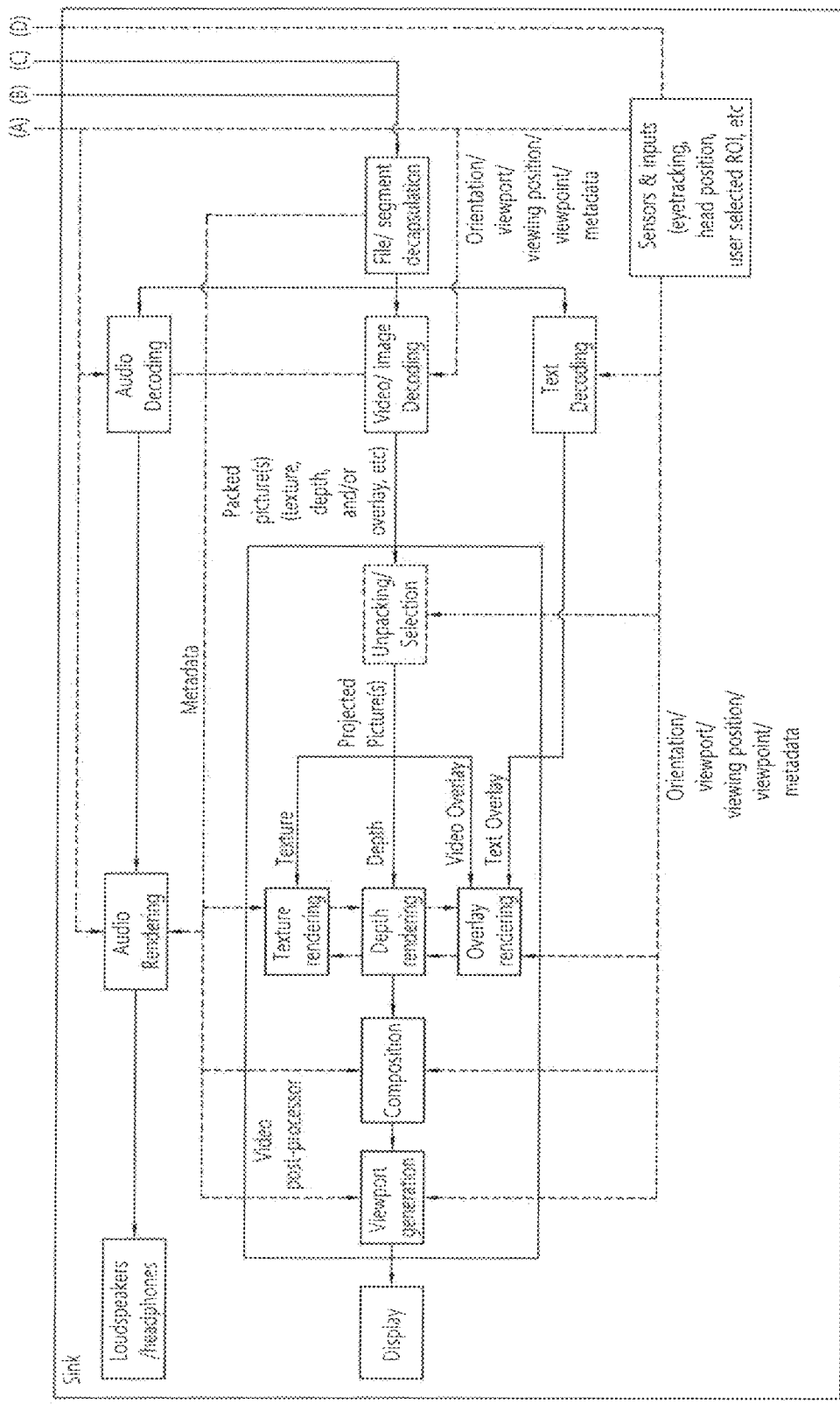

FIG. 14A and FIG. 14B illustrate an example of architecture of a 3DoF+ end-to-end system. It is possible to provide 3D0F+ 360-degree content described above by the architecture illustrated in FIG. 14A and FIG. 14B.

Referring to FIG. 14A, a 360-degree video transmission apparatus (transmission side) may generally include an acquisition unit to acquire 360-degree video (image)/audio data, a video/audio pre-processor to process acquired data, a composition generation unit to compose additional information, an encoding unit to encode text, a sound, and a projected 360-degree video, and an encapsulation unit to encapsulate encoded data. As described above, encoded data may be output in a bitstream form, and may be encapsulated in a file format, such as ISOBMFF or CFF, or may be processed in the form of a DASH segment. The encoded data may be transmitted to a 360-degree video reception apparatus through a digital storage medium. Alternatively, although not explicitly shown, the encoded data may be subjected to processing for transmission by a transmission processor and may then be transmitted over a broadcast network or broadband.

The data acquisition unit may acquire different pieces of information simultaneously or continuously depending on the orientation of a sensor (a viewing orientation for an image), the information acquisition time of the sensor (sensor position, a viewing position for an image), and the information acquisition position of the sensor (viewpoint for an image), in which case a video, an image, a sound, and position information may be acquired.

In the case of image data, texture information and depth information may be acquired and can be subjected different types of video pre-processing according to the characteristics of each component. For example, for texture information, it is possible to construct a 360-degree omnidirectional image using images in different viewing orientations at the same viewing position acquired at the same viewpoint using image sensor position information, for which an image stitching process may be performed. Further, it is possible to perform projection and/or region-wise packing to change the image into a format for encoding. For a depth image, an image may generally be acquired using a depth camera. In this case, a depth image may be constructed in the same manner as for texture. Alternatively, depth data may be generated on the basis of separately measured data. After an image for each component is generated, additional conversion into a video format for efficient compression (packing) or sub-picture generation for separating and reconstructing actually necessary parts may be performed. Information about image configuration used in a video pre-processor is transmitted via video metadata.

When additionally provided image/sound/text information is served in addition to the acquired data (or data for a main service), it is necessary to provide information for composing these pieces of information for final reproduction. The composition generation unit generates information for composing externally generated media data (a video/image for an image, audio/sound effect for a sound, and subtitles for text) in a final reproduction unit on the basis of a producer's intent, and this information is transmitted via composition metadata.

The processed image/sound/text information is compressed using respective encoders and is encapsulated in files or segments according to the application. Here, it is possible to extract only necessary information (file extractor) according to the video, file, or segment configuration method.

Further, information for reconstructing each data in a receiver is delivered in a codec or file format/system level and includes video/audio reconfiguration information (video/audio metadata), composition metadata for an overlay, and information about a video/audio reproduction position and a viewpoint according to each position (viewing position and viewpoint metadata). The foregoing information may also be processed by a separate metadata processor.

Referring to FIG. 14B, a 360-degree video reception apparatus (reception side) may generally include a file/segment decapsulation unit, a decoding unit to generate image/sound/text information from a bitstream, a post-processor to reconstruct an image/sound/text into a form for reproduction, a tracking unit to track a user's ROI, and a display as a reproduction device.

A bitstream generated via decapsulation may be separated into an image/sound/text according to the type of data, and the image/sound/text may be individually decoded into a form for reproduction.

The tracking unit may generate information about the viewpoint of a user's ROI, a viewing position, and a viewing orientation on the basis of sensor and user input information, and this information may be used for each module of the 360-degree video reception apparatus to select or extract an ROI or may be used for post-processing to emphasize information about an ROI. Further, when this information is transmitted to a 360-degree video transmission apparatus, the information may be used to select a file extractor or a sub-picture in order to effectively use a bandwidth or may be used for various image reconstruction methods (viewport/viewing position/viewpoint-dependent processing) based on an ROT.

A decoded image signal may be processed by various processing methods according to an image construction method. When image packing is performed in a 360-degree video transmission apparatus, it is necessary to reconstruct an image on the basis of information transmitted via metadata. In this case, video metadata generated by the 360-degree video transmission apparatus may be used. Further, when a decoded image includes images at a plurality of viewpoints, at a plurality of viewing positions, or in a plurality of viewing orientations, it is possible to select and process information matching position, viewpoint, and orientation information about the user's ROI generated through tracking. Here, a viewing position and viewpoint-related metadata generated by the transmission side may be used. Also, when a plurality of components with respect to a particular position, viewpoint, or orientation is delivered or video information for an overlay is separately transmitted, a separate rendering process may be included. Video data (texture, depth, and an overlay), which has been subjected to a separate rendering process, may be subjected to composition, in which composition metadata generated by the transmission side may be used. Finally, information for reproduction on a viewport may be generated according to the user's ROT.

A decoded sound signal may generate a reproducible sound signal through an audio renderer and/or post-processing. Here, information to suit user needs may be generated on the basis of the information about the user's ROI and metadata transmitted to the 360-degree video reception apparatus.

A decoded text signal may be transmitted to an overlay renderer and may be processed as text-based overlay information, such as a subtitle. If necessary, separate text post-processing may be included.

Figure 15:
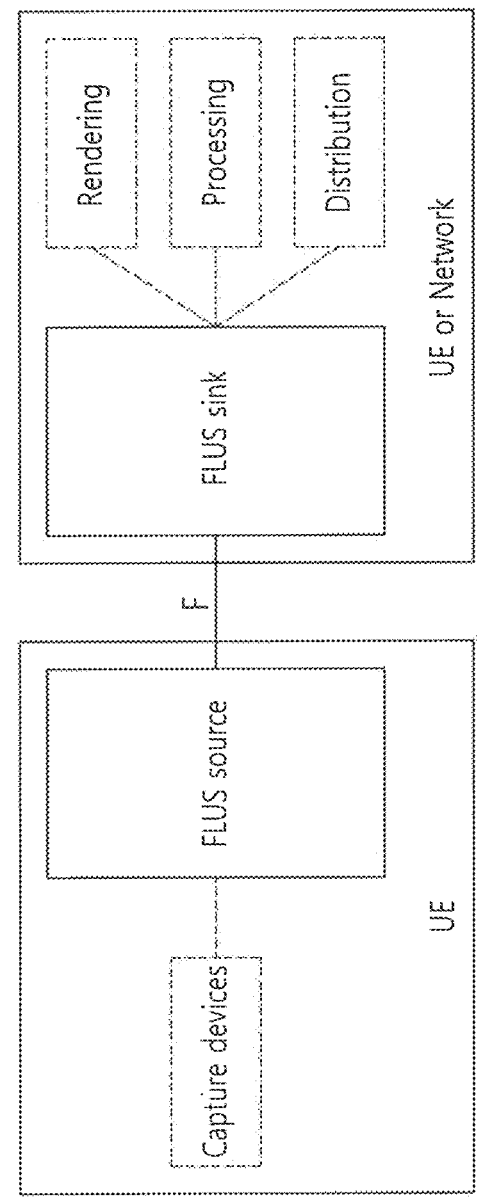
FIG. 15 schematically illustrates an example of Framework for Live Uplink Streaming (FLUS) architecture.

FIG. 15 schematically illustrates an example of Framework for Live Uplink Streaming (FLUS) architecture.

Specific blocks of the transmission side and the receiver side described above in FIG. 14A and FIG. 14B may be classified as source and sink functions, respectively, in FLUS.

When the specific blocks of the transmission side and the receiver side are classified as the source and sink functions in FLUS, source functions may be implemented in a 360-degree video acquisition apparatus and sink functions may be implemented in a network, as illustrated in FIG. 14A and FIG. 14B, or a source/sink may be implemented respectively in network nodes.

Figure 16:
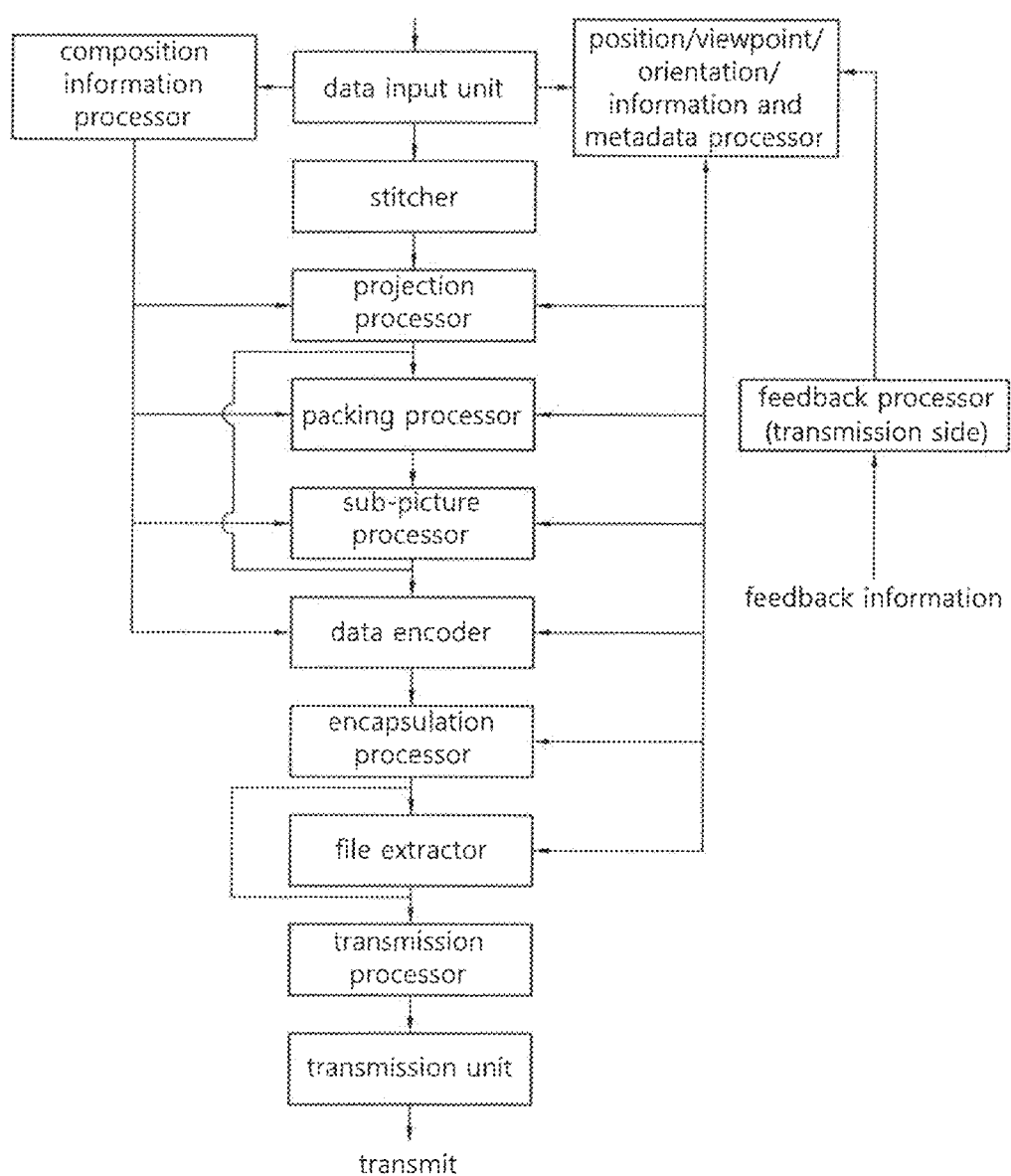
FIG. 16 schematically illustrates the configuration of a 3DoF+ transmitter.

A processing process for transmission/reception based on the foregoing architecture may be schematically illustrated, for example, in FIG. 15 and FIG. 16. The processing process for transmission/reception illustrated in FIG. 15 and FIG. 16 is based on an image signal processing process for reference. When processing a different signal, such as a sound or text, some parts (e.g., a stitcher, a projection processor, a packing processor, a sub-picture processor, unpacking/selection, rendering, composition, viewport generation, and the like) may be omitted or may be modified in accordance with a sound or text processing process.

FIG. 16 schematically illustrates the configuration of a 3DoF+ transmitter.

Referring to FIG. 16, when input data is a camera output image, the transmitter (360-degree video transmission apparatus) may perform stitching for constructing a sphere image by positions/viewpoints/components. When a sphere image per position/viewpoint/component is constructed, the sphere image may be projected into a 2D image for coding. It is possible to perform packing for rendering a plurality of images into an integrated image or to perform sub-picture generation for dividing an image into images in subareas according to an application. As described above, region-wise packing is an optional process and may thus not be performed, in which case a packing processor may be omitted. When input data is additional image/sound/text information, a method for additionally displaying additional information in a central image may be indicated, and additional data may also be transmitted. An encoding process of compressing the generated image and the additional data to generate a bitstream may be performed, and then an encapsulation processor for conversion into a file format for transmission or storage may be performed. Here, a process of extracting a file required by a receiver may be performed upon request from an application or a system. The generated bitstream may be converted into a transmission format and may then be transmitted by a transmission processor. Here, a feedback processor of the transmitter may process position/viewpoint/orientation information and necessary metadata on the basis of information transmitted from a receiver and may transmit the information and the metadata to a related transmission unit.

Figure 17:
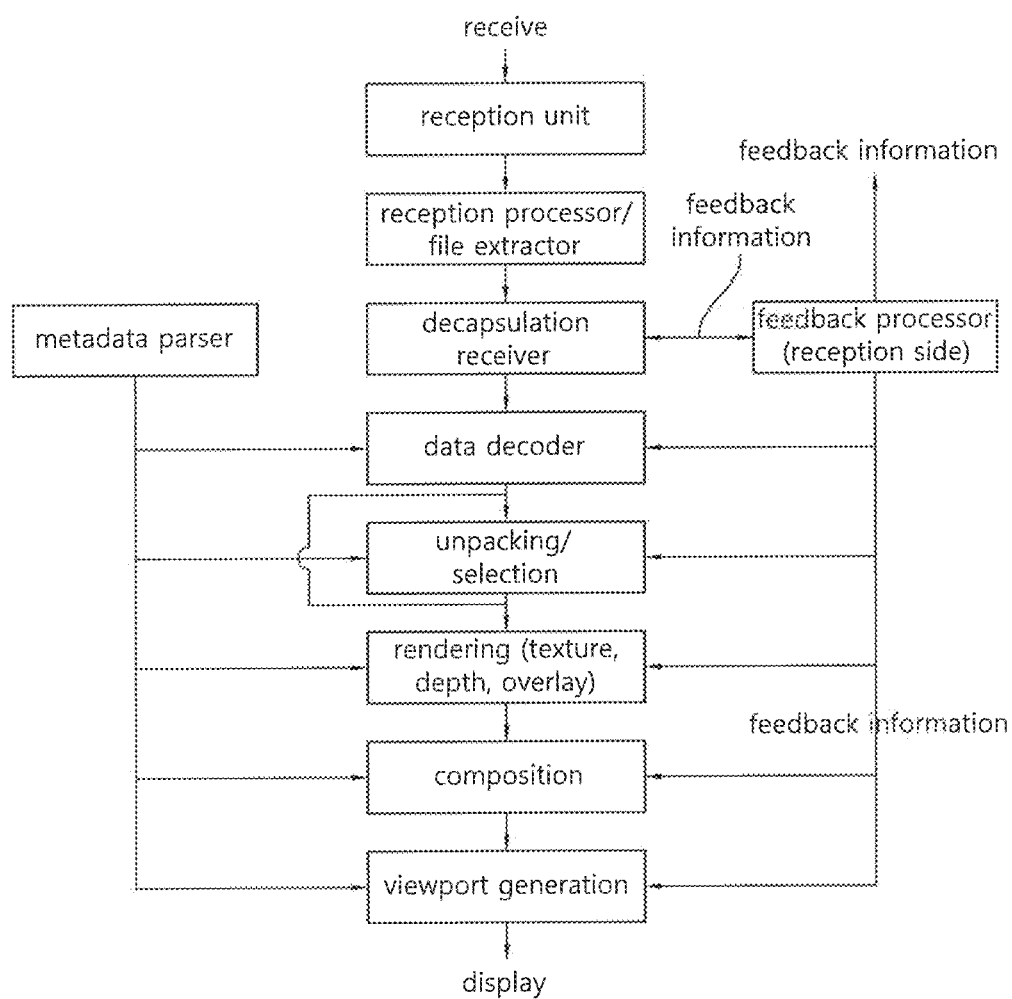
FIG. 17 schematically illustrates the configuration of a 3DoF+ receiver.

FIG. 17 schematically illustrates the configuration of a 3DoF+ receiver.

Referring to FIG. 17, the receiver (360-degree video reception apparatus) may receive a bitstream transmitted by a transmitter and may extract a necessary file. An image stream in the format of the generated fife may be selected using position/viewpoint/orientation information and video metadata transmitted from a feedback processor, and the selected bitstream may be reconstructed into image information via a decoder. A packed image may be unpacked on the basis of packing information transmitted via metadata. When the transmitter omits a packing process, the receiver may omit unpacking. Further, if necessary, a process of selecting an image suitable for a viewpoint/viewing position/viewing orientation transmitted from the feedback processor and a necessary component may be performed. A rendering process of reconstructing texture, depth, and overlay information of an image into a format suitable for reproduction may be performed. Before generating a final image, a composition process of integrating information of different layers may be performed, and an image suitable for a display viewport may be generated and reproduced.

The present disclosure provides an image overlay method for a 360-degree video (including VR or augmented reality (AR)). In the case of a 360-degree video, a user can see an image/video/reality (if see-through) while changing the position/orientation 360 degrees and may thus be exposed more content. Additional information about a particular position of 360-degree content may be immediately displayed on a user viewport, in which case a connection between the additional information and the connected position may be broken. In this case, the user needs to find the position of the information displayed on the viewport.

In order to intuitively show the particular position and the corresponding additional information together, the matching additional information may be superimposed on the particular position, or the additional information may be displayed near the particular position matching the additional information and a line may be drawn to indicate that the information is the information of the particular position. To this end, a 360-degree video overlay needs to support a method for designating not only a user viewport but also the position of an overlay to exist in a 3D space. The present invention provides an image overlay support method for a 360-degree video. The present invention may be applied not only to a 3DoF VR system but also to a 3DoF+ VR system and may also be applied to an AR system.

The present disclosure provides a method of storing and signaling information for supporting an overlay as described below. The information for supporting the overlay may be delivered in the form of overlay-related metadata. The overlay-related metadata may be referred to as overlay metadata. The information for supporting the overlay may be delivered to a data encoder and/or an encapsulation processor through a data input unit and/or a metadata processor of a transmission side and may be transmitted to a reception side via transmission processing. In this case, relevant information may be transmitted in a bitstream. The bitstream may be referred to as a video stream or a video bitstream. The reception side may extract a necessary file from the transmitted bitstream, may extract overlay-related metadata through a capsulation processor and a metadata parser, may transmit the overlay-related metadata to a renderer, may render an overlay using the renderer, and may subject the overlay to composition, thereby outputting the overlay on a screen.

Since not considering a 360-degree 3D space, an image overlay for a 2D image/video has different characteristics from those of an overlay for a 360-degree video and cannot be directly applied to a 360-degree video. For example, overlays may be classified into the following three types according to the (rendering/region) type of an overlay: 1) an overlay on a viewport; 2) an overlay on a spherical region; and 3) an overlay in a 3D space (inside a sphere). Here, the overlay on the viewport may be referred to as a viewport-relative overlay, the overlay on the spherical region may be referred to as a sphere-relative projected omnidirectional overlay, and the overlay in the 3D space (inside the sphere) may be referred to as a sphere-relative 2D overlay. An image as an overlay in the 3D space (inside the sphere) may be a 2D plane image. According to the present invention, various relevant metadata may be signaled according to the type of each overlay and may include information about the position and order of overlays. Hereinafter, an overlaid object may be referred to as various terms, such as overlay content, overlay (visual) media, overlay texture, (overlay) graphic, an overlay region, an overlay image, an overlay video, overlay text, or an overlay.

Figure 18:
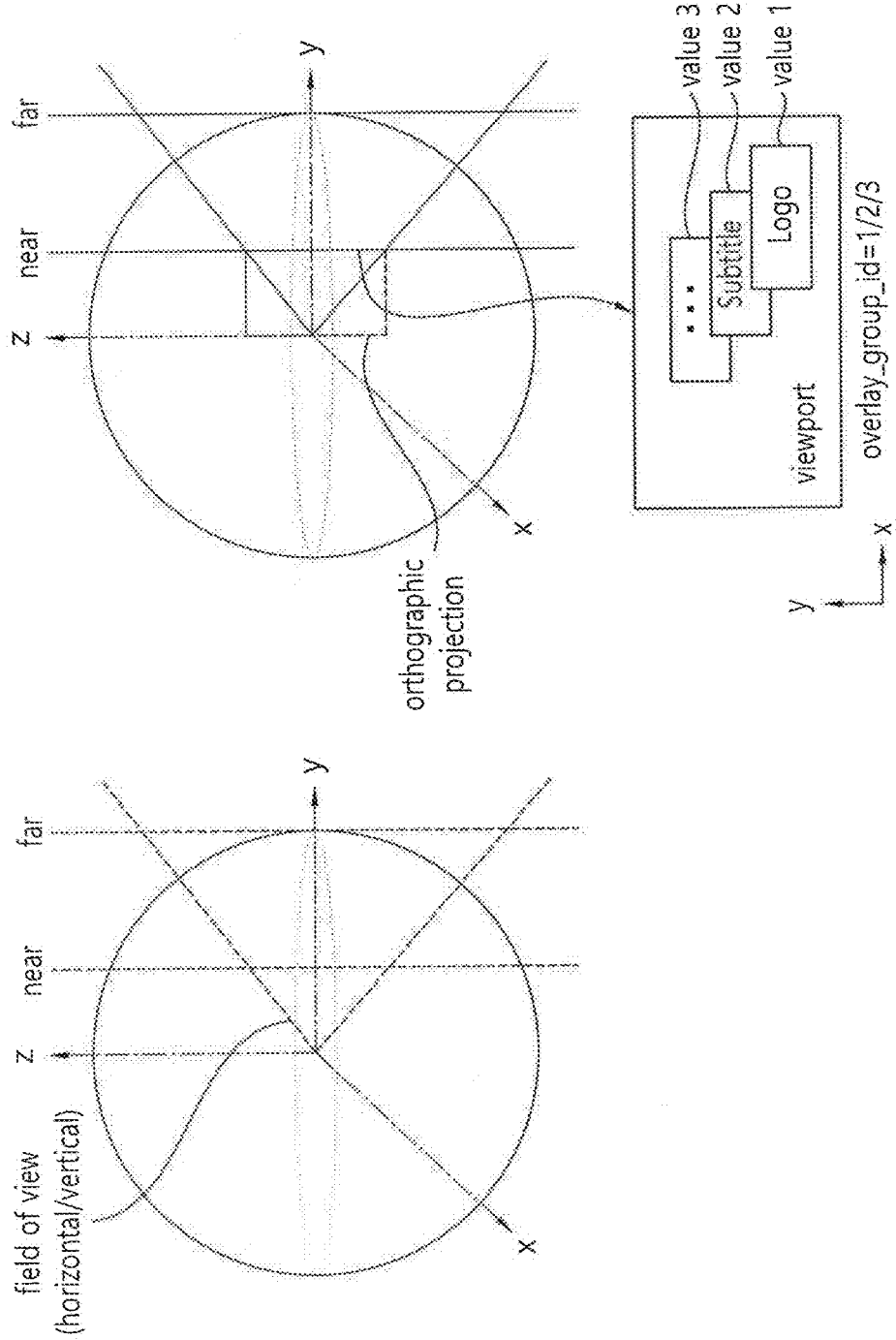

FIG. 18 to FIG. 20 illustrate overlay positions according to the overlay type. Specifically, for example, FIG. 18 illustrates a viewport-relative overlay that is overlay media being overlaid on a viewport. FIG. 19 illustrates a spherical-relative 2D overlay that is overlay media being overlaid in a space inside a sphere. FIG. 20 illustrates a sphere-relative projected omnidirectional overlay that is an overlay image being overlaid on a spherical region.

For example, overlay-related metadata may be generated to support an overlay according to the present invention. The generated overlay-related metadata may be transmitted along with other metadata as being included in 360-degree video/image data. The overlay-related metadata may include overlay type information illustrated above and information about the region, depth, order, and/or properties (opacity, interaction, and the like) of overlays (overlay content, overlay texture, an overlay image, or the like). The information about the region may indicate the position and/or size of an overlay in a sphere surface, a projected picture, or a packed picture.

The overlay-related metadata may be transmitted from a transmission apparatus to a reception apparatus by various methods.

In one example, the overlay-related metadata may be transmitted as an overlay timed metadata track. To this end, an overlay timed metadata track may be defined. An overlay timed metadata track may be linked with one or more media tracks.

Figure 21:
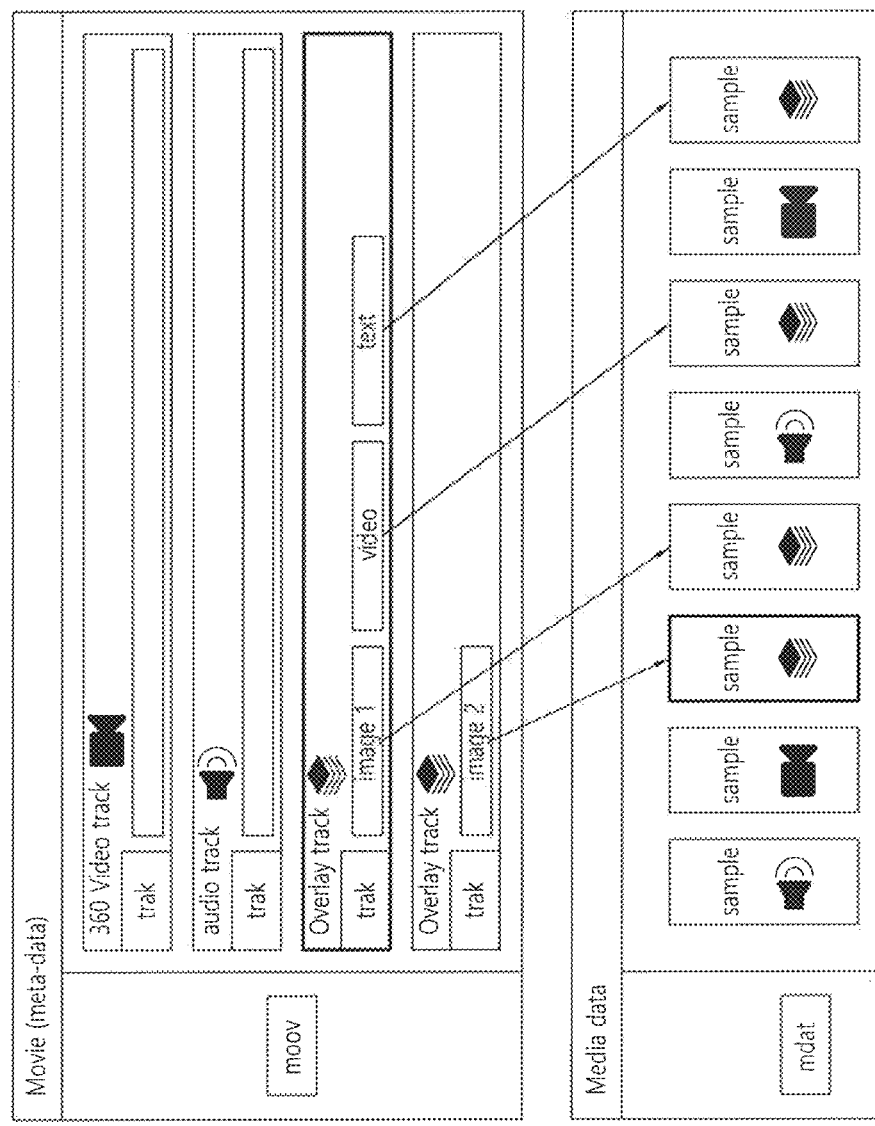
FIG. 21 illustrates an example of storing an overlay track and display time information in a sample.

In another example, the overlay-related metadata may be transmitted in the form of an overlay track and time information in a sample. To this end, an overlay track may be defined. FIG. 21 illustrates an example of storing an overlay track and display time information in a sample.

Figure 22:
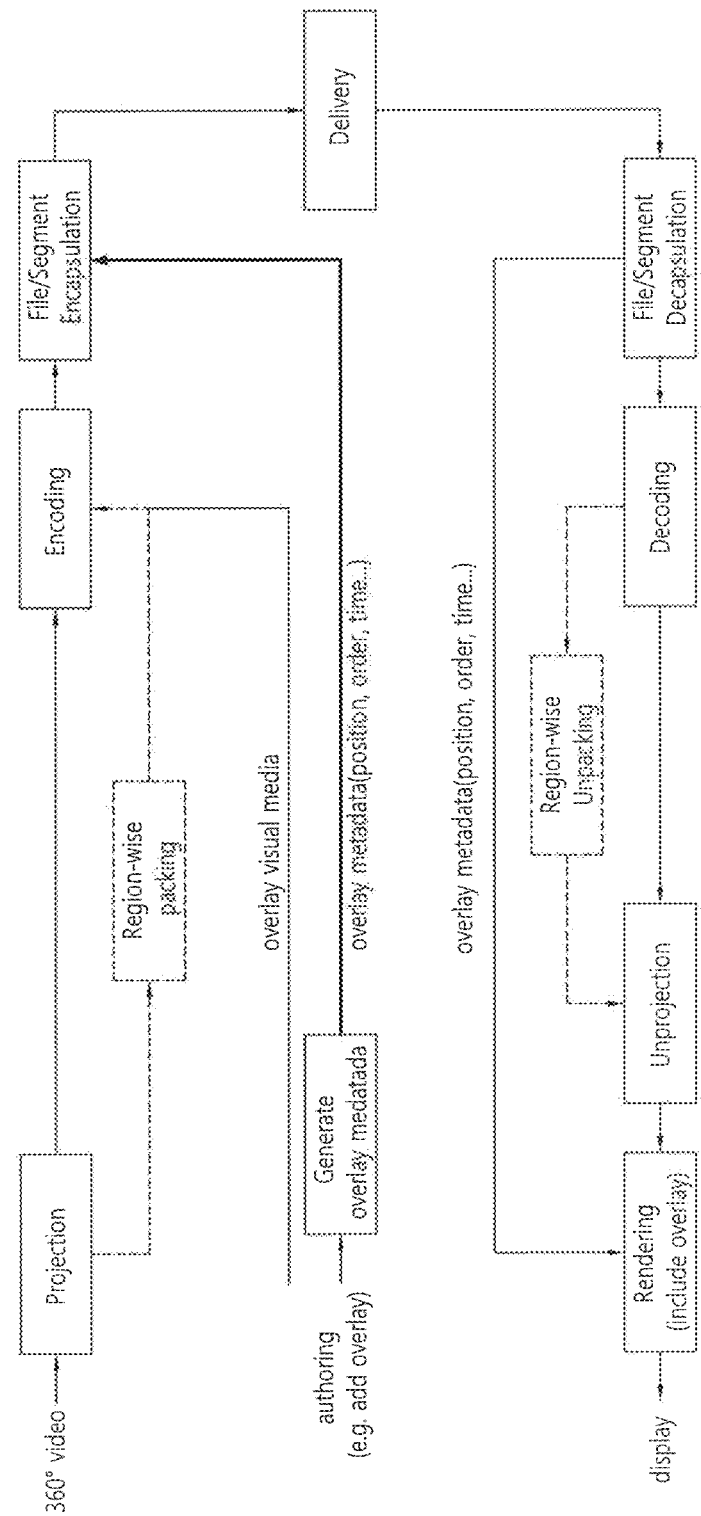
FIG. 22 schematically illustrates a 360-degree video transmission/reception method based on overlay-related metadata.

FIG. 22 schematically illustrates a 360-degree video transmission/reception method based on overlay-related metadata.

Referring to FIG. 22, as described above, a 360-degree video transmission apparatus may perform a projection procedure for a 360-degree video and, if necessary, a region-wise packing procedure, thereby obtaining a 2D picture. The 2D picture may be encoded into a bitstream through an encoding procedure.

Overlay (visual) media for an overlay may be additionally encoded through the encoding procedure, and overlay-related metadata may be generated, and may be encapsulated together with the output of the encoding procedure into a media file to be transmitted to a 360-degree video reception apparatus. Alternatively, the overlay media may be stored in advance in the 360-degree video reception apparatus or may be received by the 360-degree video reception apparatus from a separate entity over a network.

The 360-degree video reception apparatus receives a 360-degree video data file and acquires a 360-degree video-related bitstream (encoded 360-degree video information), an overlay media-related bitstream (encoded overlay video information), and metadata through a decapsulation procedure. The 360-degree video reception apparatus may decode the 2D picture related to a 360-degree images/video by performing a decoding procedure on the basis of the 360-degree video-related bitstream (encoded 360-degree video information). The 2D picture may be a projected picture or a packed picture. Further, the 360-degree video reception apparatus may decode the overlay media (image) on the basis of the overlay media-related bitstream (encoded overlay video information). When rendering the 360-degree image/video on the basis of the overlay-related metadata, the 360-degree video reception apparatus may perform rendering by superimposing the overlay media (image) in a particular area in a particular order.

For example, one file (360-degree video data file) may include VR media (including a 360-degree video), media (a video, an image, text, graphic, a sound, or the like) overlaid on the VR media, and overlay-related metadata. Hereinafter, VR media may be referred to as main VR media, VR main media, main media, background (visual) media, or a 360-degree video/image, and media overlaid on VR media may be referred to as overlay (visual) media.

Figure 23:
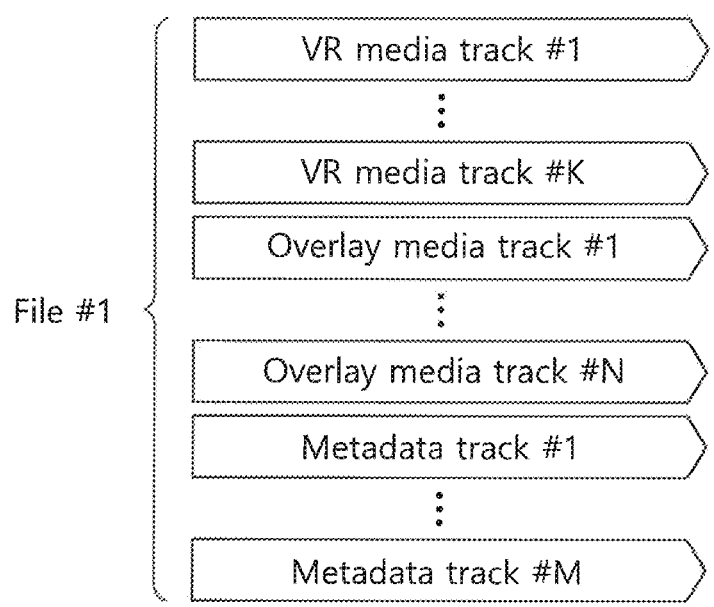
FIG. 23 illustrates an example in which VR media, overlay media, and overlay-related metadata are included in one file.

FIG. 23 illustrates an example in which VR media, overlay media, and overlay-related metadata are included in one file.

A VR media track may include the entirety or part of one piece of media (e.g., a VR (360-degree) video). For example, one sub-picture track may include only an image/video corresponding to a portion of the entire 360-degree video. That is, one piece of VR media may be included in one or more media tracks. An overlay media track may include one or more overlay media and/or metadata associated with the overlay media.

A metadata track may include one or more pieces of metadata associated with a media track. For example, a metadata track may include metadata associated with VR media (e.g., the initial viewing orientation and a recommended viewport of the VR media) or overlay-related metadata (the position and properties of overlay media).

Further, a VR media track may include the entirety or part of VR media and overlay media. In this case, a metadata track may include metadata about the VR media and/or overlay-related metadata.

Main VR media and overlay media may be included as separate tracks in a file. In this case, the main VR media and the overlay media may be identified as one group.

Figure 24:
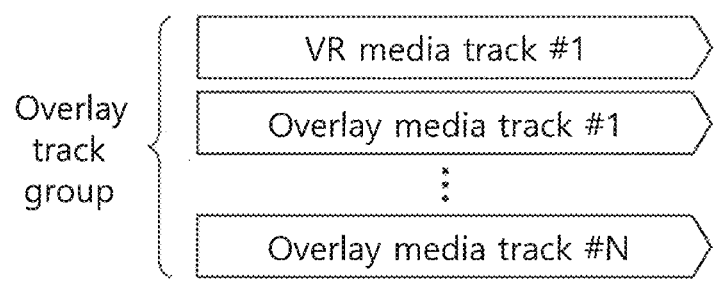
FIG. 24 illustrates an example of grouping a VR media track and an overlay media track.

FIG. 24 illustrates an example of grouping a VR media track and an overlay media track.

One VR media track may be grouped together with one or more overlay media tracks. In this case, overlay-related metadata may include group information. A track may include the group information, and the group information may be included in the form of a group box and may include, for example, information illustrated in Table 1.

TABLE 1

```
Aligned(8) class OverlayVideoGroupBox extends
TrackGroupTypeBox('ovgr ) {
        unsigned int(5) media_type;
        unsigned int(1) main_media_flag;
        unsigned int(1) overlay_media_flag;
        if ((media_type == 1 )|| (overlay_media_flag)){
                unsigned int(1) overlay_essential_flag;
        }else
                bit(1) reserved = 0;
}
```

A media_type field may indicate the type of media in a track group. For example, this field may indicate whether current media included in a track is main media (when the media_type value is 0) or overlay media (when the media_type value is 1).

A main_media_flag field is a flag field indicating whether current media is main media. The main_media_flag field equal to 1 may indicate that the current media is main media, and the main_media_flag field equal to 0 may indicate that the current media is not main media.

An overlay_media_flag field is a flag field indicating whether current media is overlay media. The overlay_media_flag equal to 1 may indicate that the current media is overlay media, and the overlay_media_flag equal to 0 may indicate that the current media is not overlay media.

An overlay_essential_flag field is a flag field indicating whether corresponding overlay media needs to be essentially overlaid. The overlay_essential_flag field equal to 1 may indicate that the corresponding overlay media needs to be essentially overlaid, and the overlay_essential_flag field equal to 0 may indicate that the corresponding overlay media does not need to be essentially overlaid. When overlay media that needs to be essentially overlaid is included, a player device not supporting an overlay may not reproduce main media in the same group.

The group box may include, for example, TrackGroupTypeBox or EntityToGroupBox. For example, TrackGroupTypeBox or EntityToGroupBox may be included in a track header. Tracks having the same group ID may be classified as the same group. For example, TrackGroupTypeBox having Track_group_type equal to 'ovgr' may refer to a track group including main VR media and overlay media, which may indicate a set of tracks that can be rendered or presented, for example, overlaid, together in a 360-degree scene. Tracks having the same track_group_id can be rendered, for example, overlaid, together in a 360-degree scene. Accordingly, it is possible for a player to conveniently retrieve main media and overlay media. For example, EntityToGroupBox having grouping type equal to 'ovbg' may refer to a track group including main VR media and overlay media.

When main VR media and overlay media are included as separate tracks in a file, reference information between the main VR media and the overlay media may be included.

Figure 25:
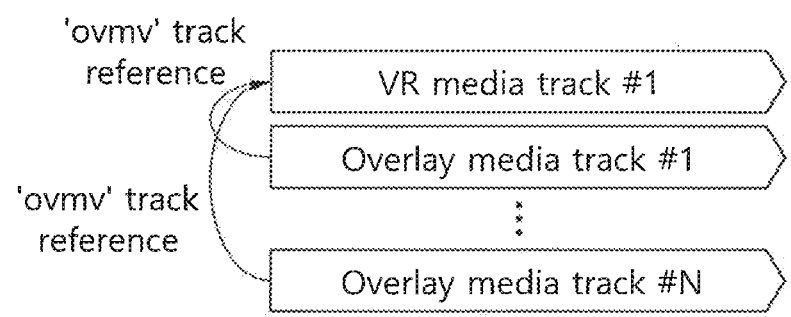
FIG. 25 illustrates an example of the reference relationship between a VR media track and an overlay media track.

FIG. 25 illustrates an example of the reference relationship between a VR media track and an overlay media track.

Reference information of an overlay media track may be used to indicate main VR media (background media) on which overlay media is to be overlaid. The reference information may be included in the form of a reference box and may include, for example, information illustrated in Table 2.

TABLE 2

```
aligned(8) class TrackReferenceBox extends Box('tref') {
}
aligned(8) class TrackReferenceTypeBox (unsigned int(32)
reference_type) extends Box {
        unsigned int(32) track_IDs[ ];
}
```

A track_ID field may have an integer value and may indicate a different track which a track including this field needs to use for reference in presentation. For example, track_ID may not be reused and may not be 0.

reference_type may indicate one of one or more types. For example, when reference_type is 'ovmv', a track(s) indicated by Track_ID(s) may be a main media track(s) on which current overlay media is overlaid.

For example, it is possible to indicate the main VR media on which the overlay media is overlaid using TrackReferenceTypeBox of the overlay media track. To this end, a reference type equal to 'ovmv' may be used and one or more main VR media track identifiers or a track group identifier (if the main VR media is transmitted through one or more tracks) may be indicated in track_IDs, thereby indicating the main media (background media) on which the overlay media is to be overlaid.

The main VR media and the overlay media may be included in the same track. In this case, the track may include SampleToGroupBox having grouping_type equal to 'ovmv'.

SampleToGroupBox may indicate samples that need rendering (including overlaying) together among samples included in the track.

When the track includes SampleToGroupBox having grouping_type equal to 'ovmv', SampleGroupDescriptionBox having grouping_type equal to 'ovmv' may be present. In this case, the following information commonly applied to the samples rendered (or overlaid) together may be included. A sample group entry having grouping_type equal to 'ovmv' (hereinafter, "OverlayEntry") may include the following information.

TABLE 3

```
class OverlayEntry( ) extends SampleGroupDescriptionEntry('ovmv') {
        unsigned int(32) overlay_essential_flag;
}
```

An overlay_essential_flag field is a flag field indicating whether overlay media needs to be essentially overlaid. When overlay media to be essentially overlaid is included, a player that does not support overlaying the overlay media may not reproduce associated main media (background media) in the same group.

One sample may include VR media and overlay media. In this case, the one sample may be divided into sub-samples, each of which may include the VR media or the overlay media. In this case, a box including sub-sample information may include an indicator indicating whether the sub-sample includes the overlay media and the main VR media and/or a flag indicating whether the overlay media needs to be essentially overlaid.

The foregoing overlay-related metadata may include, for example, some or all of overlay-related information illustrated in Table 4.

TABLE 4

Identifier of overlay metadata (overlay_id)
Information indicating whether overlay media needs to be essentially overlaid
    If overlay media needs to be essentially overlaid, a player not supporting an overlay may not reproduce corresponding VR media.
Priority in overlaying overlay media (overlay_priority)
Information about position where overlay media is overlaid (OverlayPosStruct0)
    Position information type (e.g., whether overlay media is displayed on a user viewport, is positioned in a 3D space, or is positioned on a sphere) and position information according to position information type
    Rotation information: origin of rotation and rotation information based on origin if rotation is involved and overlay media has different origin from that of main media
    Depth or order
Information applicable to display/rendering when overlaying overlay media
    Transparency
    Opacity
    Need for blending
    Blending type if blending is necessary Here, the overlay priority information indicates the priorities of overlays. When the player does not have sufficient decoding capacity to decode all overlays, overlays may be decoded according to the priorities. For example, it is possible to indicate that a player needs to support an overlay or that a corresponding overlay needs to be essentially displayed or presented through overlay essential flag information (overlay_essential_flag), and/or it is possible to indicate that a corresponding overlay needs to be essentially displayed or presented using priority information (overlay_priority) equal to 0. In another example, when the overlay essential flag information is equal to 1, the priority information is equal to 0, but the player does not support an overlay, the player may be prevented from displaying not only overlay media but also main media.

The overlay position information type may indicate one of overlay types including the foregoing three overlay types. The foregoing three overlay types include a viewport-relative overlay type in which overlay media is overlaid on a viewport, a spherical-relative projected omnidirectional overlay type in which overlay media is overlaid on a spherical region, and a spherical-relative 2D overlay type in which overlay media is overlaid in a 3D space inside a sphere. Position information according to the position information type (overlay type) may indicate a region/position where an overlay is rendered. The depth of an overlay may indicate the depth value (or Z value) of a region in which the overlay is rendered. For example, information about the depth of an overlay may be included when the type of the overlay is a spherical-relative projected omnidirectional overlay type. An overlay order may indicate an overlay layering order. For example, an overlay order may indicate the layering order of overlays having a viewport-relative overlay type or the layering order of overlays having the same depth value. Opacity indicates an opacity level applied to an overlay. For example, a value of 0 may indicate fully transparent, and a value of 100 may indicate completely opaque. Blending may be alpha composition-based blending, and a blending type/mode may include a source-over type/mode. The source-over type/mode indicates a mode in which a source is positioned on a destination.

For example, the overlay-related metadata may include OverlayinfoStruct( ) and OverlayinfoStruct( ) may carry overlay-related information. OverlayinfoStruct( ) may be referred to as OverlayStruct( ) an overlay information structure field, or an overlay structure field. Table 5 shows an example of OverlayinfoStruct( ).

TABLE 5

```
aligned(8) OverlayInfoStruct( ) {
    unsigned int(32)    overlay_id;
    unsigned int(1)     overlay_essential_flag;
    unsigned int(7)     overlay_priority;
    OverlayPosStruct( );
    OverlayRenderStruct( );
}
```

An overlay_id field indicates the identifier of overlay-related metadata.

An overlay_essential_flag field indicates whether current overlay media needs to be essentially displayed (rendered/presented).

An overlay_priority field indicates the overlay priority of overlay media.

OverlayPosStruct( ) may carry information about a position where overlay media is overlaid, and OverlayRenderStruct( ) may carry information applicable to overlay-based display/rendering of overlay media.

TABLE 6

```
aligned(8) OverlayPosStruct( ) {
    unsigned int(8) region_type;
    if (region_type == 0) {
        ViewportOverlayRegion( );
    } else if (region_type == 1) {
        SphereOverlayRegion( );
    } else if (region_type ==2) {
        3DOverlayRegion( );
    }
}
```

TABLE 7

```
aligned(8) OverlayRenderStruct( ) {
    unsigned int(1) opacity_info_flag;
    unsigned int(1) blending_flag;
    unsigned int(6) reserved=0;
    if(opacity_info_flag)
        unsigned int(8) opacity;
    if(blending_flag)
        unsigned int(8) blending_type;
}
```

In Table 6, region_type indicates the type of information about a position where overlay media is overlaid. For example, region_type may indicate one of overlay types including the foregoing three overlay types. The foregoing three overlay types include a viewport-relative overlay type in which overlay media is overlaid on a viewport, a spherical-relative projected omnidirectional overlay type in which overlay media is overlaid on a spherical surface, and a spherical-relative 2D overlay type in which overlay media is overlaid in a 3D space inside a sphere.

OverlayRenderStruct( ) may include position information (area information) about overlay media according to the overlay type. OverlayRenderStruct( ) may also include rotation information, depth, and/or order of overlay media.

In Table 7, an opacity_info_flag field indicates whether there is opacity information about an overlay. The opacity field indicates opacity applied to the overlay. For example, a value of 0 may indicate fully transparent, and a value of 100 may indicate completely opaque.

A blending_flag field indicates whether blending is applied to an overlay. A blending_type field indicates a blending type or mode when blending is applied to an overlay. For example, the blending may be alpha composition-based blending, and the blending type/mode may include a source-over type/mode. The source-over type/mode indicates a mode in which a source is positioned on a destination.

The foregoing overlay-related metadata may be signaled, for example, by the following method.

OverlayConfigBox may be included in a sample entry of an overlay media track. Through this, it is possible to signal that the media track includes overlay media and to signal overlay media-related metadata included in the track.

TABLE 8

```
class OverlayConfigBox extends FullBox('ovcf', 0, 0) {
    unsigned int(8) overlay_count;
    for (i=0;i<overlay_count;i++) {
        OverlayInfoStruct( );
    }
}
```

An overlay_count field may indicate the number of pieces of overlay media included in each sample of the overlay media track or the maximum number of pieces of overlay media included in the sample. This information may be used to prepare the maximum number of pieces of media that the player overlays on a main video or the maximum composition capabilities (composition layers) of the player or to determine whether the player can process or render the overlay media track.

OverlayInfoStruct( ) may include the foregoing overlay-related metadata. This information may be applied to the overlay media included in the sample of the track.

The overlay media track may include a SampleToGroupBox having grouping_type equal to 'ovgr'. SampleToGroupBox may indicate samples to which the same overlay metadata is applied among the samples included in the track.

When there is SampleToGroupBox having grouping_type equal to 'ovgr' in the track, SampleGroupDescriptionBox having grouping_type equal to 'ovgr' may be present and the following information commonly applied to the samples may be included. For example, a sample group entry having grouping_type equal to 'ovgr' (hereinafter, OverlayGroupEntry) may be defined as follows.

TABLE 9

```
class OverlayGroupEntry( ) extends SampleGroupDescriptionEntry
('ovmm') {
    OverlayInfoStruct( );
}
```

OverlayInfoStruct( ) may include overlay-related metadata to be applied to samples included in a group.

The overlay media track may include OverlayConfigBox in the sample entry and may also SampleToGroupBox and OverlayGroupEntry( ) having grouping_type equal to 'ovgr'. In this case, overlay-related metadata included in overlay media samples associated with OverlayGroupEntry( ) may be applied.

Overlay-related metadata may be stored as a separate metadata track for transmission in order to support overlay media that changes in overlay position or rendering properties over time. In this case, the overlay-related metadata may be dynamically signaled. A corresponding overlay media metadata track may include one or more samples, and each sample may include one or more pieces of overlay metadata. Each sample may include one or more pieces of OverlayInfoStruct.

Figure 26:
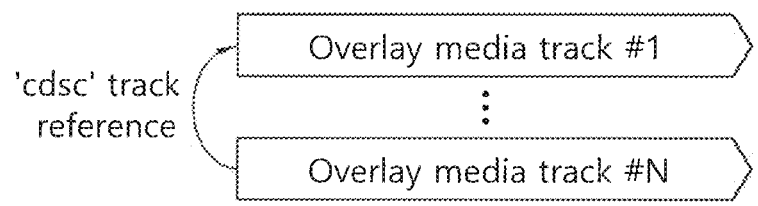
FIG. 26 illustrates an example of indicating an overlay media track associated with overlay-related metadata via track reference.

An overlay media track may be indicated using TrackReferenceTypeBox of an overlay metadata track. That is, it is possible to indicate an overlay media track associated with overlay-related metadata by assigning a reference type value of 'cdsc' and indicating one or more overlay media track identifiers or a track group identifier (when overlay media is transmitted through one or more tracks) in track IDs. FIG. 26 illustrates an example of indicating an overlay media track associated with overlay-related metadata via track reference.

It may be necessary to link overlay-related metadata with other metadata. For example, a particular area (ROI) of VR media may be overlaid on the VR media. To this end, when there are a separate overlay-related metadata track and a metadata track of the VR media including a recommended viewport, it is necessary to signal the relationship between the overlay-related metadata track and the metadata track of the VR media.

Figure 27:
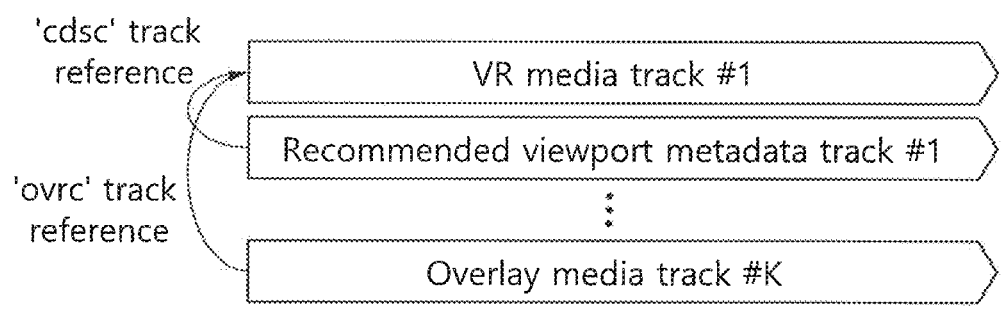
FIG. 27 illustrates an example of signaling the relationship between an overlay-related metadata track and a different metadata track.

FIG. 27 illustrates an example of signaling the relationship between an overlay-related metadata track and a different metadata track.

For example, a metadata track (recommended viewport metadata track) to which overlay-related metadata is applied may be indicated using TrackReferenceTypeBox of an overlay-related metadata track. To this end, a new reference type may be added, that is, a reference type equal to 'ovrc' and one or more metadata track (recommended viewport metadata track) identifiers may be indicated, thereby indicating a metadata track to which overlay metadata is applied.

TABLE 10

```
aligned(8) class TrackReferenceBox extends Box('tref') {
}
aligned(8) class TrackReferenceTypeBox (unsigned int(32)
reference_type) extends Box {
    unsigned int(32) track_IDs[ ];
}
```

In another example, when there are a separate overlay metadata track and a metadata track of VR media including a recommended viewport, it is possible to signal the relationship between the overlay metadata track and the metadata track of the VR media.

Figure 28:
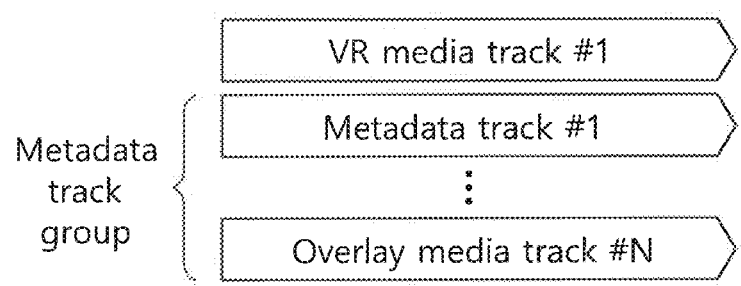
FIG. 28 illustrates another example of signaling the relationship between an overlay-related metadata track and a different metadata track.

FIG. 28 illustrates another example of signaling the relationship between an overlay-related metadata track and a different metadata track.

For example, TrackGroupTypeBox having Track_group_type equal to 'mtgr' may indicate a metadata track group, such as an overlay, applied together to media in a 360-degree scene. This information may indicate that tracks, such as an overlay, having the same track_group_id may be applied and processed together in a 360-degree scene.

TABLE 11

```
Aligned(8) class MetadataGroupBox extends
TrackGroupTypeBox('mtgr') {
    unsigned int(7)  metadata_type;
    unsigned int(1)  metadata_essential_flag;
}
```

A metadata type field may indicate the type of metadata. For example, this field may indicate whether metadata is recommended viewpoint metadata (e.g., when metadata_type is equal to 0) or overlay metadata (e.g. when metadata_type is equal to 1).

A metadata_essential_flag field is a flag field indicating whether metadata needs to be essentially processed and applied to media. When metadata needs to be essentially processed and applied to media, a player that does not support processing the metadata may not reproduce relevant media.

In another example, a timed metadata track having a sample entry type equal to 'rcvp' may have no or one piece of SampleToGroupBox, and SampleToGroupBox may have a grouping_type equal to 'ovmt'. SampleToGroupBox may indicate assignment of samples in the timed metadata (and successive corresponding samples in a media track) to particular overlay-related metadata.

When there is SampleToGroupBox having grouping_type equal to 'ovmt', accompanying SampleGroupDescriptionBox having the same grouping type is present and includes the ID of the particular overlay metadata to which samples in this group belong.

A sample group entry having grouping_type equal to 'ovmt' may be referred to as OverlayMEtaRefEntry and may be defined as follows.

TABLE 12

```
class OverlayMetaRefEntry( ) extends SampleGroupDescriptionEntry
('ovmt') {
    OverlayInfoStruct( );
}
```

OverlayInfoStruct( ) may include overlay-related metadata to be applied to metadata samples included in s group.

As described above, it may be indicated through overlay-related metadata whether an overlay needs to be essentially rendered (displayed). In this case, a receiver may process 360-degree video data differently depending on the capabilities of a connected or embedded player.

Figure 29:
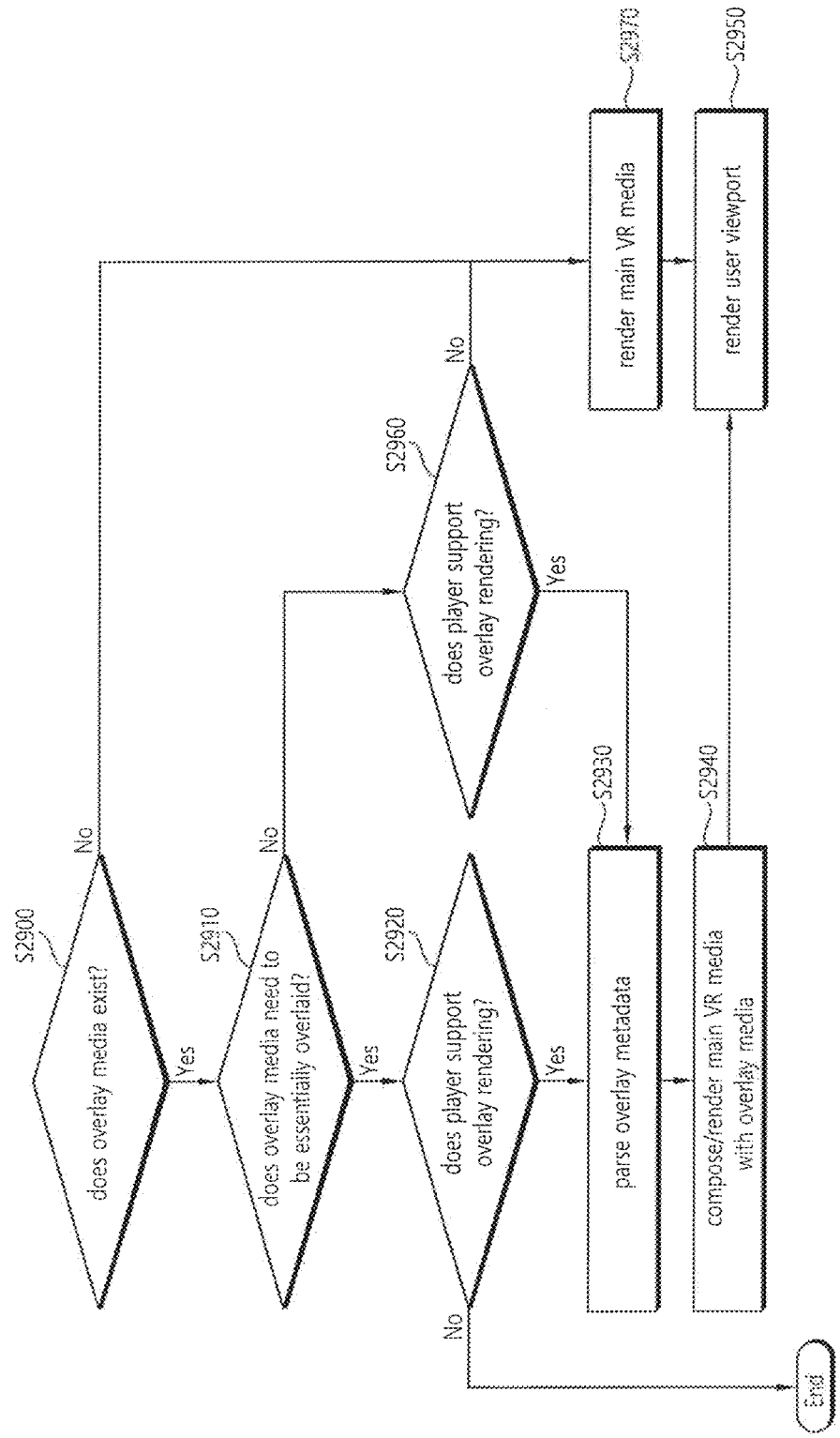
FIG. 29 illustrates an example in which a 360-degree video reception apparatus processes overlay media.

FIG. 29 illustrates an example in which a 360-degree video reception apparatus processes overlay media.

Referring to FIG. 29, the 360-degree video reception apparatus identifies whether overlay media exists (S2900). For example, as described above, overlay media may be included as a track in a file. One track may include one or more pieces of overlay media. Alternatively, overlay media may be stored in advance in the reception apparatus or may be received from a separate entity via a network.

When overlay media exists in S2900, the 360-degree video reception apparatus determines whether the overlay media needs to be essentially overlaid (S2910). For example, it is possible to determine whether the overlay media needs be essentially overlaid on the basis of information indicating whether overlaying is essential included in overlay-related metadata. The information indicating whether overlaying is essential may include overlay_essential_flag and/or an overlay_priority illustrated above.

When it is determined that the overlay media needs to be essentially overlaid in S2910, the 360-degree video reception apparatus identifies whether a player connected to or included in the 360-degree video reception apparatus supports overlay rendering (S2920).

When the player does not support overlay rendering in S2920, the 360-degree video reception apparatus may not render not only the overlay media but also main VR media (background media).

When the player supports overlay rendering in S2920, the 360-degree video reception apparatus may parse the overlay-related metadata (S2930) and may compose/render the main VR media with the overlay media (S2940). In this case, the main VR media and the overlay media may be rendered according to the user viewport (S2950).

When it is determined that the overlay media does not need to be essentially overlaid in S2910, it is identified whether the player supports overlay rendering (S2960).

When the player supports overlay rendering in S2960, the 360-degree video reception apparatus may parse the overlay-related metadata (S2930) and may compose/render the main VR media with the overlay media (S2940). In this case, the main VR media and the overlay media may be rendered according to the user viewport (S2950).

When the player does not support overlay rendering in S2960 or when there is no overlay media in S2900, the 360-degree video reception apparatus may render the main VR media (S2970). In this case, the main VR media may be rendered according to the user viewport (S2950).

The main VR media may include a decoded picture/image/video obtained from 360-degree video data (file) via a decoding procedure or the like. The overlay media may include decoded overlay text/picture/image/video obtained from the 360-degree video data (file) via a decoding procedure or the like, or may include overlay text/picture/image/video stored in advance in the 360-degree video reception apparatus or received (and decoded) from an external entity via a network.

Figure 30:
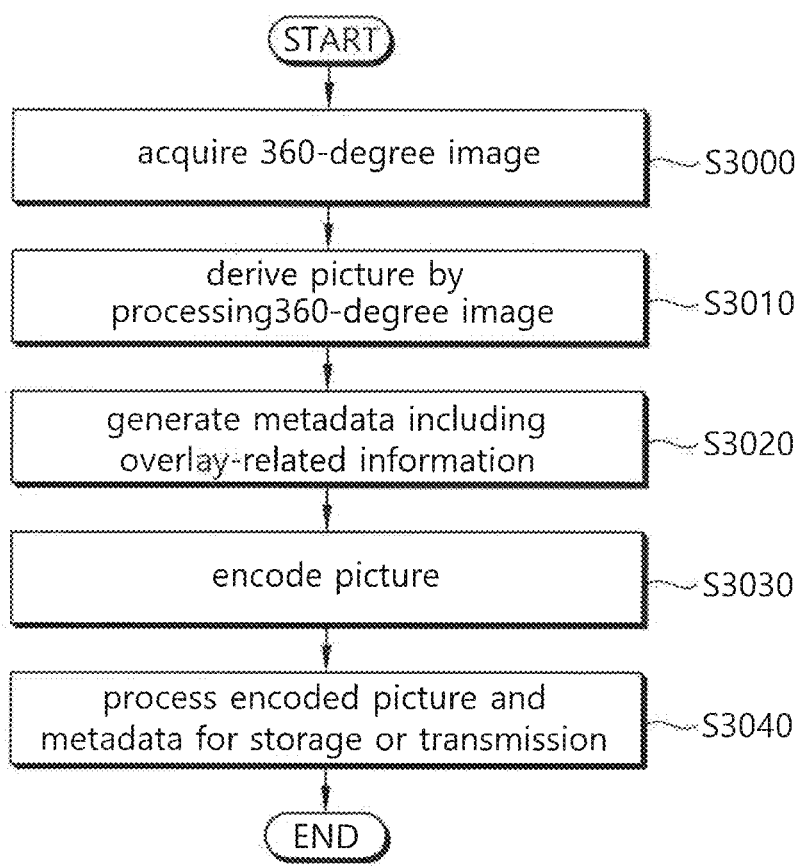
FIG. 30 schematically illustrates a method of processing 360-degree video/image data by a 360-degree video transmission apparatus according to the present invention.

FIG. 30 schematically illustrates a method of processing 360-degree video/image data by a 360-degree video transmission apparatus according to the present invention. The method disclosed in FIG. 30 may be performed by the 360-degree video transmission apparatus disclosed in FIG. 5 or FIG. 16.

Referring to FIG. 30, the 360-degree video transmission apparatus acquires a 360-degree video/image (S3000). The 360-degree video/image may be a video/image captured by at least one camera. Alternatively, part or the entirety of the 360-degree video/image may be a virtual video/image produced by a computer program or the like. A 360-degree image may be a separate still image or part of a 360-degree video.

The 360-degree video transmission apparatus processes the 360-degree video/image to derive a picture (S3010). The 360-degree video transmission apparatus may derive the 2D picture on the basis of the different projection formats and the region-wise packing processes illustrated above. The derived picture may correspond to a projected picture or may correspond to a packed picture (when a region-wise packing process is applied). The derived picture may include main medium (background media). Also, the derived picture may further include overlay medium.

The 360-degree video transmission apparatus generates metadata about the 360-degree video/image (S3020). Here, the metadata may include the fields described above in this specification. The fields may be included in boxes having various levels or may be included as data of a separate track in a file. For example, the metadata may include some or all of the fields/information described in Tables 1 to 12. For example, the metadata may include group information, and the group information may include group type information indicating a group including main media and an overlay that can be rendered together. The decoded picture may include the main media. The group information may include information indicating whether a track belonging to the group includes the main media or overlay media. For example, the metadata may include overlay-related metadata (including information/fields) illustrated above. The overlay-related metadata may include at least one of the identifier of the overlay metadata, information about whether the overlay needs to be essentially rendered, priority information about the overlay, information about a region of the overlay, information about the (rendering) type of the overlay, information about whether stereoscopy is applied, information about rotation of the overlay, information about the depth or order of the overlay, information about the number of overlays, overlay rendering attribute information (e.g., opacity, transparency, blending), and information indicating whether associated media is overlay media or main media (background media). The group information may be included in the overlay-related metadata.

For example, the overlay-related metadata may include overlay identifier information indicating the identifier of the overlay, overlay essential flag information indicating whether the overlay needs to be essentially processed, and overlay priority information indicating the priority of the overlay.

For example, the overlay-related metadata may include region type information indicating the region type of the overlay and region information of the overlay according to the region type. In addition, the overlay-related metadata may include at least one of depth information and order information of the overlay. A region of the overlay may indicate a region of a layer or plane on which the overlay is positioned. As described above, the region type information may indicate one of a type overlaid on a viewport, a type overlaid on a spherical region, and a type overlaid in a 3D space. In this case, for example, an index value of 0 of the region type information may indicate the type overlaid on the viewport, an index value of 1 of the region type information may indicate the type overlaid on the spherical region, and an index value of 2 of the information may indicate the type overlaid in the 3D space. The depth information may be included in the overlay-related metadata when the type of the overlay is the type overlaid on the spherical region or the type overlaid in the 3D space. The depth information may indicate the depth value of a region in which the overlay is rendered. The order information may indicate the layering order of overlays which are the type overlaid on the viewport or the layering order of overlays having the same depth value.

For example, the region information of the overlay may include at least one of information about the position of the overlay and information about the size of the overlay. The information about the position of the overlay may indicate at least one of the x, y, and z coordinates of a center point of the overlay in a 3D coordinate space in which the decoded picture is rendered, and the information about the size of the overlay may indicate at least one of the width and the height of the overlay.

For example, the overlay-related metadata may include information about whether the overlay needs to be essentially rendered and/or priority information about the overlay. The priority information about the overlay indicates the priorities of overlays. When a player does not have sufficient decoding capacity to decode all overlays, overlays may be decoded according to the priorities. For example, it is possible to indicate that an overlay needs to be essentially displayed or presented through overlay_essential_flag, and/or it is possible to indicate that an overlay needs to be essentially displayed or presented using a priority information value of 0. For example, when an overlay is required to be essentially displayed and a player included in or connected to a 360-degree video reception apparatus does not support processing the overlay, the player may be configured not to reproduce not only the overlay but also the main media.

For example, the overlay-related metadata may include overlay rendering attribute information. The attribute information may include information about transparency, opacity, and/or blending. Opacity indicates an opacity level applied to an overlay. For example, a value of 0 may indicate fully transparent, and a value of 100 may indicate completely opaque. Blending may be alpha composition-based blending, and a blending type/mode may include a source-over type/mode. The source-over type/mode indicates a mode in which a source is positioned on a destination Further, for example, the overlay-related metadata may include information indicating whether an overlay is about a recommended viewport. The overlay-related metadata may include reference track indication information indicating a recommended viewport-related metadata track as a reference track and may indicate whether the overlay is about the recommended viewport on the basis of the reference track indication information.

The overlay-related metadata may be included in an overlay timed metadata track. Further, the overlay-related metadata may be configured on the basis of an overlay track and time information in a sample.

The 360-degree video transmission apparatus encodes the derived picture (S3030). The 360-degree video transmission apparatus may encode the 2D picture and may output the 2D picture as a bitstream. The derived picture may include the main media (background media) as described above.

The 360-degree video transmission apparatus may encode and output the overlay media according to the type of the overlay media. In this case, the encoded overlay media may be included in 360-degree image/video data, which will be described later. For example, the 360-degree image/video data may include the main media and/or the overlay media in track units.

Alternatively, the overlay media may be stored in advance in the 360-degree video reception apparatus or may be signaled, separately from the 360-degree image/video data, to the 360-degree video reception apparatus via a network. Alternatively, the overlay media may be signaled from a separate entity to the 360-degree video reception apparatus via a network.

The 360-degree video transmission apparatus process the encoded picture and the metadata for storage or transmission (S3040). The 360-degree video transmission apparatus may generate 360-degree image/video data on the basis of data about the encoded picture and/or the metadata. When encoding a series of pictures for a series of images of a 360 video, the 360-degree video transmission apparatus may generate the 360-degree video data including the encoded pictures. In addition, the 360-degree video transmission apparatus may generate the 360-degree image/video data further on the basis of data about the (encoded) overlay media.

The 360-degree video transmission apparatus may encapsulate the data about the encoded picture(s) and/or the metadata into a file. The 360-degree video transmission apparatus may encapsulate the encoded 360-degree video data and/or the metadata in a file format, such as ISOBMFF or CFF, for storage or transmission or may process the encoded 360-degree video data and/or the metadata into DASH segments. The 360-degree video transmission apparatus may include the metadata in a file format. For example, the metadata may be included in boxes having various levels in ISOBMFF or may be included as data of a separate track in a file.

As described above, the overlay-related metadata may be included in an overlay timed metadata track. Further, the overlay-related metadata may be configured on the basis of an overlay track and time information in a sample.

The 360-degree video transmission apparatus may encapsulate the metadata itself into a file. The 360-degree video transmission apparatus may process the encapsulated 360-degree video data for transmission according to the file format. The 360-degree video transmission apparatus may process the 360-degree video data according to any transmission protocol. Processing for transmission may include processing for transmission through a broadcast network or processing for transmission via a communication network, such as a broadband. Further, the 360-degree video transmission apparatus may process the metadata for transmission. The 360-degree video transmission apparatus may transmit the 360-degree image/video data (including the metadata), which has been processed for transmission, through a broadcast network and/or broadband.

Figure 31:
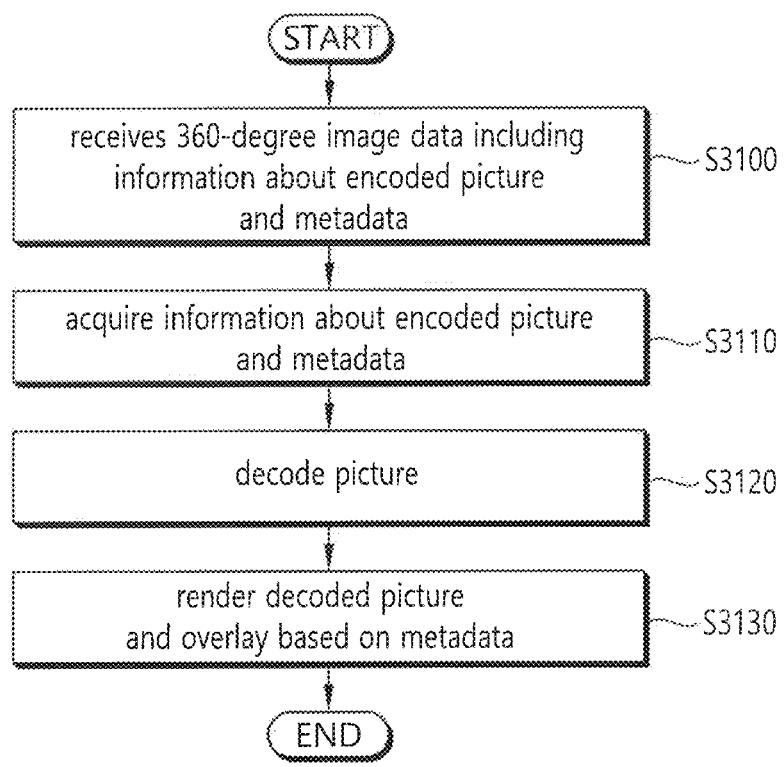
FIG. 31 schematically illustrates a method of processing 360-degree video/image data by a 360-degree video reception apparatus according to the present invention.

FIG. 31 schematically illustrates a method of processing 360-degree video/image data by a 360-degree video reception apparatus according to the present invention. The method disclosed in FIG. 31 may be performed by the 360-degree video reception apparatus disclosed in FIG. 6 or FIG. 17.

Referring to FIG. 31, the 360-degree video reception apparatus receives 360-degree image/video data (signal) (S3100). The 360-degree video reception apparatus may receive the 360-degree image/video data signaled from a 360-degree video transmission apparatus through a broadcast network. The 360-degree image/video data may include information about an encoded picture(s) of a 360-degree image/video and metadata. Further, the 360-degree video reception apparatus may receive the 360-degree image/video data through a communication network, such as broadband, or a storage medium.

The 360-degree video reception apparatus acquires the information on the encoded picture and the metadata (S3110). The information about the encoded picture and the metadata may be acquired from the 360-degree image/video data via a file/segment decapsulation procedure or the like.

The metadata may include the fields described above in this specification. The fields may be included in boxes having various levels or may be included as data of a separate track in a file. For example, the metadata may include some or all of the fields/information described in Tables 1 to 12. For example, the metadata may include group information, and the group information may include group type information indicating a group including main media and an overlay that can be rendered together. The decoded picture may include the main media. The group information may include information indicating whether a track belonging to the group includes the main media or overlay media. For example, the metadata may include overlay-related metadata (including information/fields) illustrated above. The overlay-related metadata may include at least one of the identifier of the overlay metadata, information about whether the overlay needs to be essentially rendered, priority information about the overlay, information about a region of the overlay, information about the (rendering) type of the overlay, information about whether stereoscopy is applied, information about rotation of the overlay, information about the depth or order of the overlay, information about the number of overlays, overlay rendering attribute information (e.g., opacity, transparency, blending), and information indicating whether associated media is overlay media or main media (background media). The group information may be included in the overlay-related metadata.

For example, the overlay-related metadata may include overlay identifier information indicating the identifier of the overlay, overlay essential flag information indicating whether the overlay needs to be essentially processed, and overlay priority information indicating the priority of the overlay.

For example, the overlay-related metadata may include region type information indicating the region type of the overlay and region information of the overlay according to the region type. In addition, the overlay-related metadata may include at least one of depth information and order information of the overlay. A region of the overlay may indicate a region of a layer or plane on which the overlay is positioned. As described above, the region type information may indicate one of a type overlaid on a viewport, a type overlaid on a spherical region, and a type overlaid in a 3D space. In this case, for example, an index value of 0 of the region type information may indicate the type overlaid on the viewport, an index value of 1 of the region type information may indicate the type overlaid on the spherical region, and an index value of 2 of the information may indicate the type overlaid in the 3D space. The depth information may be included in the overlay-related metadata when the type of the overlay is the type overlaid on the spherical region or the type overlaid in the 3D space. The depth information may indicate the depth value of a region in which the overlay is rendered. The order information may indicate the layering order of overlays which are the type overlaid on the viewport or the layering order of overlays having the same depth value.

For example, the region information of the overlay may include at least one of information about the position of the overlay and information about the size of the overlay. The information about the position of the overlay may indicate at least one of the x, y, and z coordinates of a center point of the overlay in a 3D coordinate space in which the decoded picture is rendered, and the information about the size of the overlay may indicate at least one of the width and the height of the overlay.

For example, the overlay-related metadata may include information about whether the overlay needs to be essentially rendered and/or priority information about the overlay. The priority information about the overlay indicates the priorities of overlays. When a player does not have sufficient decoding capacity to decode all overlays, overlays may be decoded according to the priorities. For example, it is possible to indicate that an overlay needs to be essentially displayed or presented through overlay_essential_flag, and/or it is possible to indicate that an overlay needs to be essentially displayed or presented using a priority information value of 0. For example, when an overlay is required to be essentially displayed and a player included in or connected to a 360-degree video reception apparatus does not support processing the overlay, the player may be configured not to reproduce not only the overlay but also the main media.

For example, the overlay-related metadata may include overlay rendering attribute information. The attribute information may include information about transparency, opacity, and/or blending. Opacity indicates an opacity level applied to an overlay. For example, a value of 0 may indicate fully transparent, and a value of 100 may indicate completely opaque. Blending may be alpha composition-based blending, and a blending type/mode may include a source-over type/mode. The source-over type/mode indicates a mode in which a source is positioned on a destination Further, for example, the overlay-related metadata may include information indicating whether an overlay is about a recommended viewport. The overlay-related metadata may include reference track indication information indicating a recommended viewport-related metadata track as a reference track and may indicate whether the overlay is about the recommended viewport on the basis of the reference track indication information.

The overlay-related metadata may be included in an overlay timed metadata track. Further, the overlay-related metadata may be configured on the basis of an overlay track and time information in a sample.

The 360-degree video reception apparatus may decode the picture(s) on the basis of the information about the encoded picture (S3120). The decoded picture may correspond to a projected picture or may correspond to a packed picture (when a region-wise packing process is applied). The decoded picture may include main medium (background media).

The 360-degree video reception apparatus may decode overlay media according to the type of the overlay media. In this case, information about the encoded overlay media may be included in the 360-degree image/video data.

Alternatively, the overlay media may be stored in advance in the 360-degree video reception apparatus or may be signaled, separately from the 360-degree image/video data, to the 360-degree video reception apparatus via a network. Alternatively, the overlay media may be signaled from a separate entity to the 360-degree video reception apparatus via a network.

If necessary, the 360-degree video reception apparatus may decode the picture on the basis of the metadata, which may be performed, for example, when decoding a portion of the picture where a viewport is positioned or when it is required to change a viewpoint or to decode another particular picture at a position linked to an overlay.

The 360-degree video reception apparatus renders the decoded picture and an overlay on the basis of the metadata (S3130). The 360-degree video reception apparatus may process and render the decoded picture and the overlay on the basis of the metadata. In this case, the decoded picture and the overlay may be partially or entirely rendered according to the user viewport. In this case, the decoded picture may be rendered on a 3D surface through a re-projection procedure or the like as described above. The overlay may be rendered on a viewport, on a 3D surface, or in a 3D space according to the overlay type on the basis of the metadata. The 360-degree video reception apparatus may be connected to a self-driving vehicle and may provide an image of the inside or the outside of the self-driving vehicle to the user.

The foregoing steps may be omitted according to the embodiment or may be replaced by other steps of performing similar/equivalent operations.

The internal components of the apparatuses illustrated above may be processors executing successive processes stored in a memory or may be hardware components configured with other hardware. These components may be disposed inside or outside the apparatuses.

The foregoing modules may be omitted according to the embodiment or may be replaced by other modules for performing similar/equivalent operations.

Each of the foregoing parts, modules, or units may be a processor or a hardware part that executes successive processes stored in a memory (or storage unit). Each step described in the foregoing embodiments may be performed by a processor or hardware part. Each module/block/unit described in the foregoing embodiments may operate as a hardware/processor. Further, the methods proposed by the present invention may be executed as codes. These codes may be written in a processor-readable storage medium and may thus be read by a processor provided by an apparatus.

Although the foregoing embodiments illustrate the methods on the basis of a flowchart having a series of steps or blocks, the present invention is not limited to the order of the steps or blocks. Some steps or blocks may occur simultaneously or in a different order from other steps or blocks as described above. Further, those skilled in the art will understand that the steps shown in the above flowcharts are not exclusive, that further steps may be included, or that one or more steps in the flowcharts may be deleted without affecting the scope of the present disclosure.

When the embodiments of the present invention are implemented in software, the foregoing methods may be implemented by modules (processes, functions, or the like) that perform the functions described above. Such modules may be stored in a memory and may be executed by a processor. The memory may be inside or outside the processor and may be connected to the processor using various well-known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage devices.

The foregoing embodiments of the present invention may be applied to VR and AR. The embodiments of the present invention may be implemented on the basis of the following chipset.

Figure 32:
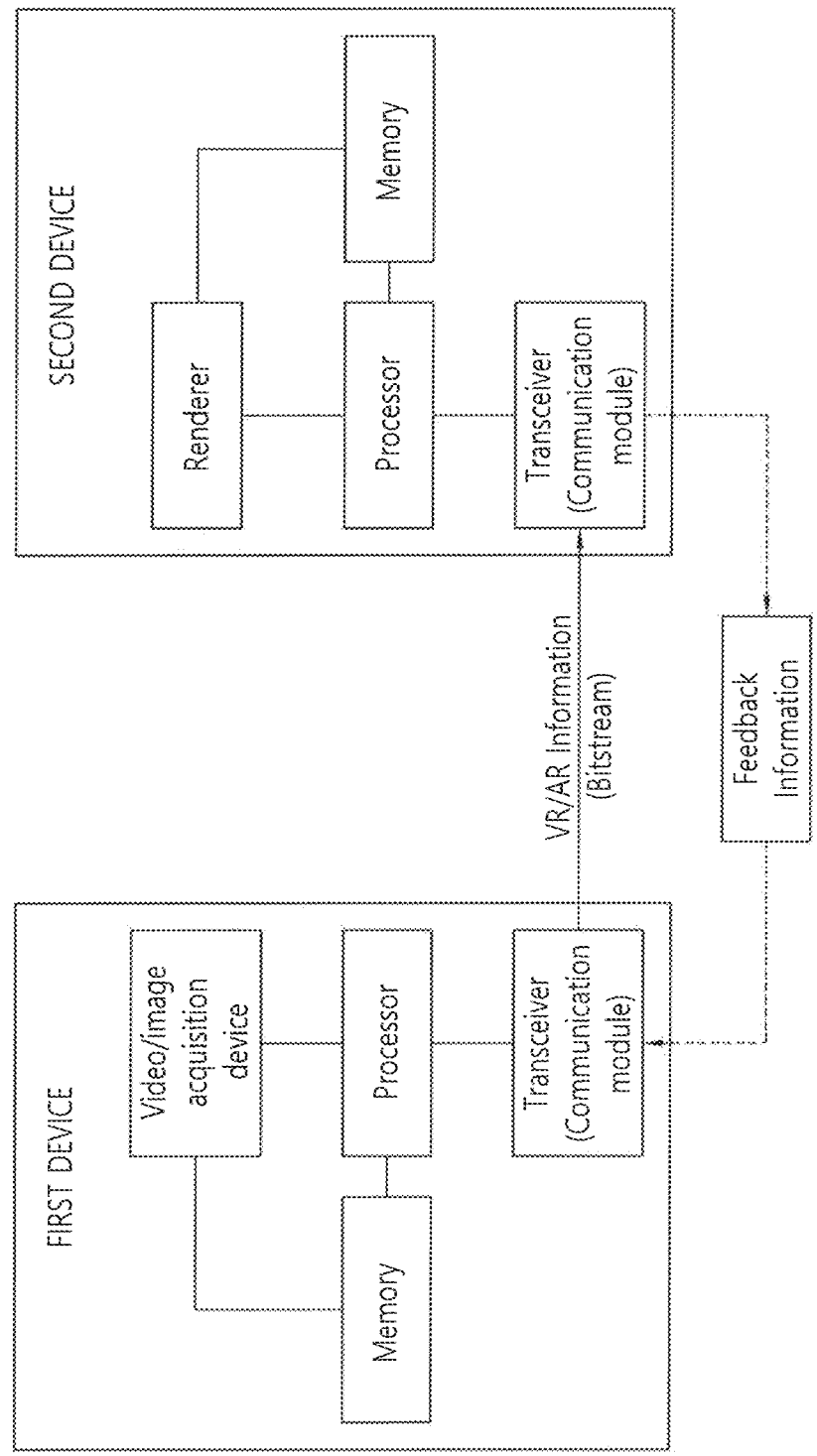
FIG. 32 illustrates a device capable of supporting embodiments of the present invention.

FIG. 32 illustrates a device capable of supporting embodiments of the present invention. For example, a first device may include a transmission apparatus (e.g., a 360-degree video transmission apparatus), and a second device may include a reception apparatus (e.g., a 360-degree video reception apparatus). The technical features of the transmission apparatus and the reception apparatus described above in this specification may be applied to this embodiment.

For example, the first device may include a processor, a memory, a video/image capture device, and a transceiver. The processor may be configured to perform the proposed functions, procedures, and/or methods described herein. For example, the processor may be configured to control and/or perform the procedures of stitching, projection, (region-wise) packing, composition, (video/image) encoding, and metadata generation and processing. Further, the processor may be configured to control and/or perform a procedure for acquiring a 360-degree video/image and a procedure for encapsulating and transmitting VR/AR information (e.g., 360-degree video/image data). The processor may control the configuration and transmission of metadata disclosed in the embodiments of the present invention. The memory is operatively coupled with the processor and stores various pieces of information for operating the processor. The transceiver is operatively coupled with the processor and transmits and/or receives a wired/wireless signal.

The second device may include a processor, a memory, a transceiver, and a renderer. The renderer may be omitted and configured as an external device. The processor may be configured to perform the proposed functions, procedures, and/or methods described herein. For example, the processor may be configured to control and/or perform the procedures of metadata acquisition and processing, (video/image) decoding, (region-wise) unpacking, selection, composition, re-projection, and rendering. Further, the processor may be configured to control and/or perform a procedure for decapsulating and receiving VR/AR information (e.g., 360-degree video/image data). The processor may control the configuration and transmission of metadata disclosed in the embodiments of the present invention. The memory is operatively coupled with the processor and stores various pieces of information for operating the processor. The transceiver is operatively coupled with the processor and transmits and/or receives a wired/wireless signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a baseband circuit for processing a radio frequency signal. When an embodiment is implemented in software, the techniques described herein may be implemented by a module (e.g., a process or a function) for performing the functions disclosed herein. The module may be stored in the memory and may be performed by the processor. The memory may be configured inside or outside the processor and may be communicatively connected to the processor by using various means known in the art.

The first device be a base station, a network node, a transmission terminal, a reception terminal, a wireless device, a wireless communication device, a vehicle, a vehicle having an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a financial technology (fintech) device (financial device), a security device, a climate/environment device, a device related to a 5G service, or a device related to the fourth industrial revolution.

The second device be a base station, a network node, a transmission terminal, a reception terminal, a wireless device, a wireless communication device, a vehicle, a vehicle having an autonomous driving function, a connected car, a UAV, an AI module, a robot, an AR device, a VR device, an MR device, a hologram device, a public safety device, an MTC device, an IoT device, a medical device, a fintech device (financial device), a security device, a climate/environment device, a device related to a 5G service, or a device related to the fourth industrial revolution.

For example, the terminal may be a mobile phone, a smartphone, a laptop computer, a digital broadcasting terminal, a personal digital assistant (PDA), a portable multimedia player (PMP), a navigation device, a slate PC, a tablet PC, an ultrabook, a wearable device (e.g., a smartwatch, smart glasses, and a head-mounted display (HMD)). For example, the HMD may be a display device worn on the head. For example, an HMD may be used to implement VR, AR, or MR.

For example, the UAV may be an aircraft without a human pilot on board, the flight of which operates by a radio control signal. For example, the VR device may include a device for realizing an object or a background in a virtual world. For example, the AR device may include a device for connecting an object or a background in a virtual world to an object or a background in the real world. For example, the MR device may include a device for combining an object or a background in a virtual world with an object or a background in the real world. For example, the hologram device may include a device for realizing a 360-degree stereoscopic image by recording and reproducing stereoscopic information using holography, which is interference of light resulting from two laser beams encountering each other. For example, the public safety device may include an image relay device or an imaging device that can be worn on a user's body. For example, the MTC device and the IoT device may be devices that do not require direct human intervention or manipulation. For example, the MTC device and the IoT device may include a smart meter, a vending machine, a thermometer, a smart bulb, a door lock or various sensors. For example, the medical device may be a device used for diagnosing, treating, alleviating, curing, or preventing a disease. For example, the medical device may be a device used for diagnosing, treating, alleviating, or correcting an injury or a disorder. For example, a medical device may be a device used for inspecting, replacing, or modifying a structure or a function. For example, the medical device may be a device used for controlling pregnancy. For example, the medical device may include a medical device, a surgical device, a (in vitro) diagnostic device, a hearing aid, or a treatment device. For example, the security device may be a device installed to prevent a risk that may occur and to maintain safety. For example, the security device may be a camera, a CCTV, a recorder, or a black box. For example, the fintech device may be a device capable of providing a financial service, such as mobile payment. For example, the fintech device may include a payment device or a point-of-sale (POS) device. For example, the climate/environment device may include a device for monitoring or predicting a climate/environment.

The first device and/or the second device may have one or more antennas. For example, the antennas may be configured to transmit and receive a radio signal.

The technical features according to the present invention described above may be applied to various services including VR/AR services. In addition, the technical features according to the present invention may be performed through fifth-generation (5G) or next-generation communication. For example, data (e.g., including a video/image bitstream and metadata) output from a transmission apparatus (e.g., a 360-degree video transmission apparatus) may be transmitted to a reception apparatus (e.g., a 360-degree video reception apparatus) via 5G communication. Further, a separate (VR/AR) image/video acquisition device may be provided externally and may transmit an obtained image/video to the transmission apparatus through 5G communication. Also, the transmission apparatus and/or reception apparatus according to the present invention may support various service scenarios through 5G communication.

Figure 33:
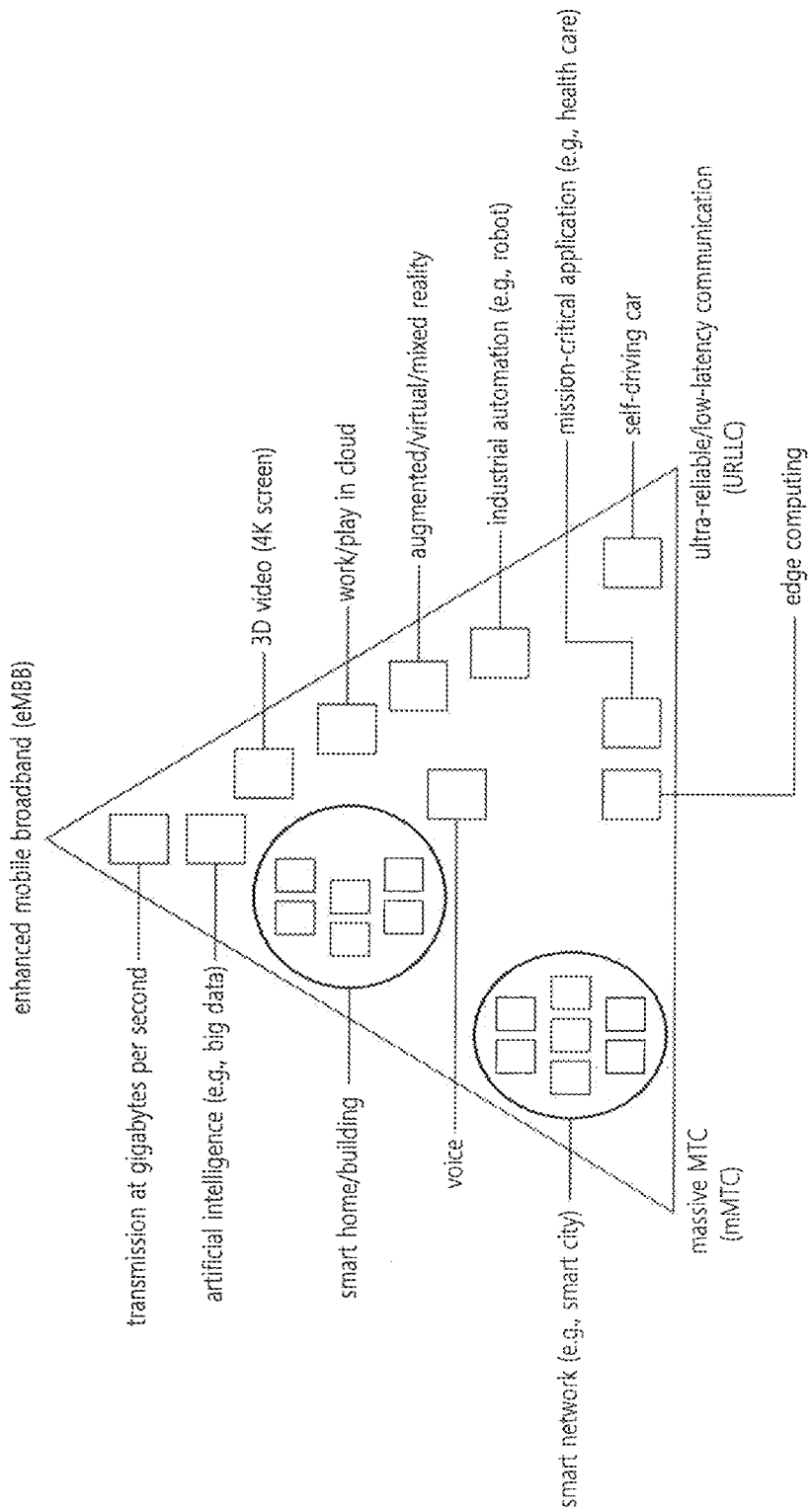
FIG. 33 illustrates an example of a 5G usage scenario to which the technical features of the present invention are applicable.

FIG. 33 illustrates an example of a 5G usage scenario to which the technical features of the present invention are applicable. This illustrated 5G usage scenario is merely for illustrative purposes, and the technical features of the present invention may also be applied to other 5G usage scenarios which are not shown.

Referring to FIG. 33, three major areas required for 5G includes: (1) an enhanced mobile broadband (eMBB) area; (2) a massive machine-type communication (mMTC) area; and 3) an ultra-reliable and low-latency communication (URLLC) area. Some use cases may require a plurality of areas for optimization, and other use cases may focus on only one key performance indicator (KPI). 5G supports these various use cases in a flexible and reliable manner.

eMBB focuses on overall improvement in data rate, latency, user density, and capacity and coverage of mobile broadband connection. eMBB is aimed at a throughput of about 10 Gbps. eMBB further surpasses basic mobile Internet access and covers abundant interactive operations, a cloud, and media and entertainment applications in augmented reality. Data is one key driver in 5G, and dedicated voice services may not be provided for the first time in the 5G era. In 5G, a voice is expected to be processed as an application simply using data connection provided by a communication system. Main reasons for an increase in the amount of traffic are an increase in the size of content and a growing number of applications requiring a high data rate. Streaming services (audio and video) and interactive video and mobile Internet connectivity will be widely used as more devices are connected to the Internet. A large number of applications require always-on connectivity in order to push real-time information and notifications to a user.

Cloud storage and applications are rapidly growing in use on mobile communication platforms and can be applied to both work and entertainment. Cloud storage is a special use case which contributes to an increase in uplink data rate. 5G is also used for telebusiness on the cloud, and requires much lower end-to-end latency to maintain a satisfactory user experience when a tactile interface is used. In entertainments, for example, cloud games and video streaming are other key factors that require enhanced mobile broadband capabilities. Entertainments are essential for smartphones and tablet PCs in any place including a high-mobility environment, such as a train, a car, and an airplane. Another use case is augmented reality and information retrieval for entertainments. Here, augmented reality requires very low latency and a large amount of data in a moment.

mMTC is designed to enable communication between a large number of low-cost devices operated with a battery and is intended to support smart metering, distribution, work areas, and applications including body sensors. mMTC is aimed at supporting a battery life of about ten years and/or about one million devices per square kilometer. mMTC enables seamless connection of embedded sensors in any field and is one of the most widely used 5G applications. Potentially, the number of IoT devices is expected to reach 20.4 billion by 2020. Industrial IoT is one field where 5G plays a key role in enabling smart cities, asset tracking, smart utilities, and agricultural and security infrastructures.

URLLC enables devices and machines to communicate with high reliability, very low latency, and high availability, thus being ideal for vehicular communications, industrial control, factory automation, remote surgery, a smart grid, and public safety applications. URLLC aims at a latency of about 1 ms. URLLC includes new services that will change the industry through remote control of key infrastructures and ultra-reliable/low-latency links, such as self-driving vehicles. Reliability and latency levels are essential for smart grid control, industrial automation, robotics, and drone control and coordination.

Next, a plurality of use cases included in the triangle of FIG. 33 will be described in more detail.

5G is a technique for providing a stream rated at hundreds of megabits per second to gigabytes per second and can complement fiber-to-the-home (FTTH) and cable-based broadband (or DOCSIS). This high speed may be required to provide not only virtual reality (VR) and augmented reality (AR) but also a TV with a resolution of 4K or higher (6K, 8K or above). VR and AR applications mostly include immersive sporting events. A particular application may require a special network configuration. For example, for a VR game, a game company may need to integrate a core server with an edge network server of a network operator in order to minimize latency.

An automotive area is expected to be an important new driver for 5G with many uses for vehicular mobile communications. For example, entertainments for passengers require both high-capacity and high-mobility broadband, because future users continue to expect high-quality connection regardless of location and speed thereof. Another use case in the automotive area is an AR dashboard. A driver can identify an object in the dark on what is being viewed through a front window through the AR dashboard. The AR dashboard displays information to be informed to the driver about the distance and movement of an object in an overlapping manner. In the future, a wireless module enables communication between vehicles, information exchange between a vehicle and a supporting infrastructure, and information exchange between a vehicle and a different connected device (e.g., a device accompanied by a pedestrian). A safety system provides an alternative course for an action so that a driver can drive safely, thereby reducing the risk of accidents. The next step would be a remote control vehicle or a self-driving vehicle, which requires highly reliable and very fast communication between different self-driving vehicles and/or between a vehicle and an infrastructure. In the future, a self-driving vehicle will perform all driving activities, and the driver will focus only on a traffic problem that the vehicle cannot autonomously identify. Technical requirements of self-driving vehicles are ultra-low latency, high speed, and high reliability to increase traffic safety to the extent that humans cannot achieve.

In a smart city and a smart home, which are referred to as a smart society, a high-density wireless sensor network will be embedded. A distributed network of intelligent sensors will identify conditions for cost and energy-efficient maintenance of a city or house. Similar settings may be established for each home. A temperature sensor, window and heating controllers, a security system, and home appliances are all wirelessly connected. Many of these sensors typically require low data rate, low power, and low cost. However, for example, a real-time HD video may be required for a particular type of a device for monitoring.

Since consumption and distribution of energy including heat or gas is decentralized to a high degree, automated control of a distributed sensor network is required. A smart grid collects information and interconnects sensors using digital information and communication technology to function according to the information. This information may include supplier and consumer behavior, thus enabling the smart grid to improve the distribution of fuel, such as electricity, in efficient, reliable, economical, production-sustainable, and automated manners. The smart grid may be considered as a sensor network having low latency.

The health sector has a large number of applications that can benefit from mobile communications. Communication systems can support telemedicine to provide clinical care in remote locations. Telemedicine can help to reduce a distance barrier and can improve access to medical services that are not continuously available in distant rural areas. Telemedicine is also used to save lives in critical treatment and emergency situations. A wireless sensor network based on mobile communication can provide remote monitoring and sensors for parameters, such as heart rate and blood pressure.

Wireless and mobile communication is gradually becoming important in industrial applications. Wiring involves high costs for installation and maintenance. Thus, the possibility of replacing a cable with a reconfigurable wireless link is an attractive aspect for different industrial fields. However, to replace a cable with a reconfigurable wireless link, a wireless connection needs to operate with similar latency, reliability, and capacity to those of a cable and needs to be managed in a simplified manner. Low latency and a very low error probability are new requirements for a 5G connection.

Logistics and cargo tracking is an important use case for mobile communication which enables the tracking of inventory and packages anywhere using a location-based information system. The use case of logistics and cargo tracking typically requires low data rate but needs a large range and reliable location information.

The embodiments according to the present invention may also be performed to support extended reality (XR). XR collectively refers to virtual reality (VR), augmented reality (AR), and mixed reality (MR). VR technology provides only a CG image of a real-world object or background, AR technology provides an image of a real object with a virtual CG image thereon, and MR technology is a computer graphic technique for providing a real-world image mixed and combined with virtual objects.

MR technology is similar to AR technology in that a real object and a virtual object are shown together. However, a virtual object supplements a real object in AR technology, whereas, a virtual object and a real object are used on equal terms in MR technology.

XR technology may be applied to a head-mounted display (HMD), a head-up display (HUD), a mobile phone, a tablet PC, a laptop, a desktop, a TV, digital signage, or the like. A device to which XR technology is applied may be referred to as an XR device. The XR device may include the first device and/or the second device described above.

The XR device may be connected to various services through a communication network based on 5G communication.

Figure 34:
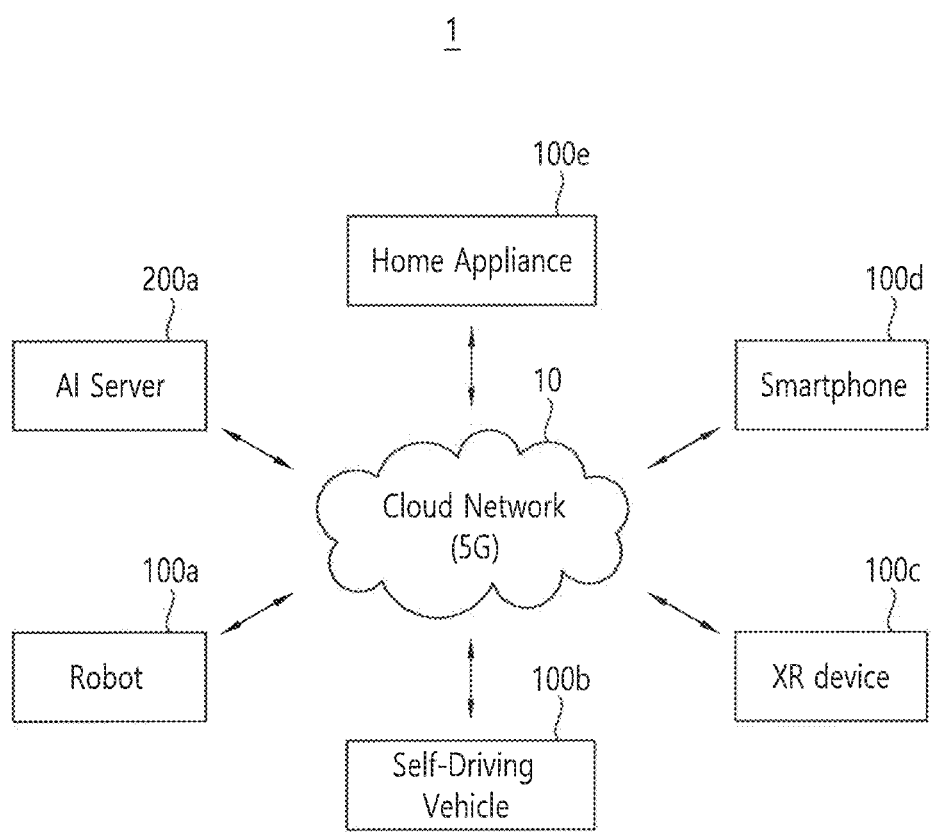
FIG. 34 illustrates a service system according to an embodiment of the present invention.

FIG. 34 illustrates a service system according to an embodiment of the present invention.

Referring to FIG. 34, an XR device 100c may be connected with at least one of an AI server 200a, a robot 100a, a self-driving vehicle 100b, a smartphone 100d, and a home appliance 100e via a network. Here, the robot 100a, the self-driving vehicle 100b, the XR device 100c, the smartphone 100d, or the home appliance 100e to which AI technology is applied may be referred to as an AI device.

The network 10 may include a wired/wireless communication network. The network 10 may include a cloud network. The cloud network may refer to a network that is a part of cloud computing infrastructure or exists in cloud computing infrastructure. Here, the cloud network may be configured using a 3G network, a 4G or long-term evolution (LTE) network, or a 5G network.

The devices 100a to 100e and 200a included in the system 1 may be connected to each other through the cloud network 10. In particular, the devices 100a through 100e and 200a may communicate with each other through a base station and may also directly communicate with each other without using a base station.

The AI server 200a may include a server performing AI processing and a server performing an operation on big data.

The AI server 200a may be connected with at least one of the robot 100a, the self-driving vehicle 100b, the XR device 100c, the smartphone 100d, and the home appliance 100e via the network 10 and may assist at least part of AI processing of the connected devices 100a to 100e.

Here, the AI server 200a may learn an artificial neural network according to a machine learning algorithm for the AI devices 100a to 100e, may directly store a learning model, or may transmit a learning model to the AI devices 100a to 100e.

Here, the AI server 200a may receive input data from the AI devices 100a to 100e, may infer a result value with respect to the received input data using a learning model, may generate a response or a control command on the basis of the inferred result value, and may transmit the response or the control command to the AI devices 100a to 100e.

Alternatively, the AI devices 100a to 100e may directly infer a result value with respect to input data using a learning model and may generate a response or a control command on the basis of the inferred result value.

The XR device 100c may be configured as a head-mounted display (HMD), an in-vehicle head-up display (HUD), a television, a mobile phone, a smartphone, a computer, a wearable device, a home appliance, digital signage, a vehicle, a stationary robot, or a mobile robot.

The XR device 100c may analyze 3D point cloud data or image data acquired via various sensors or from an external device to generate position data and attribute data about 3D points, thereby obtaining information about a surrounding space or a real object, rendering an XR object to output, and outputting the XR object. For example, the XR device may output an XR object including additional information about a recognized object in association with the recognized object.

The XR device 100c may perform the foregoing operations using a learning model including at least one artificial neural network. For example, the XR device 100c may recognize a real object from 3D point cloud data or image data using the learning model and may provide information corresponding to the recognized real object. Here, the learning model may be learned directly by the XR device 100c or learned from an external device, such as the AI server 200a.

Here, the XR device 100c may directly generate a result using the learning model and may perform the operations. However, the XR device 100c may transmit sensor information to an external device, such as the AI server 200a, may receive a result generated according to the sensor information, and may perform the operations.

The robot 100a may include a guide robot, a carrying robot, a cleaning robot, a wearable robot, an entertainment robot, a pet robot, an unmanned aerial robot, a drone, or the like.

The robot 100a may include a robot control module for controlling an operation, and the robot control module may refer to a software module or a hardware chip implementing the software module.

The robot 100a may acquire state information about the robot 100a, may detect (recognize) surroundings and an object, may generate map data, may determine a route and a driving plan, may determine a response to a user interaction, or may determine an operation using sensor information acquired from various types of sensors.

Here, the robot 100a may use sensor information acquired from at least one sensor among lidar, radar, and a camera in order to determine the route and the driving plan.

The XR device 100c may remotely connect and/or remotely control the robot 100a through the network 10. In this case, the robot 100a may share a view or a screen with a user using the XR device 100c and may control a driver on the basis of the control/interaction of the user, thereby operating or running. Here, the robot 100a may acquire intention information of an interaction based on the user's action or utterance, may determine a response on the basis of the acquired intention information, and may perform an operation.

The robot 100a to which XR technology is applied may refer to a robot as a target of control/interaction in an XR image. In this case, the robot 100a may be distinguished from the XR device 100c and may interwork therewith. When the robot 100a that is a target of control/interaction in an XR image acquires sensor information from sensors including a camera, the robot 100a or the XR device 100c may generate an XR image on the basis of the sensor information, and the XR device 100c may output the generated XR image. The robot 100a may operate on the basis of a control signal input through the XR device 100c or the user's interaction.

For example, the user can identify an XR image corresponding to the viewpoint of the robot 100a remotely linked through an external device, such as the XR device 100c, and may adjust a self-driving route of the robot 100a, may control the operation or driving thereof, or may identify information of a surrounding object through an interaction.

The self-driving vehicle 100b may include a mobile robot, a vehicle, a train, a manned/unmanned aircraft, a ship, and the like.

The self-driving vehicle 100b may include a self-driving control module for controlling a self-driving function, and the self-driving control module may refer to a software module or a hardware chip implementing the software module. The self-driving control module may be included as a component in the self-driving vehicle 100b, or may be configured as separate hardware outside the self-driving vehicle 100b and may be connected thereto.

The self-driving vehicle 100b may acquire state information about the self-driving vehicle 100b, may detect (recognize) surroundings and an object, may generate map data, may determine a route and a driving plan, or may determine an operation using sensor information acquired from various types of sensors.

Here, like the robot 100a, the self-driving vehicle 100b may use sensor information acquired from at least one sensor among lidar, radar, and a camera in order to determine the route and the driving plan.

In particular, the self-driving vehicle 100b may recognize an environment or an object of a blind spot or an area over a certain distance by receiving sensor information from external devices or may receive directly recognized information about the environment or the object from external devices.

The XR device 100c may remotely connect and/or remotely control the self-driving vehicle 100b through the network 10. In this case, the self-driving vehicle 100b may share a view or a screen with the user using the XR device 100c and may control a driver on the basis of the control/interaction of the user, thereby operating or running. Here, the self-driving vehicle 100b may acquire intention information of an interaction based on the user's action or utterance, may determine a response on the basis of the acquired intention information, and may perform an operation.

The self-driving vehicle 100b to which XR technology is applied may refer to a self-driving vehicle having a device for providing an XR image or a self-driving vehicle as a target of control/interaction in an XR image. Particularly, the self-driving vehicle 100b as a target of control/interaction in an XR image may be distinguished from the XR device 100c and may interwork therewith.

The self-driving vehicle 100b having a device for providing an XR image may acquire sensor information from sensors including a camera and may output an XR image generated on the basis of the acquired sensor information. For example, the self-driving vehicle 100b may include an HUD to output an XR image, thereby providing a passenger with an XR object corresponding to a real object or an object on a screen.

Here, when the XR object is displayed on the HUD, at least part of the XR object may be displayed to overlap the real object at which the passenger gazes. On the other hand, when the XR object is displayed on a display provided in the self-driving vehicle 100b, at least part of the XR object may be displayed to overlap the object on the screen. For example, the self-driving vehicle 100b may display XR objects corresponding to objects, such as a lane, another vehicle, a traffic light, a traffic sign, a two-wheeled vehicle, a pedestrian, a building, and the like.

When the self-driving vehicle 100b that is a target of control/interaction in an XR image acquires sensor information from sensors including a camera, the self-driving vehicle 100b or the XR device 100c may generate an XR image on the basis of the sensor information, and the XR device 100c may output the generated XR image. The self-driving vehicle 100b may operate on the basis of a control signal input through an external device, such as the XR device 100c, or the user's interaction.

The XR device 100c may be provided in the robot 100a and/or the self-driving vehicle 100b to provide separate XR contents to the user or to provide an internal/external image of the robot 100a and/or the self-driving vehicle 100b to the user.

In addition, the XR device 100c may be used for various services, such as entertainment, exercise, education, traffic, medical care, electronic commerce, manufacturing, and national defense. For example, it is possible to experience and/or watch a movie, a theme park, or a sport via the XR device 100c. Also, the XR device 100c may be used to support a medical practice or training in dangerous situations, such as the scene of a fire, via the XR device 100c. Furthermore, it is possible to provide a navigation service, such as AR Ways, using simultaneous localization and mapping (SLAM) technology through the XR device 100c. It is also possible to access a virtual shopping mall and to purchase a product using the XR device 100c.

What is claimed is:

1. A 360-degree video data processing method performed by a 360-degree video reception apparatus, the method comprising: receiving a file including metadata and one or more tracks, wherein the one or more tracks include media track and overlay track; processing the received file to obtain the metadata, from the file and to extract the media track and the overlay track based on the metadata; wherein: the metadata comprises group type information indicating a group comprising a media and the overlay that are intended to be presented together, the metadata comprises media flag information indicating whether media is present or not, the metadata comprises overlay flag information indicating whether overlay is present or not, the metadata comprises overlay-related metadata, and the overlay-related metadata comprises a flag information indicating whether the overlay is to be essentially displayed or not, decoding a picture corresponding to the media and a picture corresponding to the overlay; and rendering the decoded picture corresponding to the media and the decoded picture corresponding to the overlay.

2. The method of claim 1, wherein, neither the overlay nor the main media is displayed when the overlay is to be essentially displayed and a player comprised in or connected to the 360-degree video reception apparatus does not support processing of the overlay.

3. The method of claim 1, wherein, the overlay-related metadata comprises overlay identifier information representing an identifier of the overlay, overlay essential flag information representing whether the overlay is to be essentially processed, and overlay priority information representing a priority of the overlay.

4. The method of claim 3, wherein, when a player comprised in or connected to the 360-degree video reception apparatus lacks a capacity to decode all overlays, a decoding order of the overlays is derived on the basis of the priority indicated by the overlay priority information.

5. The method of claim 1, wherein, the overlay-related metadata comprises region type information representing a region type of the overlay and region information of the overlay according to the region type, and the overlay-related metadata comprises at least one of depth information and order information of the overlay.

6. The method of claim 5, wherein the region type information represents one of a type overlaid on a viewport, a type overlaid on a spherical region, and a type overlaid in a 3D space.

7. The method of claim 6, wherein an index value of 0 of the region type information indicates the type overlaid on the viewport, an index value of 1 of the region type information indicates the type overlaid on the spherical region, and an index value of 2 of the region type information indicates the type overlaid in the 3D space.

8. Tire method of claim 6, wherein the depth information is comprised in the overlay-related metadata when the type of the overlay is the type overlaid on the spherical region or the type overlaid in the 3D space, the depth information represents a depth value of a region in which the overlay is rendered, and the order information represents a layering order of overlays which correspond to the type overlaid on the viewport or a layering order of overlays having the same depth value.

9. The method of claim 1, wherein, the overlay-related metadata comprises opacity information representing an opacity applied to the overlay and blending type information about the overlay.

10. The method of claim 1, wherein, the overlay-related metadata comprises information representing whether the overlay is for a recommended viewport, the overlay-related metadata comprises reference track indication information indicating a metadata track related to a recommended viewport as a reference track, and it is represented whether the overlay is for the recommended viewport based on the reference track indication information.

11. Tire method of claim 1, wherein the 360-degree video reception apparatus is connected to a sell-driving vehicle and provides a user with an internal or external image of the self-driving vehicle.

12. A 360-degree image video data processing method performed by a 360-degree video transmission apparatus, the method comprising: obtaining a 360-degree video; deriving a picture from the 360-degree video; generating metadata and one or more tracks, wherein the one or more tracks include media track and overlay track; encoding a picture corresponding to a media, and a picture corresponding to an overlay; and processing the encoded picture corresponding to the media, the encoded picture corresponding to the overlay and metadata for storage or transmission, wherein: the metadata comprises group type information indicating a group comprising the media and the overlay that are intended to be presented together, the metadata comprises media flag information indicating whether media is present or not, the metadata comprises overlay flag information indicating whether overlay is present or not, the metadata comprises overlay-related metadata, and the overlay-related metadata comprises a flag informal ion indicating whether the overlay is to be essentially displayed or not.

13. The method of claim 12, wherein, neither the overlay nor the media is displayed when the overlay is to be essentially displayed and a player comprised in or connected to a 360-degree video reception apparatus does not support processing of the overlay.

14. The method of claim 12, wherein, the overlay-related metadata comprises overlay identifier information representing an identifier of the overlay, overlay essential flag information representing whether the overlay is to be essentially processed, and overlay priority information representing a priority of the overlay.

15. The method of claim 12, wherein, the overlay-related metadata comprises region type information representing a region type of the overlay and region information of the overlay according to the region type, and the overlay-related metadata comprises at least one of depth information and order information of the overlay.

16. The method of claim 12, wherein, the overlay-related metadata comprises opacity information representing an opacity applied to the overlay and blending type information about the overlay.

17. A 360-degree video reception apparatus, the apparatus comprising: a reception processor configured to receive a file including metadata and one or more tracks, wherein the one or more tracks include media track and overlay track; a decapsulator configured to process the received file to obtain the metadata from the file and to extract the media track and the overlay track based on the metadata; a data decoder configured to decode a picture corresponding to the media and a picture corresponding to the overlay; and a re-projection processor configured to perform re-projection about the decoded picture corresponding to the media and the decoded picture corresponding to the overlay based on the metadata derived from the 360-degree video data, wherein: the metadata comprises group type information indicating a group comprising a main media and the overlay that are Intended to be presented together, the metadata comprises media flag information indicating whether media is present or not, the metadata comprises overlay flag information indicating whether overlay is present or not, the metadata comprises overlay-related metadata, and the overlay-related metadata comprises a flag information indicating whether the overlay is to be essentially displayed or not.

18. The 360-degree video reception apparatus of claim 17, wherein, neither the overlay nor the media is displayed when the overlay is to be essentially displayed and a player comprised in or connected to the 360-degree video reception apparatus does not support processing of the overlay.

19. The 360-degree video reception apparatus of claim 17, wherein foe overlay-related metadata comprises overlay identifier information representing an identifier of the overlay, overlay essential flag information representing whether the overlay is to be essentially processed, and overlay priority information representing a priority of the overlay.

20. A 360-degree video transmission apparatus, the apparatus comprising: a projection processor configured to generate a picture of 360-degree video; a data encoder configured to encode a picture corresponding to a media and a picture corresponding to an overlay; a metadata processor configured to generate metadata and one or more tracks, wherein the one or more tracks include media track and overlay track; and a transmission processor configured to perform processing for storage or transmission of the encoded picture corresponding to the media, the encoded picture corresponding to the overlay and the metadata, wherein: the metadata comprises group type information indicating a group comprising a media and the overlay that are intended to be presented together, the metadata, comprises media flag information indicating whether media is present or not, the metadata comprises overlay flag information indicating whether overlay is present or not, the metadata comprises overlay-related metadata, and the overlay-related metadata comprises a flag information indicating whether the overlay is to be essentially displayed or not.

* * * * *